US011076013B2

(12) United States Patent
Sun et al.

(10) Patent No.: US 11,076,013 B2
(45) Date of Patent: Jul. 27, 2021

(54) ENABLING SEMANTIC MASHUP IN INTERNET OF THINGS

(71) Applicant: Convida Wireless, LLC, Wilmington, DE (US)

(72) Inventors: Xiang Sun, Harrison, NJ (US); Chonggang Wang, Princeton, NJ (US); Xu Li, Plainsboro, NJ (US); Quang Ly, North Wales, PA (US); Dale N. Seed, Allentown, PA (US); Hongkun Li, Malvern, PA (US)

(73) Assignee: Convida Wireless, LLC, Wilmington, DE (US)

( * ) Notice: Subject to any disclaimer, the term of this patent is extended or adjusted under 35 U.S.C. 154(b) by 613 days.

(21) Appl. No.: 15/720,156

(22) Filed: Sep. 29, 2017

(65) Prior Publication Data

US 2018/0278710 A1  Sep. 27, 2018

Related U.S. Application Data

(60) Provisional application No. 62/401,461, filed on Sep. 29, 2016.

(51) Int. Cl.
*H04L 29/08* (2006.01)
*H04W 4/70* (2018.01)
*G06F 16/951* (2019.01)
*H04W 4/14* (2009.01)
*G06F 40/30* (2020.01)

(52) U.S. Cl.
CPC ........ *H04L 67/2823* (2013.01); *G06F 16/951* (2019.01); *H04L 67/32* (2013.01); *H04W 4/70* (2018.02); *G06F 40/30* (2020.01); *H04W 4/14* (2013.01)

(58) Field of Classification Search
CPC ...... H04L 67/2823; H04L 67/32; H04W 4/70; G06F 16/951
See application file for complete search history.

(56) References Cited

U.S. PATENT DOCUMENTS

| 10,372,766 | B2 * | 8/2019 | Song | ........................ H04W 4/70 |
| 10,394,862 | B2 * | 8/2019 | Song | ........................ G06F 16/95 |
| 2015/0370900 | A1 | 12/2015 | Song et al. | |
| 2016/0004767 | A1 | 1/2016 | Song et al. | |
| 2016/0366028 | A1 * | 12/2016 | Yin | ........................ H04L 41/20 |

(Continued)

OTHER PUBLICATIONS

Yu et al., "Understanding Mashup Developmenet", IEEE Internet Computing, Sep./Oct. 2008, pp. 44-52.
Sparql 1.1 Update, http://www.w3.org/TR/sparql11-update/, downloaded Sep. 17, 2018, 26 pages.

(Continued)

*Primary Examiner* — Esther B. Henderson
*Assistant Examiner* — Nazia Naoreen
(74) *Attorney, Agent, or Firm* — BakerHostetler

(57) ABSTRACT

A new semantic mashup architecture with modular design can comprise separate Semantic Mashup Profiles (SMPs), Virtual Semantic Mashup Resources (VSMRs), and Semantic Mashup Results (SMRSs). This kind of modular design greatly improves the reusability of SMPs, VSMRs, and SMRSs. In addition, this new mashup architecture leverages semantics during each mashup process, which increases the interoperability. Moreover, this new architecture essentially realizes new Semantic Mashup Service (SMS) at the service layer and consequently improves system efficiency.

20 Claims, 56 Drawing Sheets

(56) References Cited

U.S. PATENT DOCUMENTS

| | | | | |
|---|---|---|---|---|
| 2017/0324824 A1* | 11/2017 | Sun | .......................... | H04L 29/08 |
| 2018/0205804 A1* | 7/2018 | Kim | .................... | H04L 12/5601 |
| 2018/0295196 A1* | 10/2018 | Jeong | .................... | H04W 24/02 |

OTHER PUBLICATIONS

Sparql 1.1 Query Language, http://www.w3.org/TR2013/REC-sparql11-query-201303211, downloaded Sep. 17, 2018, 89 pages.

Sparql 1.1 Overview, http://www.w3.org/TR/sparql11-overview/, downloaded Sep. 17, 2018, 6 pages.

Rif Overview, http://www.w3.or/TR/rif-overview/, downloaded Sep. 17, 2018, 9 pages.

Rdf Schema 1.1, http://www.w3.org/TR/rdf-schema/, downloaded Sep. 17, 2018, 15 pages.

Rdf 1.1 Concepts and Abstract Syntax, http://www.w3.org/TR/2014/REC-rdf11-concepts-20140225/, downloaded Sep. 17, 2018, 23 pages.

Owl 2 Web Ontology Language Document Overview, http://www.w3.org/TR/owl-overview/downloaded Sep. 17, 2018, 8 pages.

OneM2M TR-0007 V2.11.1 Study on Abstraction and Semantics Enablements, Aug. 30, 2016, 182 pages.

OneM2M TR-0001 V2.10.0, Technical Specification, Functional Architecture, Aug. 2016, 427 pages.

Oic Core Candidate Specification V1.1.0, https://openconnectivity.org/resources/specifications/draft-candidate-specifications, 2016, 183 pages.

Liu et al., "An Approach to Construct Dynamic Service Mashups Using Lightweight Semantics", Network and Parallel Computing, Lecture Notes, Springer International Publishing, Jun. 20, 2011, pp. 13-24.

Description of W3C Technology Stack Illustration, http://www.w3.org/Consortium/techstack-desc.html, downloaded Sep. 17, 2018, 1 page.

Amdouni et al., "A Preference-Aware Query Model for Data Web Services", Conceptual Modeling, Springer Berlin Heidelberg, Oct. 15, 2012, pp. 409-422.

* cited by examiner

Semantic Mashup Logic (Find suitable parking lot)

smlID
("SuitableParkingLot")

smlInputPara

| | | |
|---|---|---|
| @PREFIX | ex: | <http://example.org> . |
| @PREFIX | sml: | <http:sml.org> . |
| sml:inputPara | rdf:Type | sml:inputParameter . |
| sml:inputPara | rdf:Type | ex:geolocation . |
| sml:inputPara | sml:hasName | "destinationAddr" . | smlOutputPara

| | | |
|---|---|---|
| @PREFIX | ex: | <http://example.org> . |
| @PREFIX | sml: | <http:sml.org> . |
| sml:outputPara | rdf:Type | sml:outputParameter . |
| sml:outputPara | rdf:Type | ex:parkingLot. |
| sml:outputPara | require | ex:para1, ex:para2, ex:para3, ex:para4. |
| ex:para1 | rdf:Type | ex:parkingLotLocation . |
| ex:para2 | rdf:Type | ex:parkingLotRate . |
| ex:para3 | rdf:Type | ex:parkingLotStatus . |
| ex:para4 | rd:Type | ex:parkingLotURI. |
| sml:ouputPara | sml:hasName | "parkingLotAddr" . | smlFunction
For all resource members, find the resource member with minimum value of (0.5*./timecost+0.5./parkingcost)*./status; return the child resources of this resource member.

smlMemberSelectionCriteria

| | | |
|---|---|---|
| @PREFIX | ex: | <http://example.org> . |
| @PREFIX | sml: | <http:sml.org> . |
| sml:memberResource | rdf:Type | sml:memberResource . |
| sml:memberResource | rdf:Type | ex:parkingLot . |
| sml:memberResource | require | ex:para1, ex:para2, ex:para3, ex:para4 . |
| ex:para1 | rdfType | ex:parkingLotLocation . |
| ex:para2 | rdfType | ex:parkingLotRate . |
| ex:para3 | rdfType | ex:parkingLotStatus . |
| ex:para4 | rd:Type | ex:parkingLotURI . |
| sml:memberMetric | rdf:Type | sml:memberSelectionMetric . |
| sml:memberMetric | rdf:Type | ex:distance . |
| sml:memberMetric | hasValue | "1 Mile" . |

<Semantic Descriptor>

| | | |
|---|---|---|
| @PREFIX | ex: | <http://example.org> . |
| @PREFIX | sml: | <http:sml.org> . |
| Sml | rdf:Type | ex:"FindParkingLot" . |
| Sml | sml:hasName | "suitableParkingLot" . |
| sml:mashupMetric | rdf:Type | sml:mashupMetric . |
| sml:mashupMetric | hasValue | "jointOptimization" . |

FIG. 25

| | | |
|---|---|---|
| Line #1 | @PREFIX ex: | <http://example.org>. |
| Line #2 | @PREFIX smp: | <http://smp.org>. |
| Line #3 | smp:inputPara1 rdf:Type | smp:inputParemeter. |
| Line #4 | smp:inputPara1 smp:require | smp:para1, smp:para2. |
| Line #5 | smp:para1 rdf:Type | ex:geoLong. |
| Line #6 | smp:para2 rdf:Type | ex:geoLat. |
| Line #7 | smp:para1 hasValue | "-73.985833". |
| Line #8 | smp:para2 hasValue | "40.748417". |

FIG. 27

ENABLING SEMANTIC MASHUP IN INTERNET OF THINGS

CROSS-REFERENCE TO RELATED APPLICATIONS

This application claims the benefit of U.S. Provisional Patent Application No. 62/401,461, filed on Sep. 29, 2016, entitled "Methods For Enabling Semantic Mashup In M2M/IOT Service Layer," the contents of which are hereby incorporated by reference herein.

BACKGROUND

The Semantic Web is an extension of the Web through standards by the World Wide Web Consortium (W3C). The standards promote common data formats and exchange protocols on the Web, most fundamentally the Resource Description Framework (RDF).

The Semantic Web involves publishing in languages specifically designed for data: Resource Description Framework (RDF), Web Ontology Language (OWL), and Extensible Markup Language (XML). These technologies are combined to provide descriptions that supplement or replace the content of Web documents via web of linked data. Thus, content may manifest itself as descriptive data stored in Web-accessible databases, or as markup within documents, particularly, in Extensible HTML (XHTML) interspersed with XML, or, more often, purely in XML, with layout or rendering cues stored separately.

The Semantic Web Stack illustrates the architecture of the Semantic Web specified by W3C, as shown in FIG. 1. The functions and relationships of the components may be summarized as follows.

XML provides an elemental syntax for content structure within documents, yet associates no semantics with the meaning of the content contained within. XML is not at present a necessary component of Semantic Web technologies in most cases, as alternative syntaxes exist, such as Turtle. Turtle is the de facto standard but has not been through a formal standardization process.

XML Schema is a language for providing and restricting the structure and content of elements contained within XML documents.

RDF, described in a W3C Technology Stack Illustration, is a simple data model, which refers to objects ("web resources") and their relationships in the form of subject-predicate-object, e.g. S-P-O triple or RDF triple. An RDF-based model may be represented in a variety of syntaxes, e.g., RDF/XML, N3, Turtle, and RDFa. RDF is a fundamental standard of the Semantic Web.

RDF Graph is a directed graph where the edges represent the "predicate" of RDF triples while the graph nodes represent "subject" or "object" of RDF triples, In other words, the linking structure as described in RDF triples forms such a directed RDF Graph.

RDF Schema [RDF Schema 1.1] extends RDF and is a vocabulary for describing properties and classes of RDF-based resources, with semantics for generalized-hierarchies of such properties and classes.

OWL [OWL 2 Web Ontology Language Document Overview, http://www.w3.org/TR/owl-overview/] adds more vocabulary for describing properties and classes: among others, relations between classes (e.g. disjointness), cardinality (e.g. "exactly one"), equality, richer type of properties, characteristics of properties (e.g. symmetry), and enumerated classes.

SPARQL [SPARQL 1.1 Overview, http://www.w3.org/TR/sparql11-overview/] is a protocol and query language for semantic web data sources, to query and manipulate RDF graph content (e.g. RDF triples) on the Web or in an RDF store (e.g. a Semantic Graph Store).

SPARQL 1.1 Query, a query language for RDF graph, may be used to express queries across diverse data sources, whether the data is stored natively as RDF or viewed as RDF via middleware. SPARQL contains capabilities for querying required and optional graph patterns along with their conjunctions and disjunctions. SPARQL also supports aggregation, subqueries, negation, creating values by expressions, extensible value testing, and constraining queries by source RDF graph. The results of SPARQL queries may be result sets or RDF graphs.

SPARQL 1.1 Update, an update language for RDF graphs. It uses a syntax derived from the SPARQL Query Language for RDF. Update operations are performed on a collection of graphs in a Semantic Graph Store. Operations are provided to update, create, and remove RDF graphs in a Semantic Graph Store.

RIF is the W3C Rule Interchange Format. It's an XML language for expressing Web rules that computers can execute. RIF provides multiple versions, called dialects. It includes a RIF Basic Logic Dialect (RIF-BLD) and RIF Production Rules Dialect (RIF PRD).

Semantic Search seeks to improve search accuracy by understanding searcher intent and the contextual meaning of terms as they appear in the searchable dataspace, whether on the Web or within a closed system, to generate more relevant results. Semantic search systems consider various points including context of search, location, intent, and variation of words, synonyms, generalized and specialized queries, concept matching and natural language queries to provide relevant search results. Major web search engines like Google and Bing incorporate some elements of Semantic Search. Semantic Search uses semantics, or the science of meaning in language, to produce highly relevant search results. In most cases, the goal is to deliver the information queried by a user rather than have a user sort through a list of loosely related keyword results. For example, semantics may be used to enhance a record search or query in a hierarchical Relational Database.

Semantic Query allows for queries and analytics of associative and contextual nature. Semantic queries enable the retrieval of both explicitly and implicitly derived information based on syntactic, semantic and structural information contained in data. They are designed to deliver precise results (possibly the distinctive selection of one single piece of information) or to answer more fuzzy and wide open questions through pattern matching and digital reasoning.

Semantic queries work on named graphs, linked-data or triples. This enables the query to process the actual relationships between information and infer the answers from the network of data. This is in contrast to Semantic Search, which uses semantics (the science of meaning) in unstructured text to produce a better search result (e.g. Natural language processing).

From a technical point of view, semantic queries are precise relational-type operations much like a database query. They work on structured data and therefore have the possibility to utilize comprehensive features like operators (e.g. >, < and =), namespaces, pattern matching, subclassing, transitive relations, semantic rules and contextual full text search. The semantic web technology stack of W3C offers SPARQL to formulate semantic queries in a syntax similar to SQL. Semantic queries are used in triple stores, graph databases, semantic wikis, natural language, and artificial intelligence systems.

Another important aspect of semantic queries is that the type of the relationship may be used to incorporate intelligence into the system. The relationship between a customer and a product has a fundamentally different nature than the relationship between a neighborhood and its city. The latter enables the semantic query engine to infer that a customer living in Manhattan is also living in New York City whereas other relationships might have more complicated patterns and "contextual analytics". This process is called inference or reasoning and is the ability of the software to derive new information based on given facts.

The oneM2M functional architecture is specified in oneM2M-TS-0001 oneM2M Functional Architecture—V2.9.0 and its support of semantic functionalities. The oneM2M standard under development defines a Service Layer called "Common Service Entity (CSE)". The purpose of the Service Layer is to provide "horizontal" services that may be utilized by different "vertical" M2M systems and applications. The CSE supports four reference points as shown in FIG. 2. The Mca reference point interfaces with the Application Entity (AE). The Mcc reference point interfaces with another CSE within the same service provider domain and the Mcc' reference point interfaces with another CSE in a different service provider domain. The Mcn reference point interfaces with the underlying network service entity (NSE). An NSE provides underlying network services to the CSEs, such as device management, location services and device triggering.

CSE contains multiple logical functions called "Common Service Functions (CSFs)", such as "Discovery" and "Data Management & Repository". FIG. 3 illustrates some of the CSFs defined by oneM2M.

The oneM2M architecture enables the following types of Nodes as shown in FIG. 2. Application Service Node (ASN): An ASN is a Node that contains one CSE and contains at least one Application Entity (AE). Example of physical mapping: an ASN could reside in an M2M Device. Application Dedicated Node (ADN): An ADN is a Node that contains at least one AE and does not contain a CSE. There may be zero or more ADNs in the Field Domain of the oneM2M System. Example of physical mapping: an Application Dedicated Node could reside in a constrained M2M Device. Middle Node (MN): A MN is a Node that contains one CSE and contains zero or more AEs. There may be zero or more MNs in the Field Domain of the oneM2M System. Example of physical mapping: a MN could reside in an M2M Gateway. Infrastructure Node (IN): An IN is a Node that contains one CSE and contains zero or more AEs. There is exactly one IN in the Infrastructure Domain per oneM2M Service Provider. A CSE in an IN may contain CSE functions not applicable to other node types. Example of physical mapping: an IN could reside in an M2M Service Infrastructure. Non-oneM2M Node (NoDN): A non-oneM2M Node is a Node that does not contain oneM2M Entities (neither AEs nor CSEs). Such Nodes represent devices attached to the oneM2M system for interworking purposes, including management.

The <semanticDescriptor> resource as shown in FIG. 4 may be used to store a semantic description pertaining to a resource and potentially sub-resources. Such a description may be provided according to ontologies. The semantic information may be used by the semantic functionalities of the oneM2M system and is also available to applications or CSEs.

The <semanticDescriptor> resource shall contain the attributes specified in Table A.

TABLE A

Some Important Attributes of <semanticDescriptor> Resource

| Attributes of <semanticDescriptor> | Multiplicity | RW/ RO/ WO | Description |
| --- | --- | --- | --- |
| descriptorRepresentation | 1 | RW | Indicates the type used for the serialization of the descriptor attribute, e.g. RDF serialized in XML. |
| semanticOpExec | 0 . . . 1 | RW | This attribute cannot be retrieved. Contains a SPARQL query request for execution of semantic operations on the descriptor attribute e.g. SPARQL update as described in oneM2M TS-0004. |
| descriptor | 1 | RW | Stores a semantic description pertaining to a resource and potentially sub-resources. Such a description shall be according to subject-predicate-object triples as defined in the RDF graph-based data model (see W3C RDF 1.1). The semantic description may be fully and partially updated by an Originator. The elements of such triples may be provided according to ontologies. Examples of such descriptors in RDF may be found in oneM2M TR-0007. |
| ontologyRef | 0 . . . 1 | WO | A reference (URI) of the ontology used to represent the information that is stored in the descriptor attribute. If this attribute is not present, the ontologyRef from the parent resource may be used if present. |
| relatedSemantics | 0 . . . 1 (L) | WO | List of URIs for resources containing related semantic information to be used in processing semantic queries. The URI(s) may reference either a <group> resource or other <semanticDescriptor> resources. |

TABLE A-continued

Some Important Attributes of <semanticDescriptor> Resource

| Attributes of <semanticDescriptor> | Multiplicity | RW/ RO/ WO | Description |
| --- | --- | --- | --- |
| accessControlPolicyIDs | 0 . . . 1 (L) | RW | The attribute contains a list of identifiers of an <accessControlPolicy> resource. The privileges defined in the <accessControlPolicy> resource that are referenced determine who is allowed to access the resource containing this attribute for a specific purpose (e.g. Retrieve, Update, Delete, etc.). |

Also, The <semanticDescriptor> resource shall contain the <subscription> child resource, which contains subscription information for its subscribed-to resource.

Generic filtering is supported by having filter criteria specified in a request operation (oneM2M-TS-0001 oneM2M Functional Architecture—V2.9.0 section 8.1.2). In order to provide for semantic filtering, an additional value for the request operation filter criteria has been described in oneM2M TR-0007-Study_on_Abstraction_and_Semantics_Enablement-V2.11.1 section 8.5.4, with the definition shown in the table below. Multiple instances may be used, which according to the general rules for evaluating filter criteria, means that an "OR" semantics applies, e.g. the overall result for the semantics filter criteria is true if one or more of the semantic filters matches the semantic description. Note that semantics in the table below is defined in oneM2M TR-0007 and it corresponds to request parameter semanticFilter in oneM2M TS-0001. When the SPAQRL query contained in the semanticFilter parameter matches semantic triples in one of child resource <semanticDescriptor>s of a parent resource, it means this semantic filtering is successful and corresponding parent resource will be returned.

TABLE B semantics Filter Criteria [TR-0007]

| semantics | 0 . . . n | The semantic description contained in one of the <semanticDescriptor> child resources matches the specified semantic filter. |
| --- | --- | --- |

The proposal above uses the following assumptions: the semantic descriptions are specified as RDF triples (representation, e.g. RDF/XML, Turtle, description format had not been fully specified in oneM2M yet); the semantics filter criteria will be used for SPARQL requests to be executed on semantic descriptions.

Below is a semantic filtering example giving in oneM2M TR-0007.

Example 1: Filter for AE Resources Representing Devices that Measure Temperature

| Semantic Descriptor of Device 1 AE | | |
| --- | --- | --- |
| my:MyDevice1 | rdf:type | base:Device |
| my:MyDevice 1 | base:hasService | my:MyService1 |
| my:MyService1 | base:hasFunctionality | my:MyFunctionality 1 |
| my:MyFunctionality 1 | rdf:type | base:Measuring |
| my:MyFunctionality 1 | base:refersTo | my:MyAspect1 |
| my:myAspect1 | rdf:type | aspect:Temperature |

-continued

| Semantic Descriptor of Device 2 AE | | |
| --- | --- | --- |
| my:MyDevice2 | rdf:type | base:Device |
| my:MyDevice2 | base:hasService | my:MyService2 |
| my:MyService2 | base:hasFunctionality | my:myFunctionality2 |
| my:myFunctionality2 | rdf:type | base:Controlling |
| my:myFunctionality2 | base:refersTo | my:myAspect2 |
| my:myAspect2 | rdf:type | aspect:Temperature |

SPARQL Request 1

SELECT ?device
    WHERE { ?device rdf:type base:Device .
        ?device base:hasService ?service .
        ?service base:hasFunctionality ?functionality .
        ?functionality rdf:type base:Measuring .
        ?functionality base:refersTo ?aspect .
        ?aspect rdf:type instance:Temperature }
SPARQL Execution Results (On Device1 semantic description) --> my:myDevice1
(On Device 2 semantic description) --> empty This means that the AE resource that is described by my:myDevice1 will be included in the result set, whereas the AE resource described by my:myDevice2 will not be included.

In some cases the relevant semantic information for a single search may be distributed among different <semanticDescriptor> resources. The example provided in FIG. 5 illustrates this case. The semantic graph representing subject-predicate-object relations is shown, with different parts of this graph (represented by ovals) being stored in different <semanticDescriptor> resources. Semantic filtering needs to be applied to (parts of) the complete semantic graph, which raises the problem that several different parts of the graph have to be put together for the execution of the semantic operation.

This problem is not generally apparent in the realm of the Semantic Web, since the URI identifying class instances may be directly de-referenced so the concept (e.g. class, relationship) information may be found based on its URI. In the oneM2M case, only resources that may be accessed and semantics are stored as resource content.

Currently SPARQL 1.1, supports federated queries using the SERVICE keyword, where the URL of a remote SPARQL endpoint may be specified. For this approach, a requestor would a-priori know which semantic descriptors contain the semantic instances required for the search, making this approach not generally applicable when the semantic descriptors are distributed in resource trees.

A solution for enabling semantic filtering on semantic descriptions stored across <semanticDescriptor> resources presented in TR-0007 introduces an annotation link in the form of a resourceDescriptorLink OWL annotation property. This annotation property may be specified for any class instance and its value is the URL of a <semanticDescriptor> resource, where additional RDF triples for the given class instance may be found. The following example uses the classes and relationships defined in the oneM2M Base Ontology (FIG. 6) in order to create the graphs in FIG. 7.

This solution entails the following functional flow for the SPARQL-based semantic filtering engine at the receiver. The semantic filter formulated as a SPARQL request is executed on the content of the semantic descriptor resource of the candidate resource. If in the course of the execution a class instance with one or more resourceDescriptorLink annotations is encountered, the execution is halted. The content of each of the <semanticDescriptor> resources the semanticDescriptorLink references is added to the content on which the SPARQL request is being executed (lazy evaluation, alternative: fetch everything before execution, but may result in fetching unnecessary information). The execution of the SPARQL request is continued on the enlarged content oneM2M TR-0007 defines semantic mashup as "In the Semantic M2M System, an M2M application can publish "virtual things" that act similar to physical resources and provide new information such as: number of vehicles that passed during the last minute/hour, average speed of vehicles, etc." A simple semantic virtual mashup procedure has been defined in TR-0007, which is shown below in FIG. 8.

Basically, these "virtual things" may be searched and discovered in the M2M System in the same way as other M2M resources. However, in contrast to the physical things, virtual things are only implemented as software. When a new virtual thing is registered (or published) to the Semantic M2M system, a list of member M2M resources is stored together as an attribute of the thing. If the virtual thing collects information dynamically at the time of receiving a query, a pre-programmed query that collects member resources is also stored along with other information. Once a virtual thing is added to the IN-CSE, it is handled and processed the same as all other M2M resources. This means that virtual things are exposed to M2M applications to be discovered.

In step 1 of FIG. 8, M2M application sends a semantic query to the Semantic M2M system, for example, "Get the temperature of room 1".

In step 2 of FIG. 8, semantic engine handles this like a normal semantic query and sends a discovery request to the IN-CSE.

In step 3 of FIG. 8, the IN-CSE returns the URI of a virtual thing that provides the temperature of room 1.

In step 4 of FIG. 8, semantic engine sends a request to the IN-CSE to retrieve the information of the virtual thing, e.g. service logic, mashup type (either static or dynamic) and pre-programmed queries.

In step 5 of FIG. 8, the IN-CSE returns the requested information.

In step 6 of FIG. 8, semantic engine instantiates the virtual thing. For a virtual thing that is frequently requested, it may be cached in semantic engine and handles the request directly.

In step 7 of FIG. 8, the virtual thing at semantic engine collects required data from its member resources using the pre-programmed query.

In step 8 of FIG. 8, the IN-CSE returns the results from member resources.

In step 9 of FIG. 8, the virtual thing applies its service logic (e.g. calculating the average value) to the received data and calculates the results.

As shown in FIG. 9, the basic Open Interconnect Consortium (OIC) architecture [OIC Specification 1.1, https://openconnectivity.org/resources/specifications/draft-candidate-specifications] includes OIC Servers and OIC Clients. An OIC Server, which is considered as a resource provider, hosts OIC Resources, while an OIC client is a resource consumer, which accesses and manipulates resources hosted at the OIC Server. The resources are manipulated based on Request/Response model, which included five types of operations, e.g., Create, Retrieve, Update, Delete, and Notify (CRUDN operations); note that CRUDN will be finally mapped into PUT/GET/POST/DELETE operations in messaging protocols (e.g., CoAP, HTTP, etc.). Basically, an OIC Client sends a RESTful request (e.g. Create, Retrieve, Update, Delete, and Notify) targeting a resource at the OIC Server; then the OIC Server will process the RESTful request and send a corresponding response to the OIC Client. OIC specification has defined different types of resources; each type of resources may have multiple Properties; each Property may be read-only or read-write. Some common Properties (which are specified in the OIC standard) are described as follows.

Resource Type ("rt"): Stands for the type of a resource. A particular resource may belong to multiple resource types and this Property may have multiple values.

Interface ("if"): Stands for the Interfaces supported by a resource. An Interface describes and specifies how the resource and the Properties shall be accessed. This Property may have multiple values. OIC specification defines the following Interfaces. A particular resource could support one or all those Interfaces.

Baseline Interface ("oic.if baseline"): All Properties (e.g. the full representations) of a resource may be accessed via this interface using RETRIEVE (e.g., the GET operation-Normally, RETRIEVE is mapped into GET operation in the messaging protocol (e.g., CoAP and HTTP). Thus, GET is used to implement the RETRIEVE operation.) and UPDATE. For example. As shown in FIG. 10, an OIC client can send a resource retrieval request (e.g., GET/My/room/1?if=oic.ifbaseline) to an OIC Server to obtain all the Properties of the OIC resource (which is identified by the URI of "/My/room/1").

Link List Interface ("oic.if.ll"): This interface provides a view (using RETRIEVE) into links contained in an OIC Collection resource, which is a resource type defined in OIC. A Collection resource basically contains multiple other resources (referred to as links). This interface may be used to discover resources hosted on an OIC Server. FIG. 11 gives one example for an OIC Client to send a resource retrieval request (e.g., GET/My/room/1?if=oic.if.ll) to an OIC Server to obtain the list of links/resource contained in a Collection resource (which is identified by the URI of "/My/room/1").

Actuator Interface ("oic.if a"): This interface allows to read or write an OIC actuator resource. FIG. 12 gives one example of how an OIC Client operates on an OIC Server, which is a type of actuator. Specifically, if the OIC Client tries to obtain the representations of the actuator (e.g., RETRIEVE operation), it may send a resource retrieval request (e.g., GET/the/light/2?if="oic.if a") to the actuator to retrieve its representations. If the OIC Client tries to change one of the actuator's representations, it may send the resource update request (e.g., PUT/the/light/2?if="oic.if.a"{"color": "blue"}) to the actuator.

Sensor Interface ("oic.if.b"): This interface allows to only read an OIC sensor resource. FIG. 13 gives one example of how an OIC Client can retrieve the representations of an OIC Server, which acts as a sensor. Specifically, if the OIC Client tries to obtain the representations of the sensor, it may send a resource retrieval request (e.g., GET/the/light/ 1?if="oic.if.s") to the sensor to retrieve its representations. Note that, if the OIC Client tries to modify one of the sensor's representations, the sensor shall return an error message.

Batch Interface ("oic.if.b"): This interface allows to operate (RETRIEVE and UPDATE) to all links or resources contained in an OIC Collection resource by simultaneously using one RETRIEVE or one UPDATE request to each resource/link contained in the Collection resource. FIG. 14 gives one example of how an OIC Client retrieves different resources (hosted by different OIC Servers) by applying the Batch Interface. Specifically, the OIC Client may send the resource retrieval request (e.g., GET My/room/1?if=oic.if.b) to OIC Device1 (e.g., a gateway, which can act as an OIC server or an OIC client in different scenarios). Consequently, OIC Device1 generates two resource retrieval requests (e.g., GET the/light/1?if=oic.if.s and GET the/light/2?if=oic.if.a), which are corresponding to OIC Device1's two resources/ links in the Collection resource. These two resource retrieval requests shall send to the different OIC Servers (e.g., OIC Server2 and OIC Server3) to retrieve their representations. After receiving all the results, the OIC Device1 shall send the aggregated results to the OIC Client to respond its resource retrieval request.

Read-Only Interface ("oic.if.r"): This interface allows to only RETRIEVE all "read-only" Properties of a resource.

Read-Write Interface ("oic.if.rw"): This interface allows to RETRIEVE or UPDATE all "read-write" Properties of a resource.

Name ("n"): Stands for a human-readable name assigned to a resource. Resource Identity ("id"): Stands for an identifier of a resource instance which shall be unique across the OIC Server which hosts the resource.

SUMMARY

This disclosure describes methods to enable semantic mashup services in IoT (e.g., M2M) which may provide improved reusability, interoperability, and system efficiency.

Disclosed herein is a semantic mashup architecture with modular design, which may include separate Semantic Mashup Profiles (SMPs), Virtual Semantic Mashup Resources (VSMRs), or Semantic Mashup Results (SMRSs). This kind of modular design may improve the reusability of SMPs, VSMRs, and SMRSs. In addition, this mashup architecture leverages semantics during each mashup process, which increases the interoperability. Moreover, this architecture may realize new Semantic Mashup Service (SMS) at the service layer and consequently improve system efficiency.

Disclosed herein are features and procedures for SMP discovery and retrieval. The representations of an SMP may be described using semantic data models (e.g., RDF triples) and it may be semantically be discovered and understood with improved interoperability.

Disclosed herein are features and procedures for creating VSMRs. A VSMR links to a corresponding SMP and may leverage semantic discovery to find appropriate mashup members. VSMR supports flexible approaches for organizing its mashup members, generating SMRS, and storing SMRS.

Disclosed herein are features and procedures for VSMR discovery and retrieval including SMRS retrieval. VSMR may be discovered and re-used based on its semantic information, which may increase the interoperability and the reusability.

Disclosed herein are features and procedures for VSMR maintenance where several approaches may be designed to maintain the synchronization between VSMR's mashup members and their corresponding original resources.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with accompanying drawings wherein:

FIG. 25 illustrates an exemplary diagram of one example of an SMP's representations

FIG. 27 illustrates an exemplary diagram of one example of applying RDF triples to represent input parameters.

DETAILED DESCRIPTION

Figure 1:
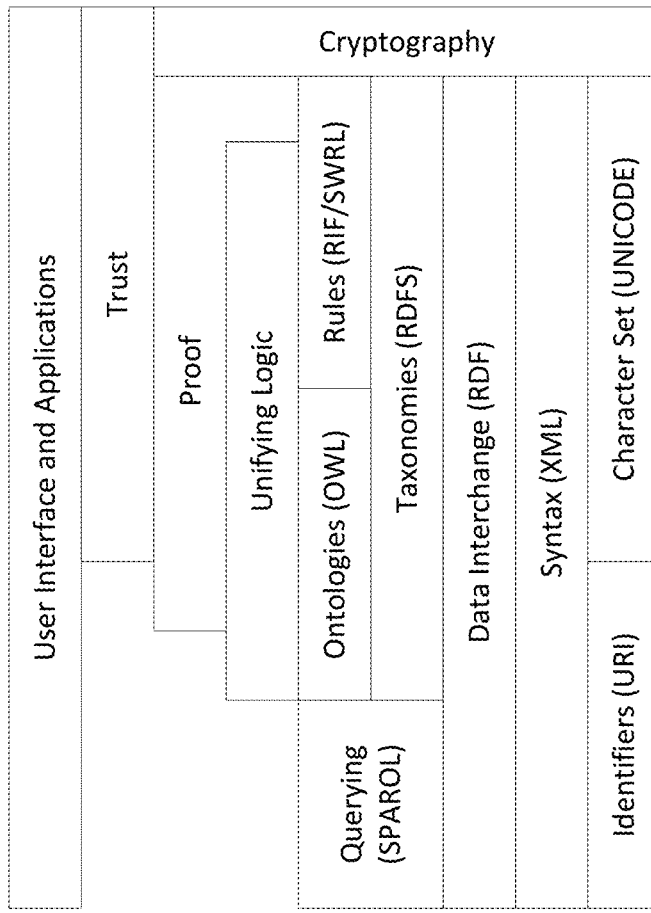
FIG. 1 illustrates an architecture of the semantic web.
Figure 2:
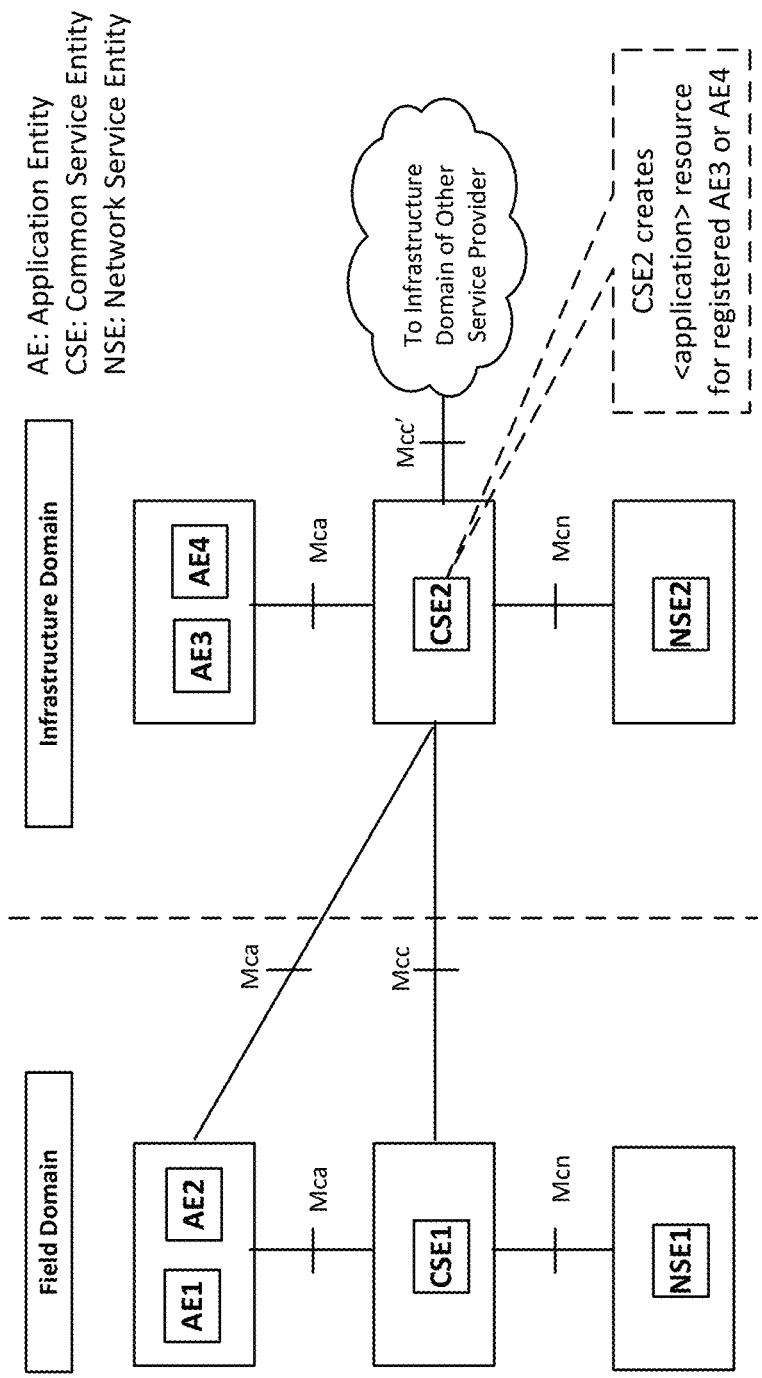
FIG. 2 illustrates a diagram of oneM2M Architecture.
Figure 3:
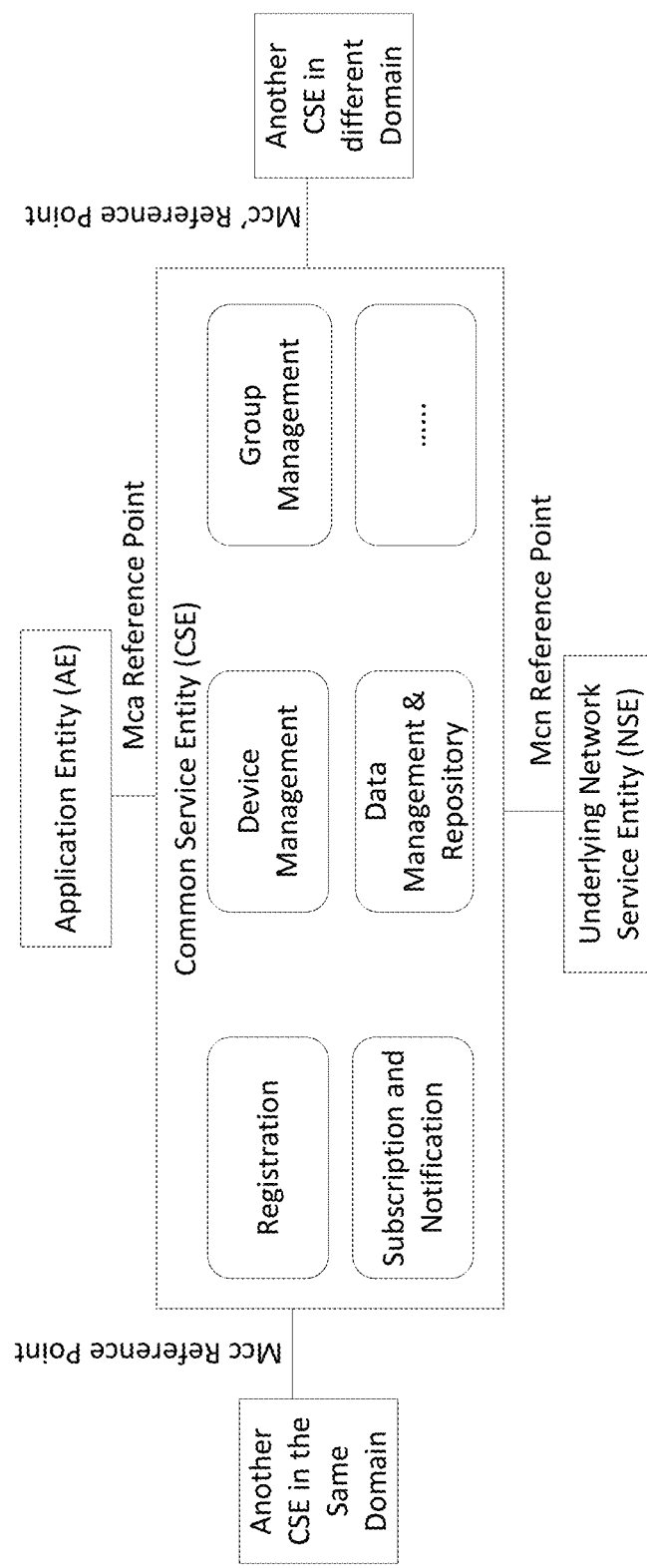
FIG. 3 illustrates a diagram of oneM2M Common Service Functions.
Figure 4:
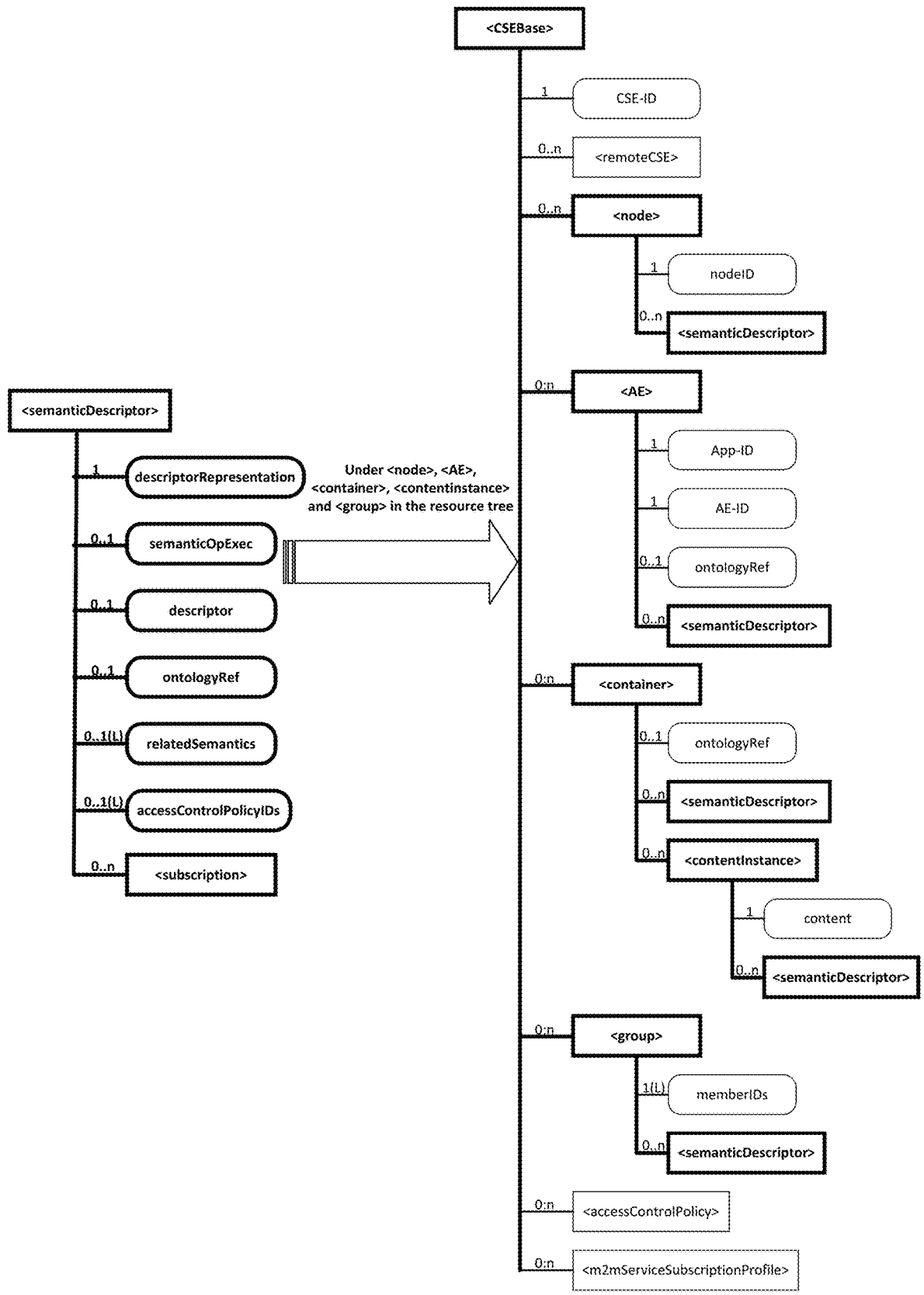
FIG. 4 illustrates a diagram of a structure of a <semanticDescriptor> resource in a resource tree.
Figure 5:
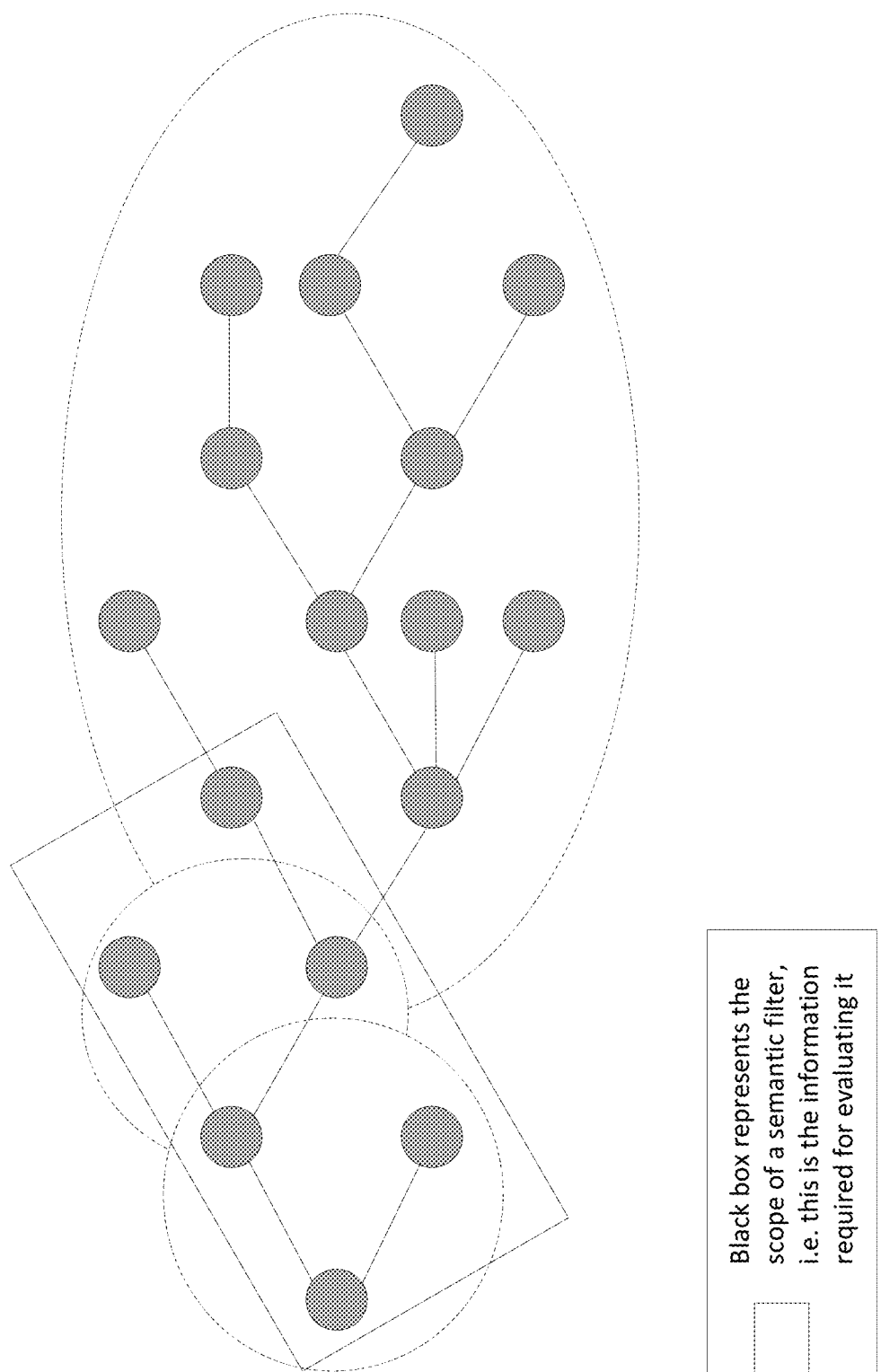
FIG. 5 illustrates a diagram of the scope of semantic filter across semantic information stored in different resources.
Figure 6:
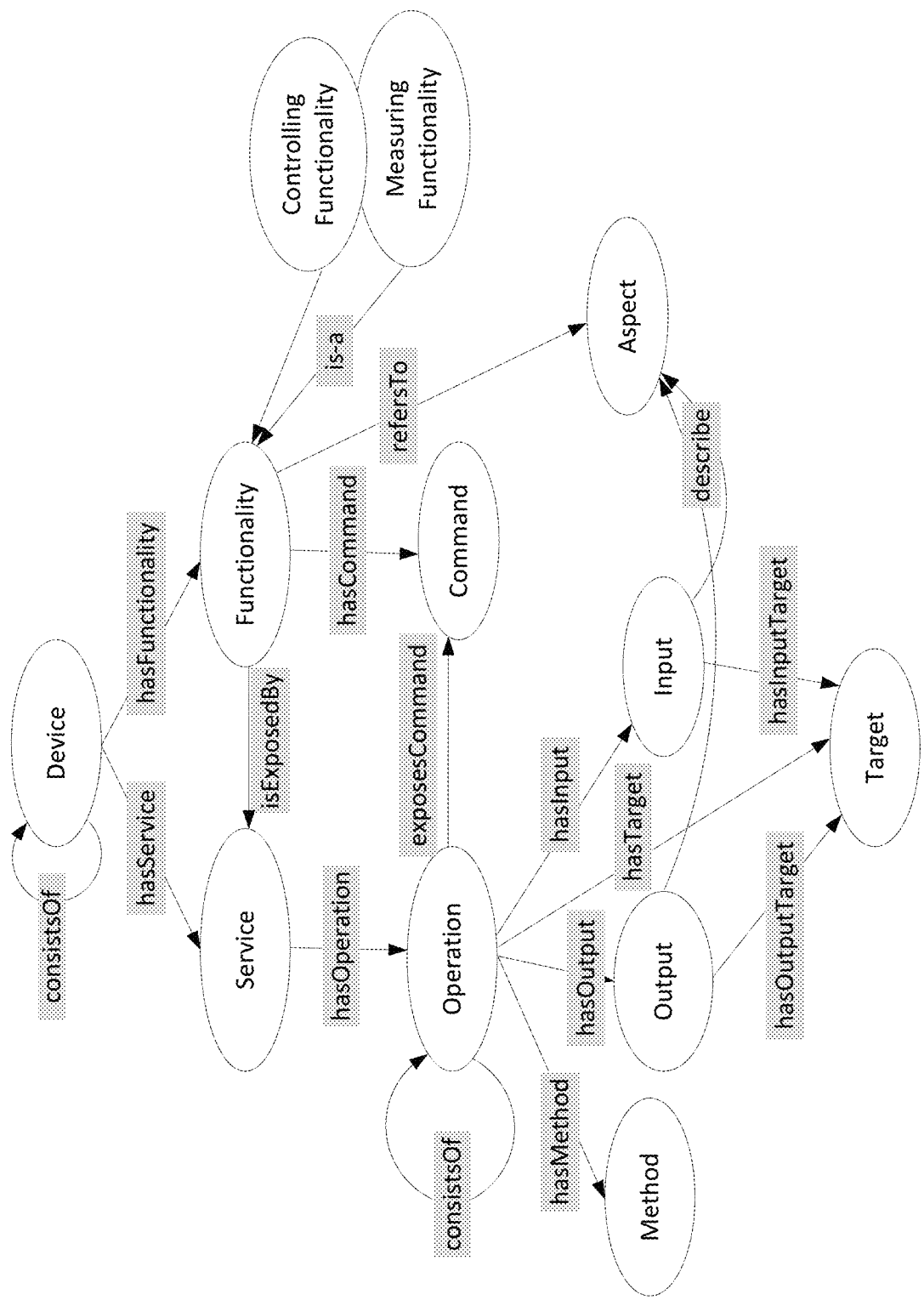
FIG. 6 illustrates a diagram of a oneM2M base ontology.
Figure 7:
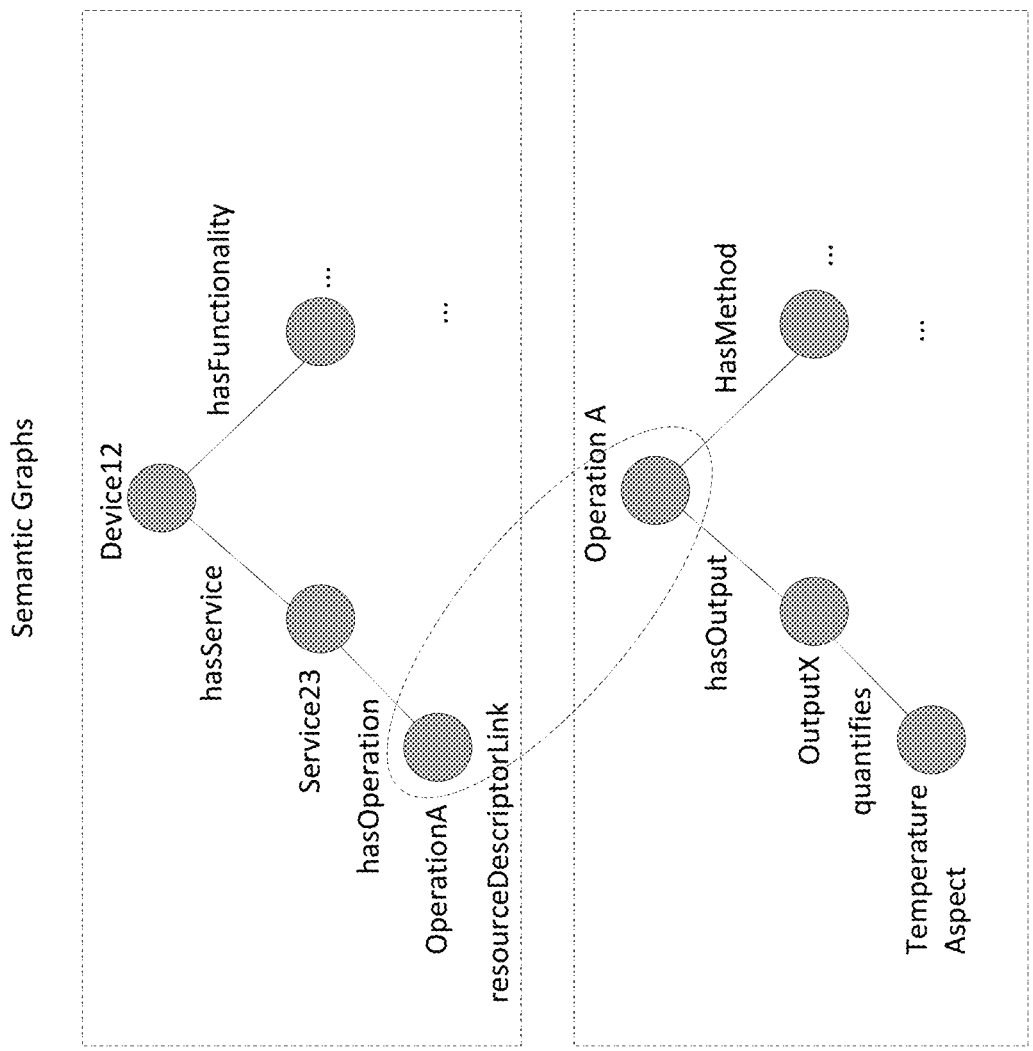
FIG. 7 illustrates a diagram of a usage example of resourceDescriptionLink.
Figure 8:
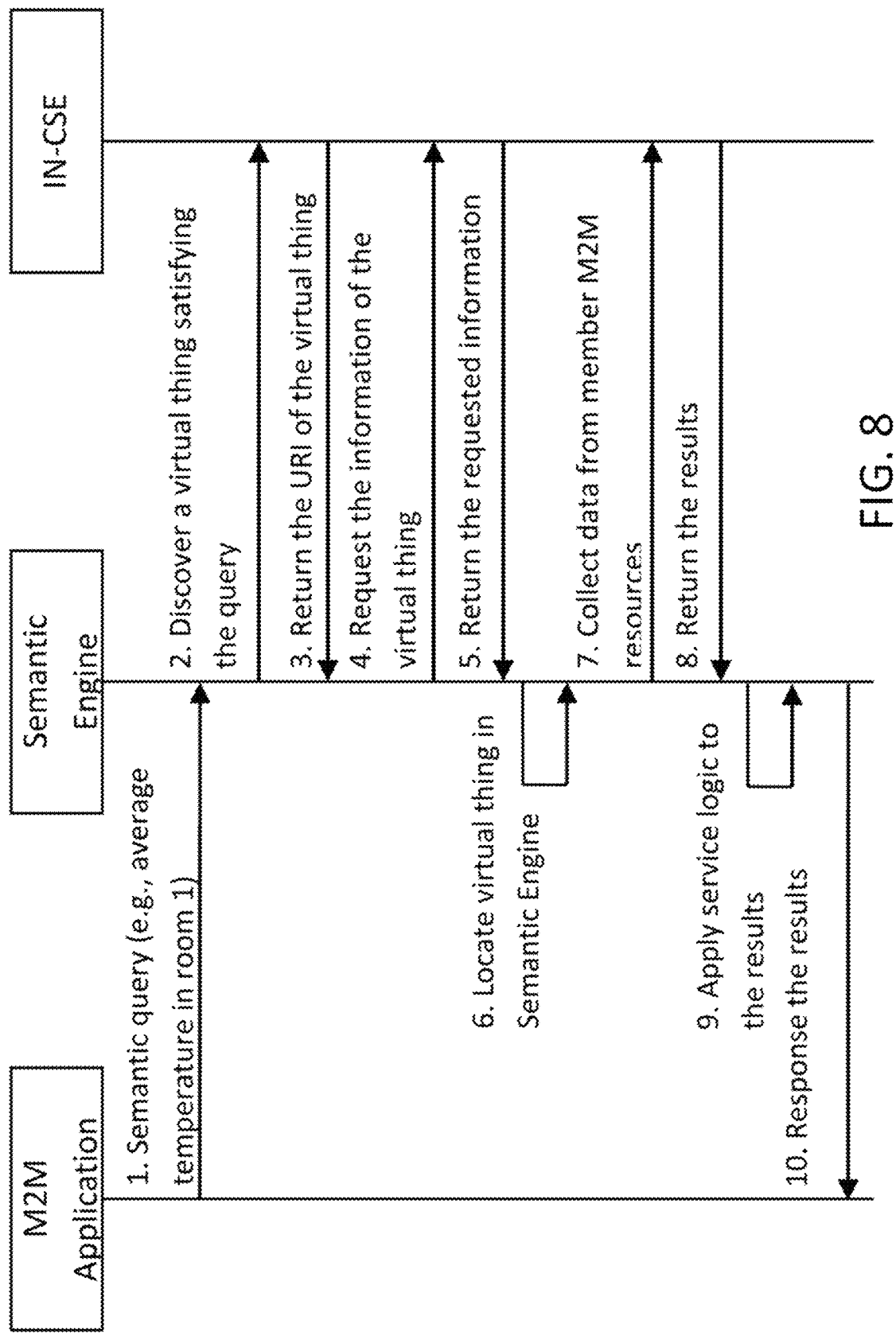
FIG. 8 illustrates a diagram of a semantic virtual mashup procedure.
Figure 9:
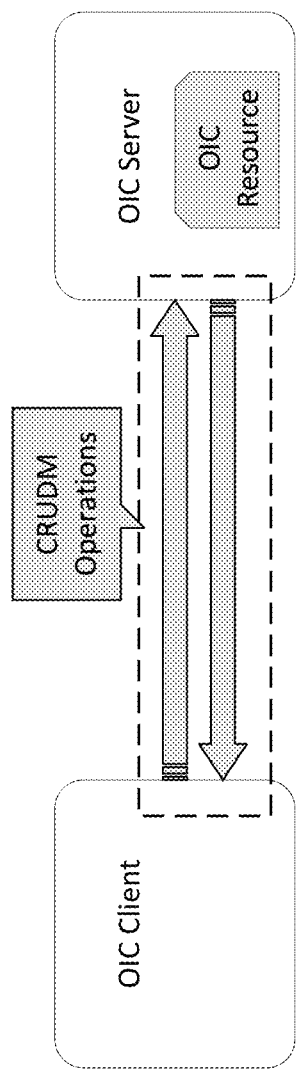
FIG. 9 illustrates a diagram of an OIC architecture.
Figure 10:
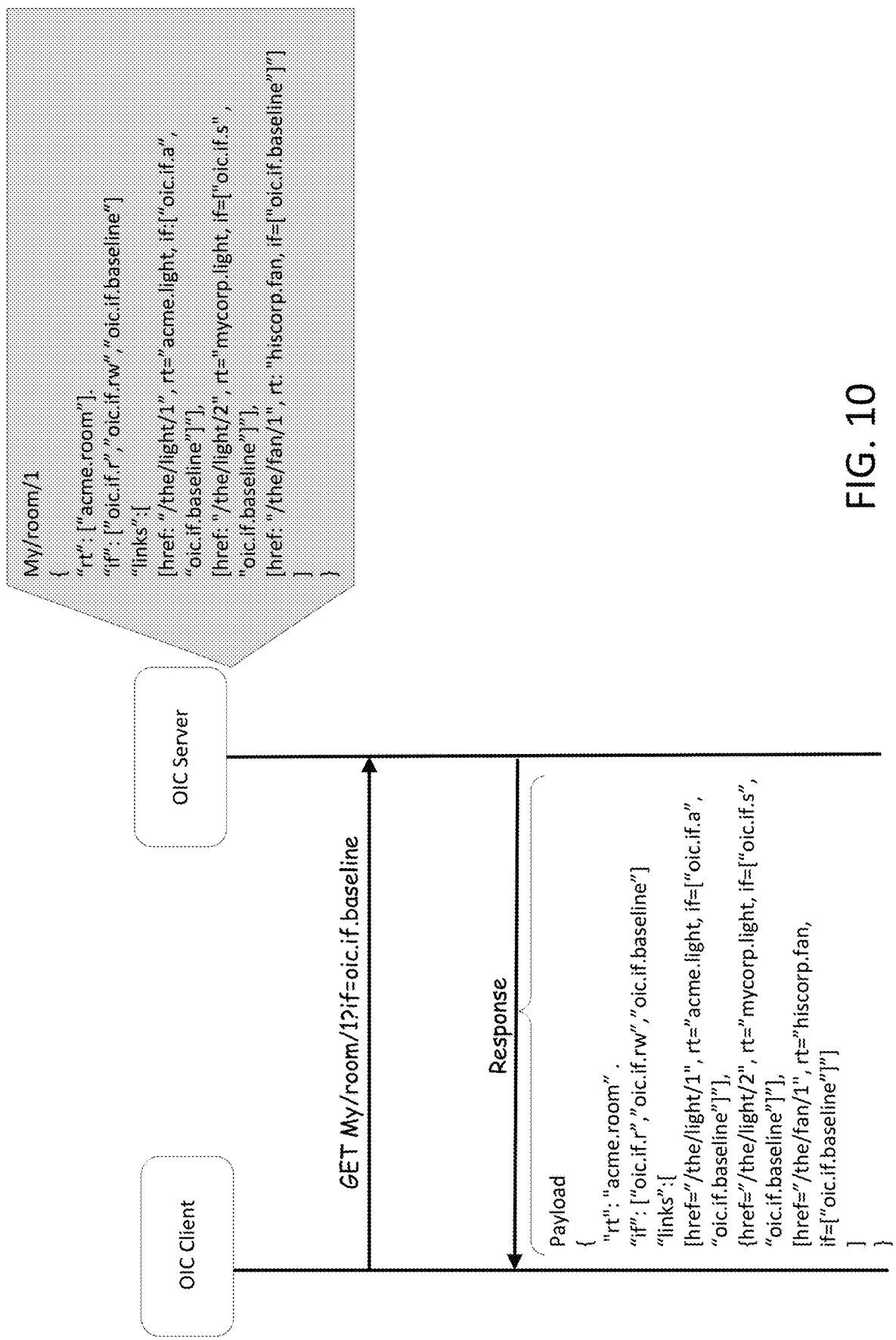
FIG. 10 illustrates a diagram of one example of using baseline interface to obtain an OIC resource's properties.
Figure 11:
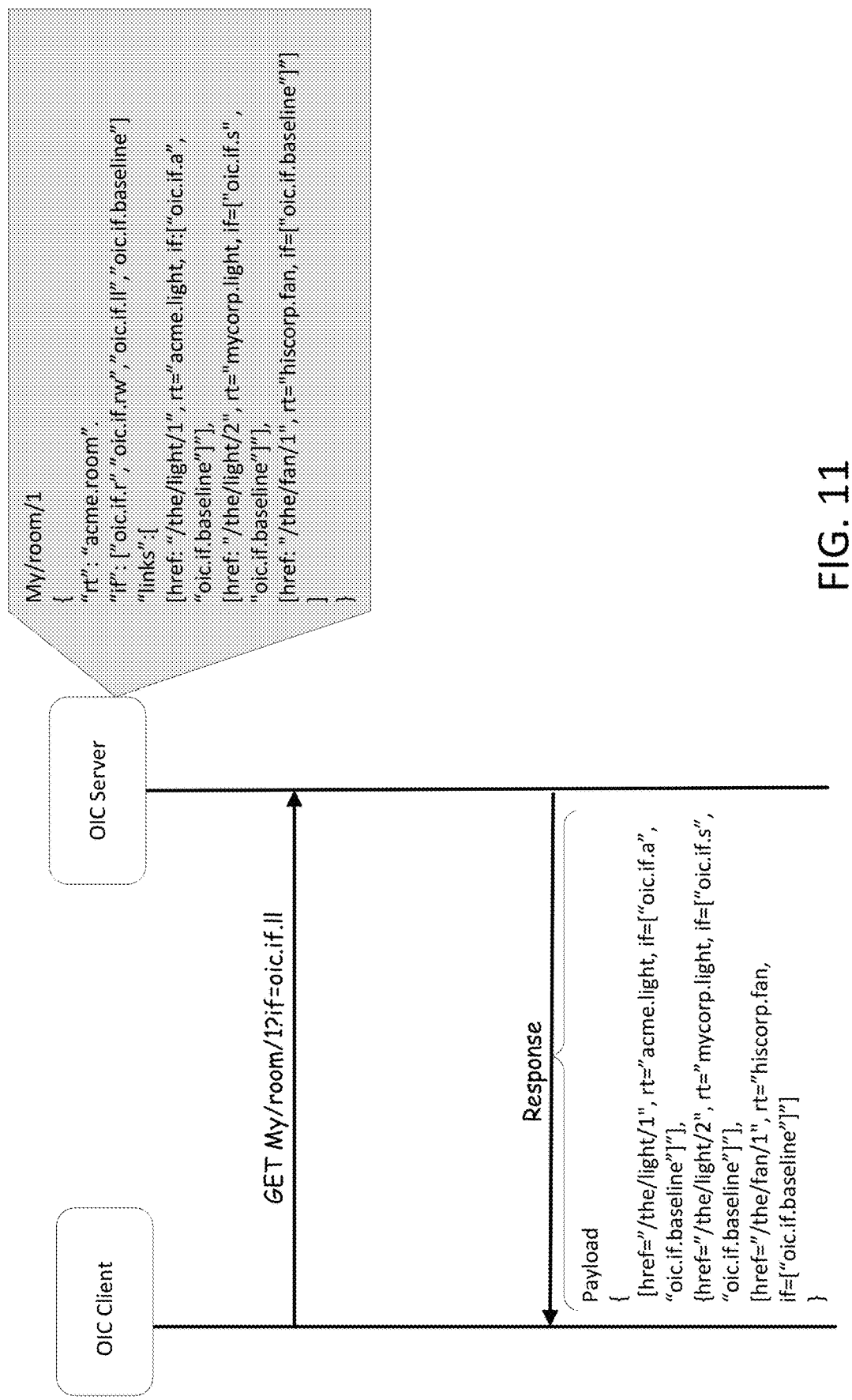
FIG. 11 illustrates a diagram of one example of using link list interface to obtain links in an OIC collection resource.
Figure 12:
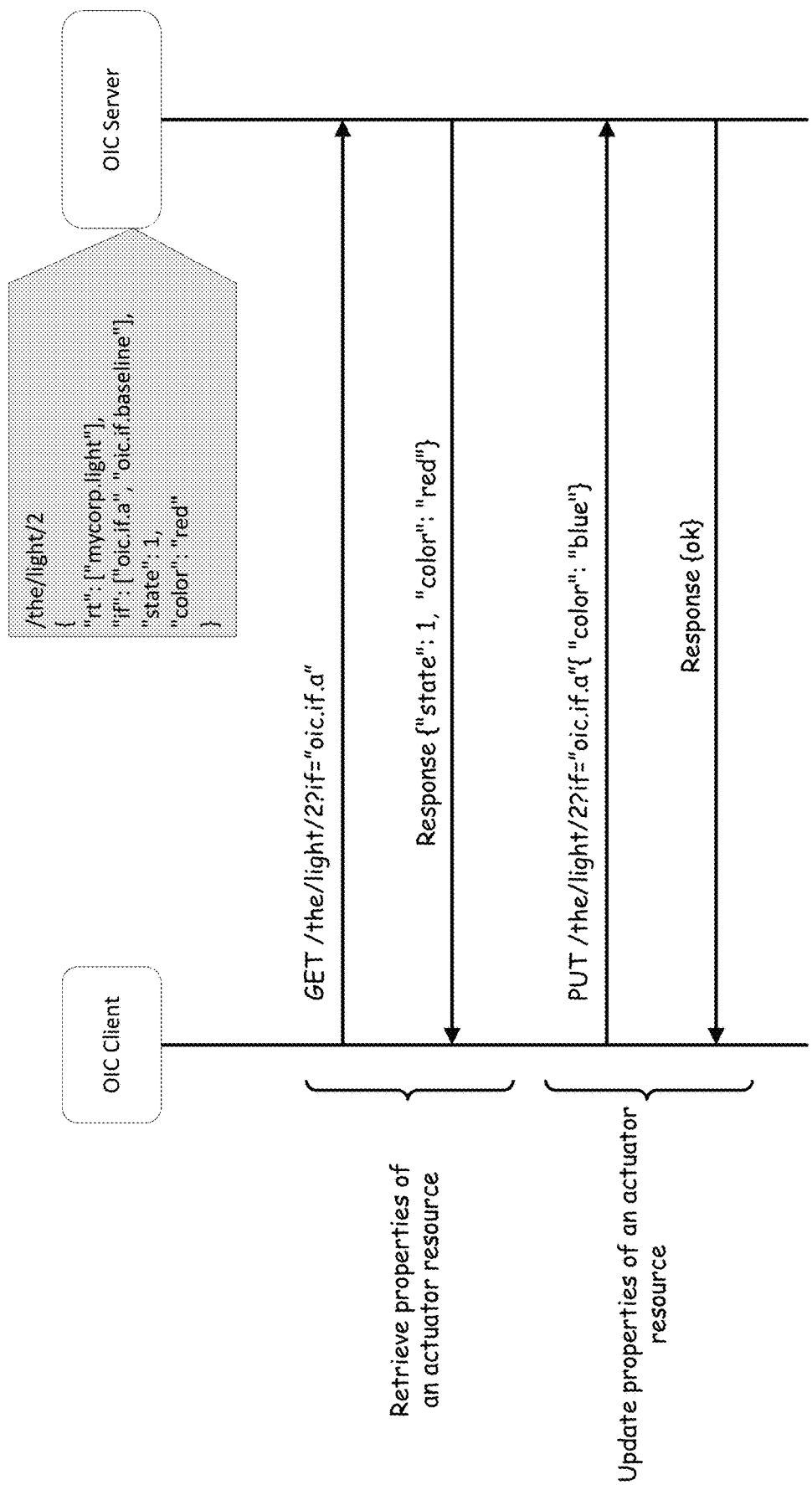
FIG. 12 illustrates a diagram of one example of using actuator interface to operate on an OIC actuator resource.
Figure 13:
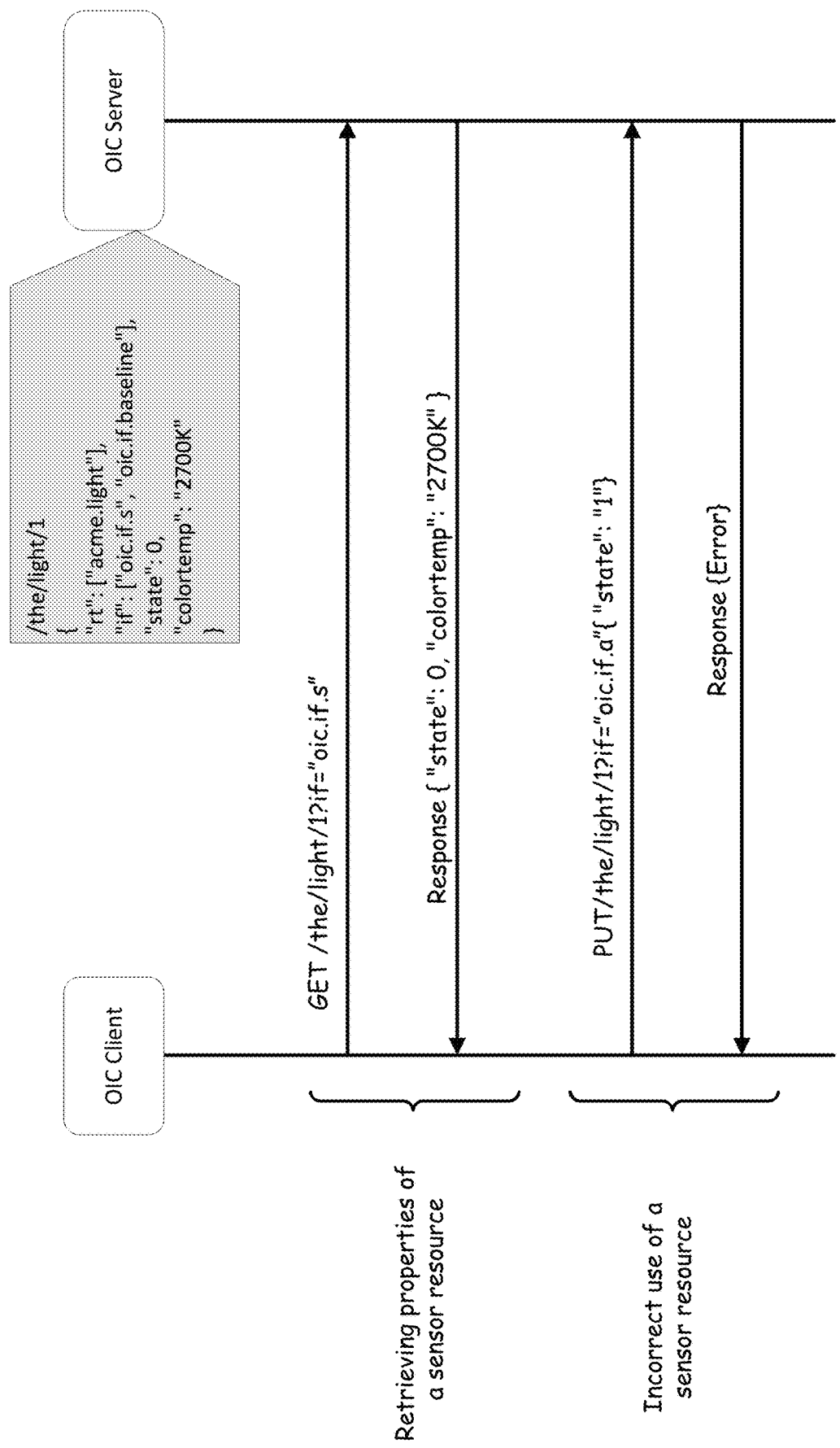
FIG. 13 illustrates a diagram of one example of applying a sensor interface to operate on an OIC sensor.
Figure 14:
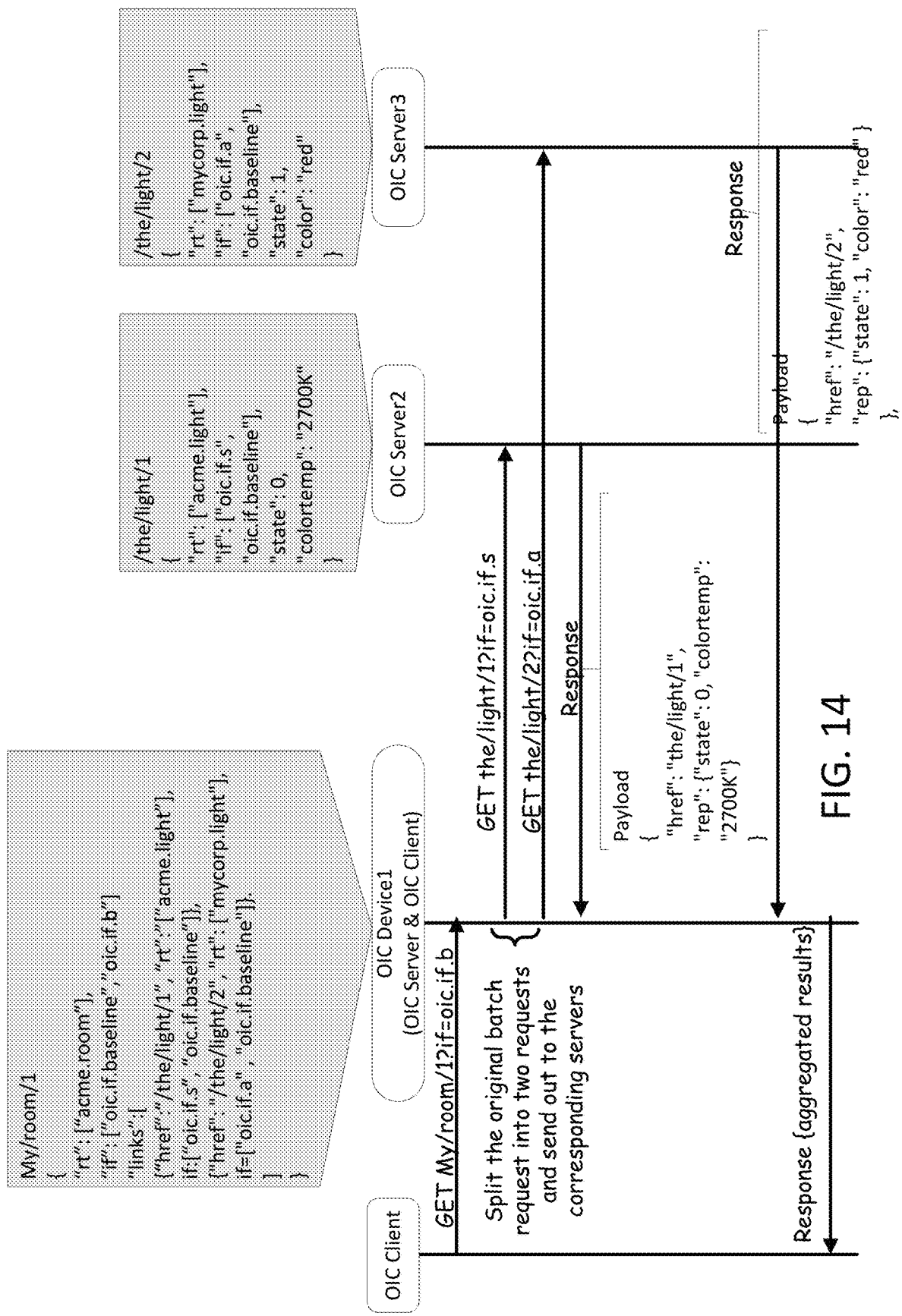
FIG. 14 illustrates a diagram of one example of using batch interface to operate an OIC collection resource.
Figure 15:
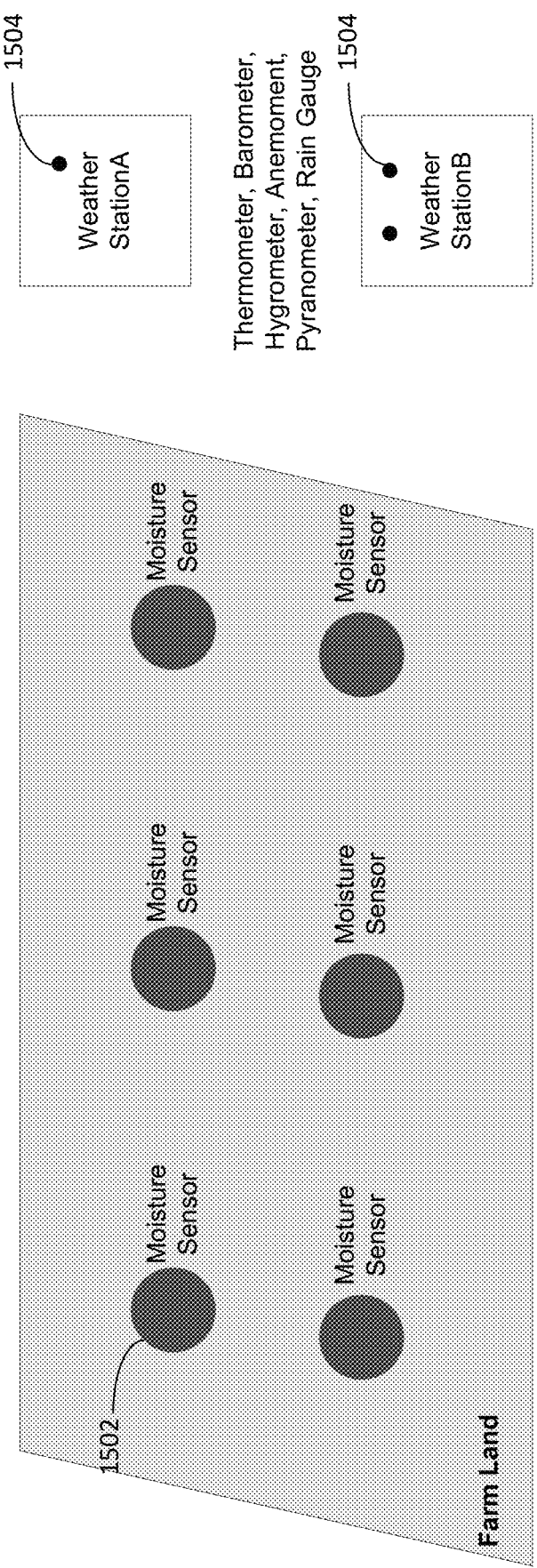
FIG. 15 illustrates an exemplary diagram of a smart farming use case.

Use cases are introduced below. These use cased help provide a perspective that applications in IoT (e.g., M2M) may be beneficially designed to obtain deduced information or knowledge, which may be obtained by mashing up original resources. The below IoT (e.g., M2M) use cases (e.g., Smart Farming, Smart Parking, etc.) demonstrate that obtaining original resources alone is not preferred. In the smart farm application scenario, as shown in FIG. 15, many moisture sensors 1502 are deployed in the farmland to monitor the moisture level of the soil. In the meantime, weather sensors 1504 (e.g., thermometers, barometers, hygrometer, etc.) are deployed at weather stations in the farmland area. The amount of data generated by weather sensors 1504 are used by weather stations to predict the weather (e.g., raining, windy, or sunny) in the farmland area. Thus, the intelligent irrigation system of the farmland would jointly analyze the moisture degree of the farmland (generated by the moisture sensors) and weather forecast results (generated by the different kinds of sensors deployed by the weather stations) to determine whether to irrigate the farmland and how much water is needed for the irrigation. However, the owner of the farmland who owns and may freely access moisture sensors, does not own weather stations (e.g. Weather StationA and StationB in FIG. 15); this makes it impractical for the owner of the farmland to make the irrigation decision. As a result, new services or functionalities, which may access data from both moisture sensors 1502 and weather sensors 1504 and generate intelligent irrigation decisions, need to be provided for the owner of the farmland.

Figure 16:
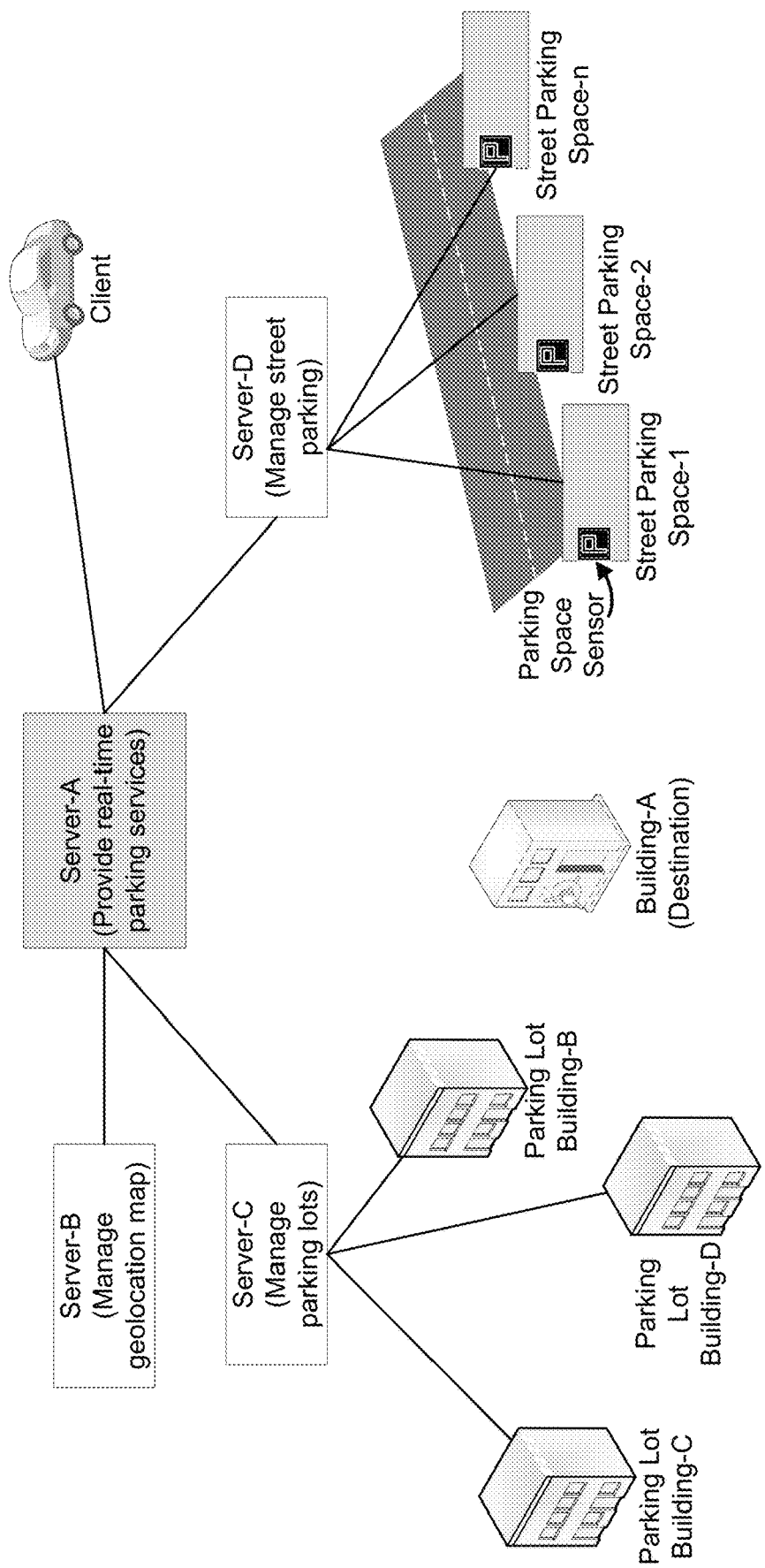
FIG. 16 illustrates an exemplary diagram of a smart parking use case.

In a smart parking use case, smart parking may be a major application in a smart city. In the smart city, each parking spot (e.g. inside parking lot buildings and any street parking spot) may be equipped with a parking sensor. The parking sensor may provide the status (e.g., empty or not), the geographic location, as well as the parking rate of its associated parking spot. FIG. 16 illustrates an exemplary smart parking system. Server-A may calculate suitable parking spots for Client based on the Client's destination address and information from Server-B, Server-C, and Server-D. Server-B may provide the time cost estimation from one geolocation to another (by walk, by bicycle, or by car). Server-C may provide the location information of the parking lot building, the parking rate in different time periods, as well as the available parking spots in the parking lot building. Server-D may provide the location information, the status, and the cost of each street parking space.

As shown in FIG. 16, assuming there are some parking lot buildings and many street parking spots near a given Building-A, the parking sensors in these parking lot buildings may be registered to Server-C and the street parking lots near Building-A are registered to Server-D. Consider the case that a user (e.g., client) tries to find a suitable parking spot given her destination is Building-A. Note that a suitable parking spot may be defined as the empty parking spot, which has less time cost (e.g., consuming less time for walking from the parking spot to the destination) and less parking cost (e.g., lower parking rate). Thus, the user may send the query (e.g., find a suitable parking spot near Building-A) to Server-A, which provides real-time parking services. After receiving the query, Server-A may retrieve the information of the parking spots near Building-A to find the most suitable parking lot for the user. Specifically, Server-A may retrieve the status, the parking rate, and the geographic location of each parking sensor near Building-A from Server-C and Server-D; then Server-A may obtain the cost of those parking spots from Server-B by querying the time cost estimation from each parking spot to Building-A. Afterwards, Server-A may analyze these information to find the most suitable parking spot for the user. For instance, the most suitable parking lot may be calculated by finding the available parking spot, which has the minimum value of "0.5*timeCost+0.5*parkingCost" among the parking spots around Building-A. Basically, Server-A needs to retrieve resources (e.g. parking spot information and rate information) from multiple servers and calculates the result (e.g. the most suitable parking spot) based on the combination of retrieved resources.

As described in the Smart Farming and Smart Parking use cases, users or applications may not or do not need to know original resources (e.g. moisture level for a specific moisture sensor in Smart Farming and parking rate for a specific parking lot), rather they are more interested in deduced information or knowledge (e.g. irrigation suggestion in Smart Farming and suitable parking lots in Smart Parking) from the combination of multiple original resources which may be maintained in the service layer. Although an application may retrieve those original resources and then calculate or deduce the knowledge from original resources by itself, this approach introduces may introduce multiple issues. First, for example, the application needs to retrieve original resources multiple times (e.g. one time for each original resource). This may cause high overheads for the application especially when a great number of original resources are involved. Second, some original resources may be sensitive. They may not be exposed to the application or not allowed to be retrieved directly by the application and may only be accessed by the service provider. Third, if many applications are interested in obtaining the same knowledge, each of them needs to retrieve original resources and deduce the knowledge independently without any sharing. Fourth, if the involved original resources are from different domains or vertical markets, the application needs to have various domain knowledge in order to find and understand original resources, which unavoidably causes extra burden for the application.

Figure 17:
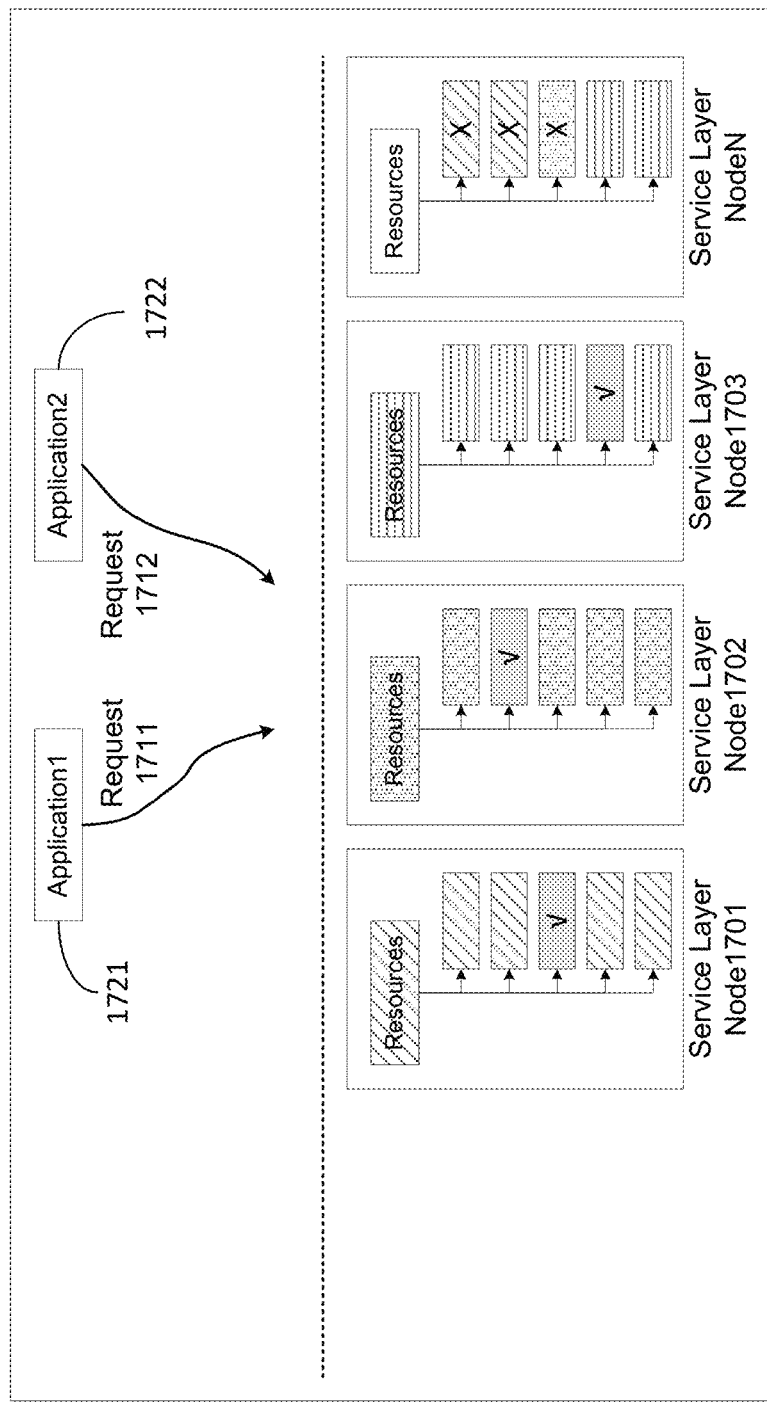
FIG. 17 illustrates an exemplary diagram of an illustration of a problem.

FIG. 17 illustrates a problem example where: 1) there may be several service layer nodes (e.g., Resource Hosts 2804) that may maintain different original resources; 2) Two applications generate two requests (e.g. Request 1711 and Request 1712); 3) Request 1711 may be answered only based on three selected resources, respectively, from service layer node 1701, service layer node 1702, and service layer node 1703; 3) Request 1712 may be answered only based on three selected resources which may be stored in service layer node N. In this example, Application 1721 or Application2 1722 may need to retrieve original resources three times in which they rely on themselves to perform the mashup function. If service layer node 1701, service layer node 1702, and service layer node 1703 may be from three different vertical domains, Application 1721 furthermore needs to have the domain knowledge of those three vertical.

Furthermore, with continued reference to FIG. 17, a problem may be presented as follows. Applications may be directly discover and retrieve potentially relevant resources from each service layer node and eventually they may answer queries by themselves. But this approach may be cumbersome and inefficient. First, the application needs to perform the retrieval operation multiple times; second, different applications need to repeat the same process although they may issue similar requests. The service layer needs to provide new services, which may intelligently collect various types of data from the same or different nodes and efficiently answer requests from applications; the types of data may be designated by its semantic annotation or description information. Semantic mashup may provide such services, but existing service layers (e.g. oneM2M) do not support this function yet. In this example, request 1711 may not be answered independently by any single service layer node. Instead, it may only be answered based on the selected resources (labeled by √) from service layer Node 1701, Node 1702, and Node 1703, respectively. Request 1712 may be answered by service layer Node N, but not based on a single resource. Instead, it may only be answered based on multiple selected resources (labeled by X). Each service layer node maintains certain resources, which may be analogous (e.g., at Node 1701, Node 1702 and Node 1703) or diverse (e.g. NodeN).

Conventional mashup solutions (e.g. web mashup applications and tools) have certain limitations in interoperability or reusability. For example, Google Mashup Editor does not support well dynamically mashing up resources from different vertical domains (an interoperability issue) and it does not support applications or users to reuse the existing mashup functions and mashup resources due to its lack of a modular mashup design (a reusability issue).

In summary, there may be one or more of the following problems with regard to conventional systems. A first problem may be that the existing mashup solutions have limited support for interoperability and reusability, which is critical for M2M/IoT systems. A second problem may be that there is no semantic mashup solution in existing M2M/IoT service layers (e.g. oneM2M, OIC).

Disclosed below are more details that may address one or more of the problems disclosed herein. First, a novel Semantic Mashup Service architecture with modular designs is described. In addition, methods (e.g., procedures) and an advanced mashup architectural features are described. The disclosed methods and systems may address reusability and interoperability of semantic mashups. The disclosed methods and systems specify how the clients (e.g., SMS requestors 1808) discover and retrieve SMP resources to improve the reusability and interoperability of SMP resources. The disclosed methods and systems specify details of how to create VSMRs and how to discover and retrieve VSMRs in order to improve the reusability and interoperability of VSMRs. The disclosed methods and systems further specify how to maintain VSMRs to further improve semantic mashup system efficiency.

Disclosed below is Table 1, which may be used for translating some of the disclosed acronyms, while Table 2 may provide some descriptions that may provide some perspective for many of the terms.

TABLE 1

| Abbreviations | |
|---|---|
| ACP | Access Control Policy |
| ADN | Application Dedicated Node |
| AE | Application Entity |
| API | Application Program Interface |
| ASN | Application Service Node |

TABLE 1-continued

| Abbreviations | |
|---|---|
| CRUDN | Create, Retrieve, Update, Delete, Notify |
| CSE | Common Services Entity |
| CSF | Common Services Function |
| HTTP | Hypertext Transfer Protocol |
| IN | Infrastructure Node |
| IN-CSE | CSE which resides in the Infrastructure Node |
| IoT | Internet of Things |
| IRI | Internationalized Resource Identifier |
| M2M | Machine to Machine |
| MN | Middle Node |
| MN-CSE | CSE which resides in the Middle Node |
| NSE | Network Service Entity |
| OIC | Open Interconnection Consortium |
| OWL | Web Ontology Language |
| RDF | Resource Description Framework |
| RDFS | Resource Description Framework Schema |
| RIF | Rule Interchange Format |
| SD | Semantic Descriptor |
| SGS | Semantic Graph Store |
| SMP | Semantic Mashup Profile |
| SMRS | Semantic Mashup Result |
| SMS | Semantic Mashup Service |
| SPARQL | SPARQL Protocol and RDF Query Language |
| SQL | Structured Query Language |
| Turtle | Terse RDF Triple Language |
| URI | Uniform Resource Identifier |
| VSMR | Virtual Semantic Mashup Resource |
| W3C | World Wide Web Consortium |
| XHTML | Extensible HTML |
| XML | eXtensible Markup Language |

TABLE 2

| | |
|---|---|
| <semanticDescriptor> | <semanticDescriptor> is an oneM2M resource, which is usually added as a child resource of another oneM2M parent resource (e.g., <contentInstance>) to describe its semantic information or metadata as RDF triples. |
| Semantic Mashup | Semantic Mashup may be a process to conduct a kind of aggregation function, combination function, or other logic functions over the related original resources (which are selected based on their semantic descriptions) and potentially some input parameters from clients to generate mashup results, which provide high-level knowledge. |
| Semantic Mashup Service (SMS) | Semantic Mashup Service may be type of service providing high-level knowledge based on the Semantic Mashup process. An SMS may be requested by SMS Requestors; also, an SMS may expose the generated Semantic Mashup Result (e.g., high-level knowledge) to SMS Requestors. |
| Semantic Data Model | Semantic Data Model may be method of structuring data in order to represent it in a specific logical way. It is a conceptual data model that includes semantic information that adds a basic meaning to the data and the relationships that lie between them. In this paper, Resource Description Framework (RDF) triples are applied as Semantic Data Model. |
| Semantic Mashup Profile (SMP) | Semantic Mashup Profile may be a type of resource defining a mashup function (e.g., a kind of aggregation function, combination function, or other logic functions over the related original resources in Semantic Mashup), the corresponding input and output parameter types, the criteria for collecting input parameters of the mashup function from original resources and the SMS requestor, and its application domain (e.g., which service layer application may apply this Semantic Mashup Profile). The Semantic Mashup Profile may be described by a semantic data model (e.g., RDF triples). A semantic mashup profile may be used by Semantic Mashup to be its function body. |
| Semantic Mashup Result (SMRS) | Semantic Mashup Result may be a type of resource generated by the Semantic Mashup process. A Semantic Mashup Result may be described by a semantic data model (e.g., RDF triples) and may be retrieved by an SMS Requestor. |
| Virtual Semantic Mashup Resource (VSMR) | Virtual Semantic Mashup Resource may be a type of resource providing a certain type of API (an interface to the corresponding SMS) by associating with an SMP and a number of related original resources. A VSMR may be created by an SMS Requestor and accessed by other SMS Requestors. A VSMR may include SMRS as its child resources or have references to SMRS resources. |
| SMS Host | SMS Host may be a logical or physical entity, which has the ability to provide SMS to SMS Requestors. For example, an oneM2M CSE or an OIC Server may be an SMS Host. |
| SMS Requestor | SMS Requestor may be a logical or physical entity, which requests and uses or consumes SMS. An SMS Requestor may discover (or even create) SMPs, reate, discover, and/or access VSMRS. For example, an oneM2M CSE or AE or an OIC Client may be an SMS Requestor. |

TABLE 2-continued

| | |
|---|---|
| SMP Host | SMP Host may be a logical or physical entity, which includes a set of SMP resources. For example, an oneM2M CSE or an OIC Server may be an SMP Host. |
| VSMR Host | VSMR Host may be a logical or physical entity, which includes a number of VSMRs. For example, an oneM2M CSE or an OIC Server may be a VSMR Host. |
| SMRS Host | SMRS Host may be a logical or physical entity, which includes a set of SMRS resources. For example, an oneM2M CSE or an OIC Server may be an SMRS Host. |
| Resource Host | Resource Host may be a logical or physical entity, which includes a set of original resources to be leveraged by the Semantic Mashup process to calculate SMRS. For example, an oneM2M CSE or an OIC Server may be a Resource Host. |

Below provides details with regard to the Semantic Mashup Service (SMS) architecture 1800, shown in FIG. 18, which features modular designs and takes advantage of semantics in a way that may achieve higher reusability, better interoperability, and higher system efficiency.

First, SMS architecture 1800 may include separated SMPs 1802 and VSMRs 1804. An SMP 1802 semantically describes profile information of its related mashup service, such as: 1) semantic information about input parameters (e.g. inputDescriptor); 2) semantic information about how mashup members or member resources [the terms "member resources," "mashup members," and "mashup member resources" may be interchangeably used] for the mashup should be selected (e.g. memberFilter); 3) semantic information about the mashup function (e.g. functionDescriptor); or 4) semantic information about mashup results (e.g. outputDescriptor).

In order to leverage the mashup service as described by the SMP 1802, a VSMR may be created as an interface for SMS Requestors 1808 (e.g. users or applications) to realize the mashup service. A VSMR refers to an SMP 1802 and uses its profile information to calculate or generate the semantic mashup result. The VSMR maintains Semantic Mashup Result (e.g., SMRS 1806), which may be retrieved or accessed by multiple SMS Requestors 1808. The VSMR may also maintain the references to each original member resources. In addition, SMS Requestors 1808 may trigger the VSMR to run the mashup function and recalculate the mashup result. SMPs 1802 may be provisioned or created by applications or SMS Requestors 1808, while VSMRs 1804 are created by SMS Requestors 1808 or other applications that probably issue the command to create the VSMR. An SMP 1802 may be used by many VSMRs 1804 and a VSMR may be accessed by other SMS Requestors 1808 (which do not originally create the VSMR). A service layer node hosting SMPs 1802 is referred to as an SMP Host 1810, while a service layer node hosting VSMRs 1804 is referred to as a VSMR Host 2302. SMP host 1810 and VSMR Host 2302 may be located at different physical nodes or co-located at the same physical node. For instance, an SMS Host may host SMP 1802, VSMR, or both of them.

Second, semantic mashup procedures under the SMS architecture 1800 are described and briefly described, for example, the procedures for discovering and retrieving SMP 1802, the procedures for creating VSMR, the procedures for discovering and retrieving VSMR, and the procedures for maintaining VSMR.

Third, in the advanced SMS architecture 2200, Semantic Mashup Result (e.g., SMRS 1806) is separated out from VSMR. Then, a service layer node hosting SMRS 1806 is referred to as an SMRS Host 2304. With this separation of VSMR and SMRS 1806, SMS Requestors 1808 may even not need to know or interface with VSMRs 1804 and may simply retrieve mashup results from SMRS Host 2304 although an SMRS 1806 maintains a reference to its corresponding VSMR. This approach may bring the following benefits: 1) A VSMR may be easily moved or migrated from one VSMR Host 2302 (e.g. congested Host) to another VSMR Host 2402 (e.g. light-loaded Host) without much impact to corresponding SMRS 1806 and SMS Requestors 1808 which access the SMRS 1806; 2) It furthermore may increase the reusability of VSMR.

Semantic Mashup Architecture—In order to enable SMS, several issues may be addressed in order to achieve high reusability and interoperability. For example, whether and how to model mashup members, required input parameters, mashup functions, mashup results, etc. Since mashup members may come from different vertical domains with different data models, how to describe mashup members may be significant for interoperability. In addition, mashup functions should be understandable for applications from different domains and with different requirements, which may impact the reusability.

Figure 18:
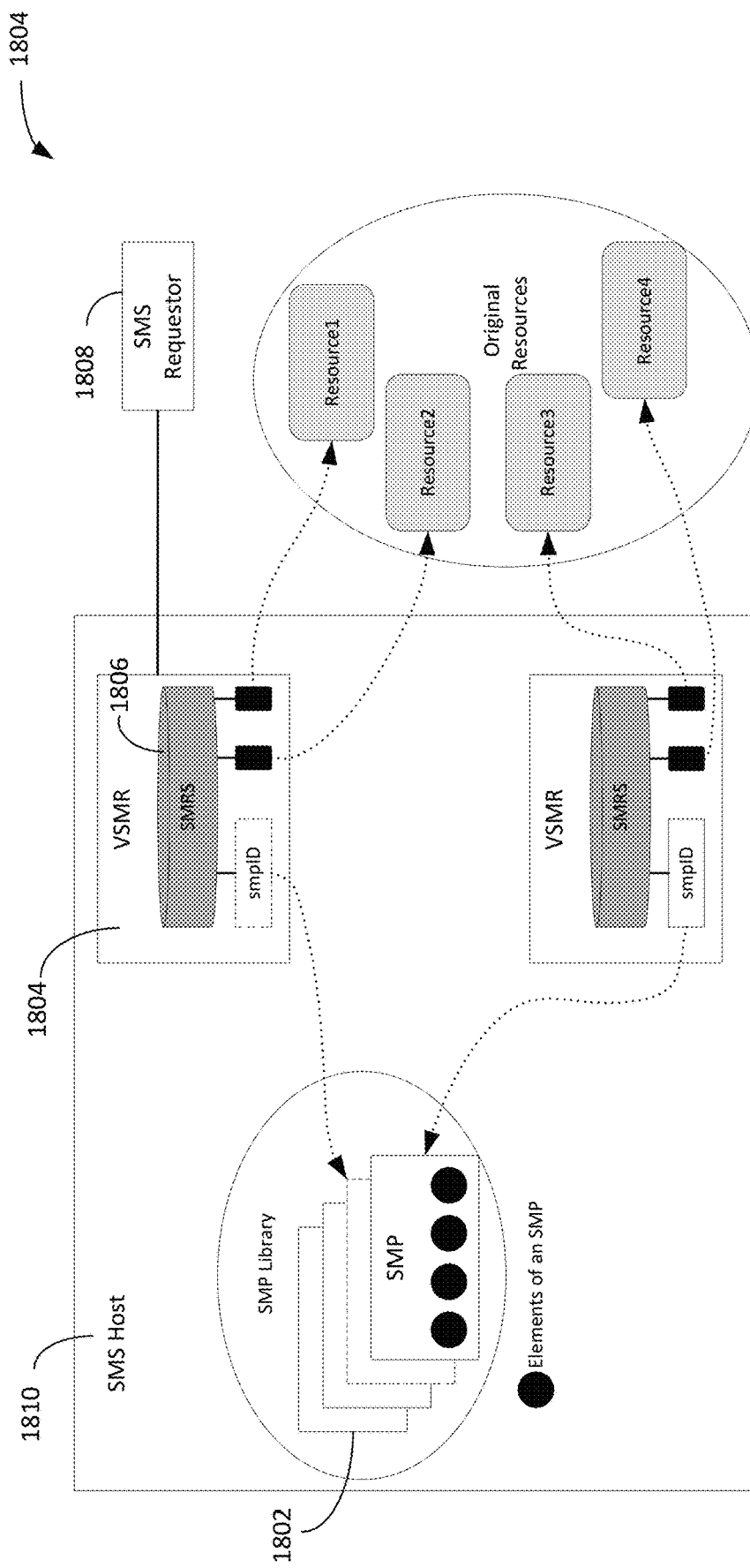
FIG. 18 illustrates an exemplary diagram of an architecture for semantic mashup.

The SMS architecture 1800, as shown in FIG. 18, may include SMS Host 1810, SMP Library 1802, VSMR 1804, or SMS Requestor 1808. An SMS Host 1810 may provide semantic mashup services to SMS Requestors 1808. The SMS Host may be an SMP Host 1810, a VSMR Host 2302, or a combination of both. An SMS Host, which may only include SMPs 1802, may be an SMP Host 1810 and it may only provide the SMS for hosting SMPs 1802. An SMS Host that only includes VSMR 1804 may be a VSMR Host 2302 and it may only provide the SMS for hosting VSMR 1804 including calculating or exposing mashup results. If an SMS Host includes both SMP Library and VSMRs 1804, it may support full SMS (e.g. hosting both SMPs 1802 and VSMRs 1804). An SMS Host, for example by default, may have the ability to include both SMPs 1802 and VSMRs 1804.

An SMP Host 1810 may have its own SMP library that includes a set of SMPs 1802. An SMP 1802 semantically models and describes the profile information about a specific mashup logic (e.g. the suitable parking lot as discussed in Smart Parking use case). In the architecture, the profile information of an SMP 1802 may include semantic description of input parameters, semantic description of member resources, semantic description of mashup functions, or semantic description of mashup results, which may be referred to as SMP Elements or Representations. The mashup result may be calculated by running the mashup function over selected mashup members and input parameters if any. An SMP 1802 may include: 1) which types of input parameters may be needed in order to use the SMP 1802; 2) which types of original resources may be required to be the mashup members in order to use the SMP 1802; 3)

which types of mashup functions may be used for the SMP 1802; 4) or which types of mashup results may be calculated and generated for using the SMP 1802. SMP 1802 usually does not include input parameters, member resources, or mashup results.

Figure 19:
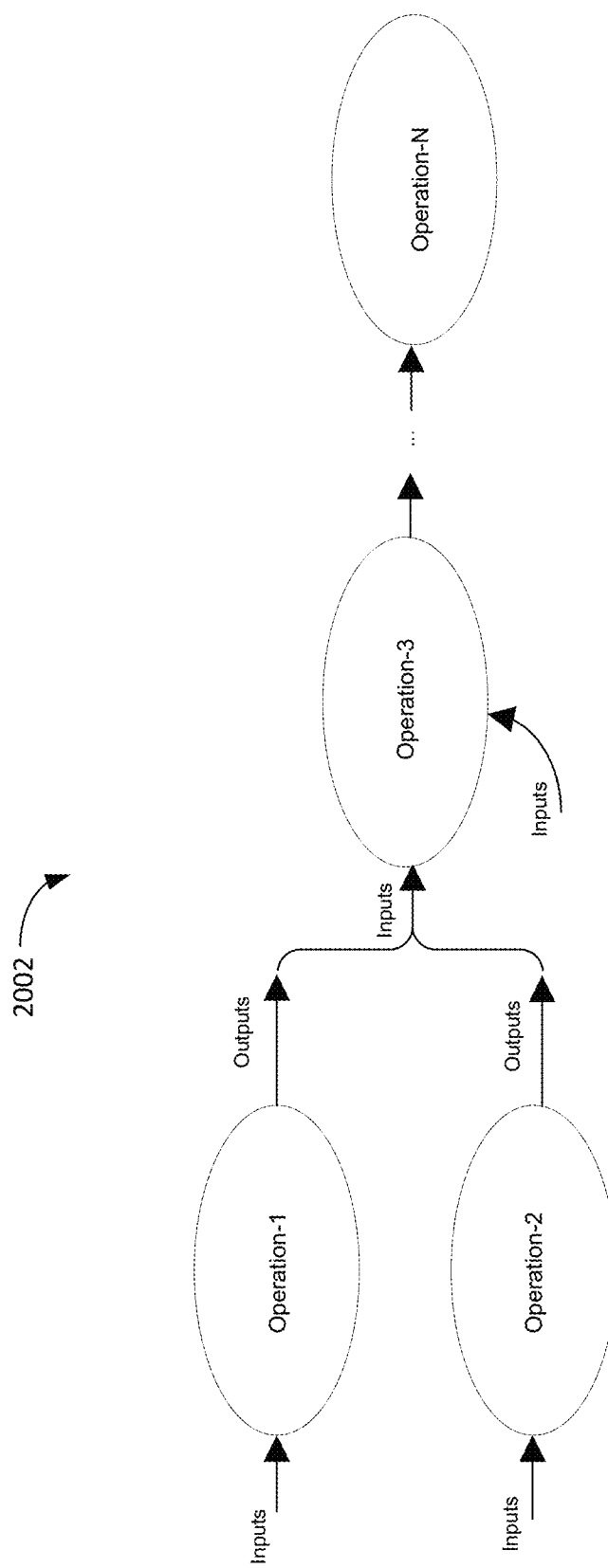
FIG. 19 illustrates an exemplary diagram of an illustration of a mashup function in an SMP

Note that the mashup function in the SMP 1802 may include more than one operation, as shown in FIG. 19, and each operation may have different inputs (which may be provided by SMS Requestors 1808, the values or representations of mashup members, or outputs from other operations) and outputs. In addition, the mashup function may be a script which specifies how mashup result should be calculated.

A VSMR 1804 may be considered a virtual resource providing an SMS interface to SMS Requestors 1808. Each VSMR 1804 may include a set of mashup members and apply at least one SMP 1802. Each mashup member in the VSMR 1804 is associated with an original resource. The SMP 1802 provides mashup function to generate mashup results based on the content provided by the mashup members and input parameters from an SMS Requestor 1808 (for instance, in the findSuitableParkingLot application, the SMS Requestor 1808 may provide the geolocation of the destination to the VSMR 1804).

Figure 20:
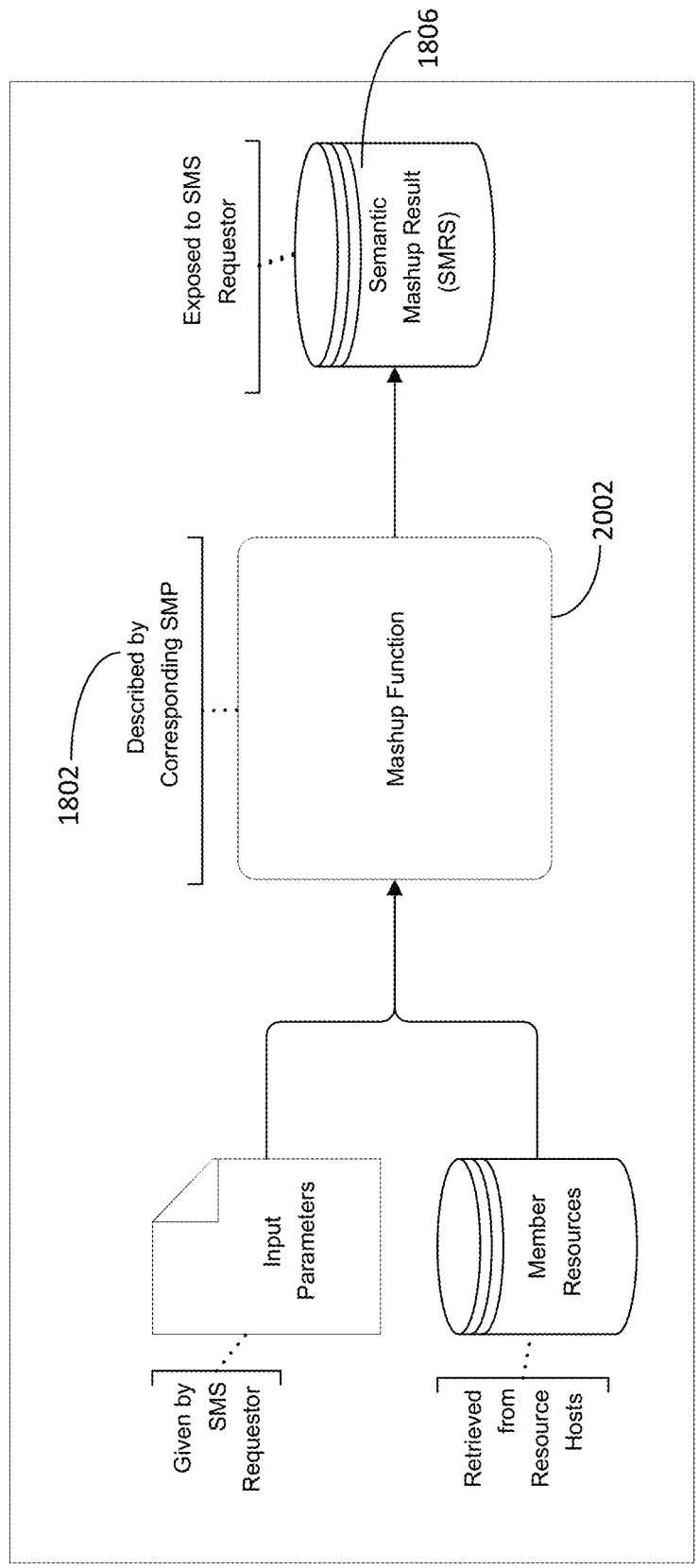
FIG. 20 illustrates an exemplary diagram of the illustration of a VSMR generating mashup results.

FIG. 20 illustrates an example of how VSMR 1804 generates the mashup results. Essentially, the mashup function 2002 generates the results based on the content of mashup members and input parameters from the SMS Requestor 1808 (e.g., the destination geolocation is considered as an input parameter, which should be sent by the SMS Requestor 1808 in the findSuitableParkingLot application). The generated mashup results may be stored and organized in the SMRS 1806, which may be considered a child resource of the VSMR 1804 in the architecture. A VSMR 1804 semantically models and describes its offered SMS so other SMS Requestors 1808, who may be interested in obtaining this SMS, are able to discover this VSMR 1804, or retrieve this VSMR's SMRS 1806.

There may be multiple ways for an SMS Requestor 1808 to utilize SMS. In a first approach, an SMS Requestor 1808 discovers the available SMPs 1802 in the SMS host 1810. For instance, an SMS Requestor 1808 may send an SMP Discovery Request to find the available SMPs 1802 (such as minParkingRate, minTimeCost, and suitableParkingLot for the Smart Parking application); then the SMS Requestor 1808 may send a VSMR creation request to the SMS Host by identifying the associated SMP 1802 and providing input parameters; after the VSMR 1804 is created, the SMS Requestor 1808 may trigger and retrieve semantic mashup result from the VSMR 1804. Moreover, the SMS Requestor 1808 may also subscribe to the VSMR 1804 after the VSMR 1804 has been created. After subscribing to the VSMR 1804, the SMS Requestor 1808 may be notified once any changes conducted in the VSMR 1804. If there is a VSMR 1804 already created for the expected SMS, the SMS Requestor 1808 may directly access the existing VSMR 1804 to retrieve its semantic mashup results or directly subscribe to the existing VSMR 1804. Note that the SMS Requestor 1808 and original resources may be parts that are considered to be outside of the architecture (e.g., they are entities that may interact with the SMS Host, which include the Semantic Mashup architecture).

This architecture as disclosed may have the following technical effect. The SMP creation and VSMR creation may be separate and independent of each other, which may allow an SMP 1802 to be provisioned by the system (or other applications) and to be used by various VSMRs 1804. Such a separation may allow SMPs 1802 and VSMRs 1804 to be flexibly and potentially more efficiently stored in different places. As a result, the reusability and the system efficiency may be improved.

Each SMP's representation may be modeled using semantic triples, which enables the interoperability especially when mashup members are selected from different domains. Such semantics-based modeling of SMPs 1802 may improve the reusability as well since it helps applications or machines to well understand profile information of each SMP 1802.

It is understood that the functionality illustrated in FIG. 18-FIG. 20 may be implemented in the form of software (e.g., computer-executable instructions) stored in a memory of, and executing on a processor of, a wireless device or other apparatus (e.g., a server, gateway, device, or other computer system), such as one of those illustrated in FIG. 51C or 51D described below. It is also understood that the functionality illustrated in FIG. 18-FIG. 20 may be implemented as a set of virtualized network functions. The network functions may not necessarily communicate directly, rather, they may communicate via forwarding or routing function.

Figure 21:
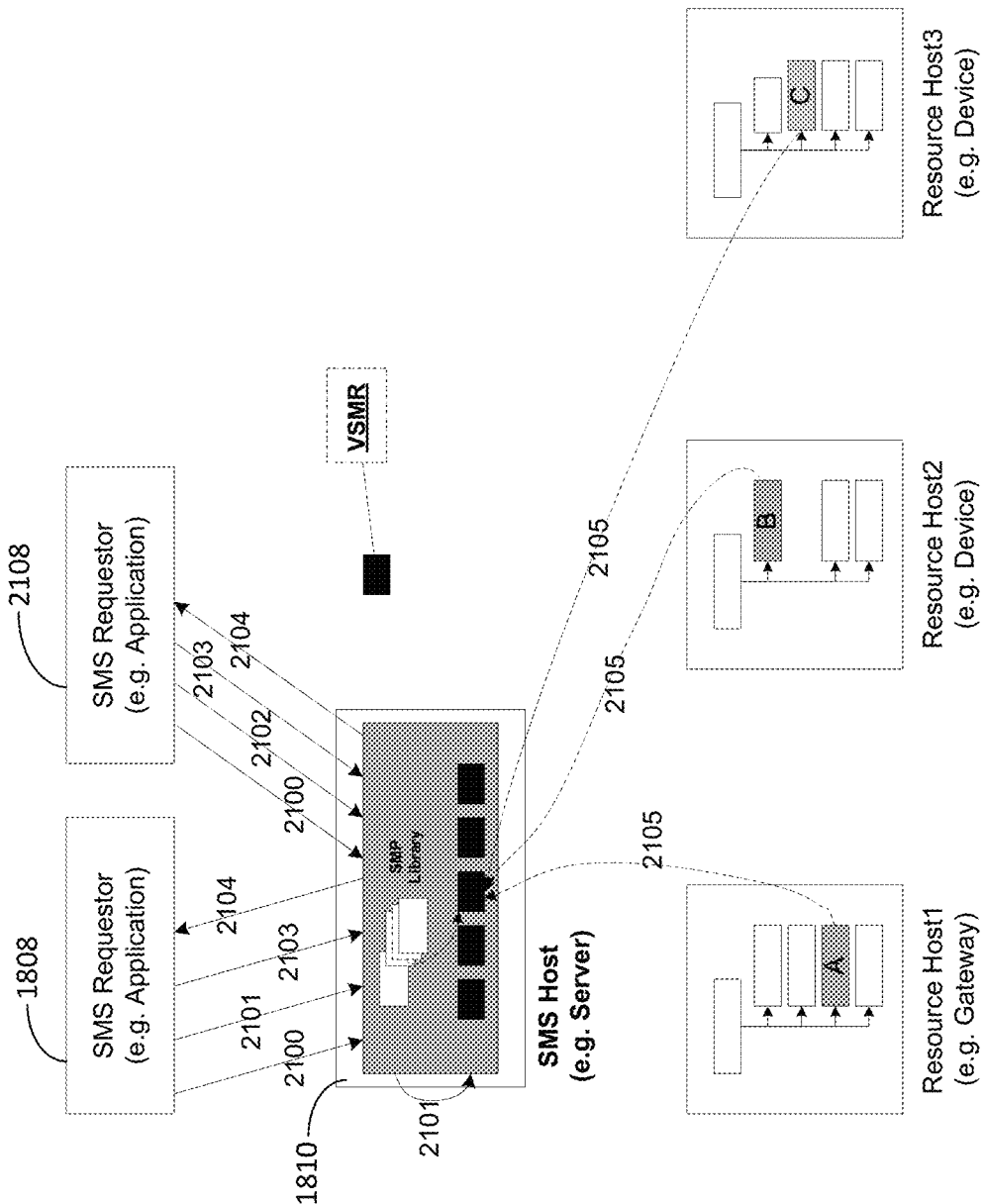
FIG. 21 illustrates an exemplary diagram of the procedures of semantic mashup.

FIG. 21 illustrates exemplary high-level procedures of the semantic mashup. More details for each are disclosed herein. Step 2100 may be considered an SMP discovery task. At step 2100, SMS Requestors 1808 may discover existing SMPs 1802 in the SMS Host such that they may apply these SMPs 1802 to create corresponding VSMRs 1804. For instance, SMS Requestors 1808 may discover parking lot related SMPs 1802 by sending a semantic discovery request to the SMS host 1810. Aspects of this task is discussed in more detail herein. Step 2101 may be considered a VSMR creation task. At step 2012, after discovering the corresponding SMPs 1802, an SMS Requestor 1808 may request to create a VSMR 1804 by sending a VSMR creation request. The request may indicate which SMP is applied for creating the VSMR 1804. After receiving the VSMR creation request, the SMS Host may first check if there is any available VSMR 1804 that matches the VSMR creation request; if so, the SMS Host may not create another new VSMR 1804; otherwise, the SMS Host may create the VSMR 1804 by establishing its mashup members based on the applied SMP 1802, e.g., the applied SMP 1802 defines the criteria for how to select the original resources to be the VSMR 1804's mashup members. An SMS Host 1810 itself may also proactively create a VSMR 1804.

With continued reference to FIG. 21, step 2102 may be considered a VSMR discovery task. At step 2012, after the VSMR 1804 has been created, other SMS Requestors (e.g., SMS Requestor 2108), who are interested in this VSMR 1804, may discover the VSMR 1804 by sending a semantic discovery request to the SMS Host 1810. Note that an SMS Requestor may also first discover the required VSMR 1804 (e.g., step 2102), and then create the VSMR (e.g., step 2103-step 2104) if the required VSMR 1804 is not found. Step 2101 and step 2012 may be swappable based on different strategies applied to the SMS Requestor.

Step 2103 and step 2014 may be considered a VSMR content retrieval task. At step 2103 and step 2014, may retrieve the content (e.g., mashup results) of the VSMR 1804, as disclosed in more detail herein. For example, this may be done after discovering the URI of the VSMR 1804, SMS Requestor 1808, and SMS Requestor 2108.

Step 2105 may be considered a VSMR maintenance task. At step 2105, the mashup members in the VSMR 1804 actually link to or copy from the original resources hosted by different Resource Hosts 2804. Thus, once the representations of the original resources get changed, the corresponding mashup members of the VSMR 1804 may be updated and the mashup results of the VSMR 1804 may be re-calculated accordingly. Moreover, the original resources may be removed or added in their Resource Hosts 2804, and so the mashup members of the VSMR 1804 may also be modified accordingly.

In summary, it may be broken up as follows: A) Task0-SMPs Discovery (e.g., step 2100); B) Task1-VSMR Creation (e.g., step 2011); C) Task2-VSMR Discovery (e.g., step 2102); D) Task3-VSMR Content Retrieval (e.g., step 2103-2104); and E) Task4-VSMR Maintenance (e.g., step 2105).

Figure 51A:
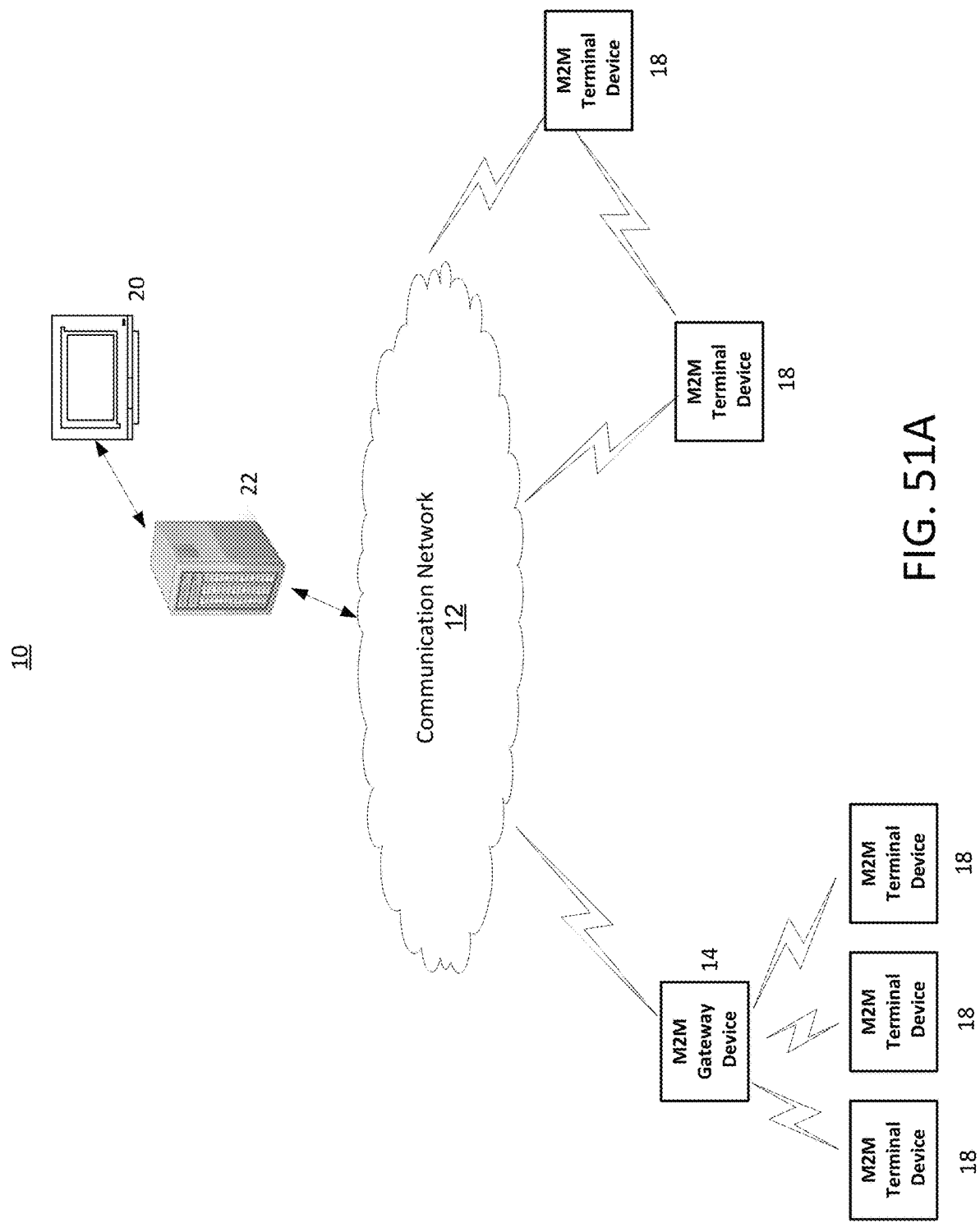
FIG. 51A illustrates an exemplary machine-to-machine (M2M) or Internet of Things (IoT) communication system in which the disclosed subject matter may be implemented.
Figure 51B:
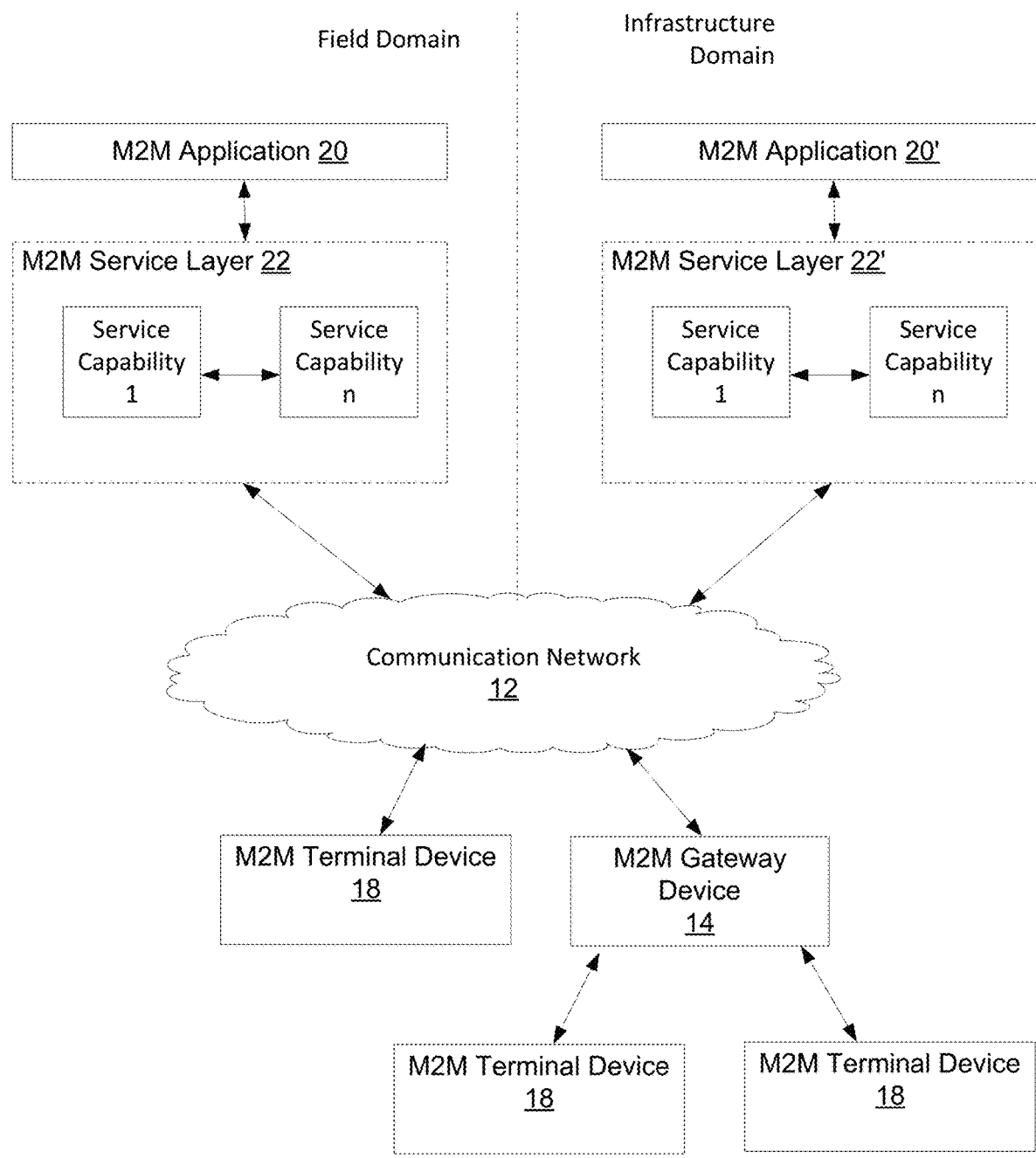
FIG. 51B illustrates an exemplary architecture that may be used within the M2M/IoT communications system illustrated in FIG. 51A.
Figure 51C:
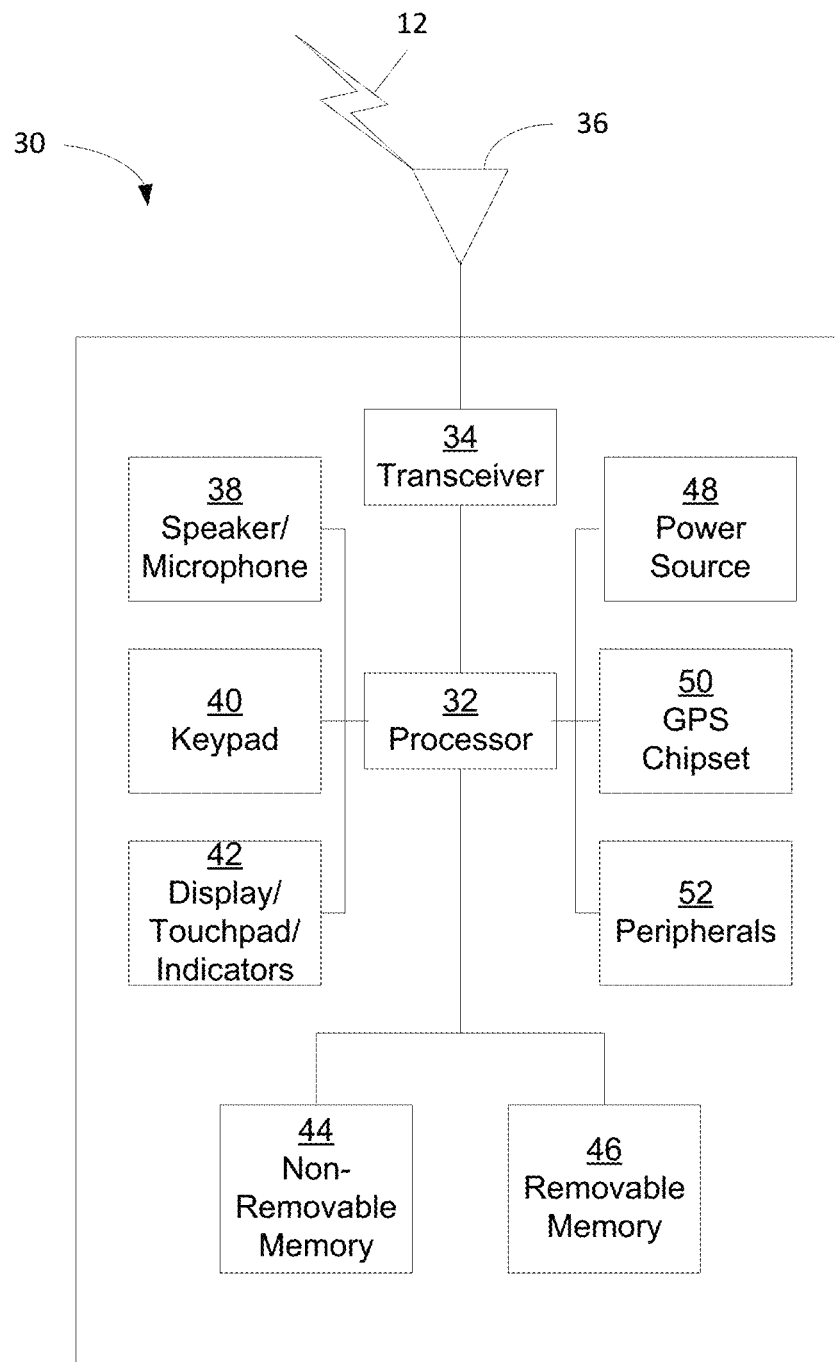
FIG. 51C illustrates an exemplary M2M/IoT terminal or gateway device that may be used within the communications system illustrated in FIG. 51A.
Figure 51D:
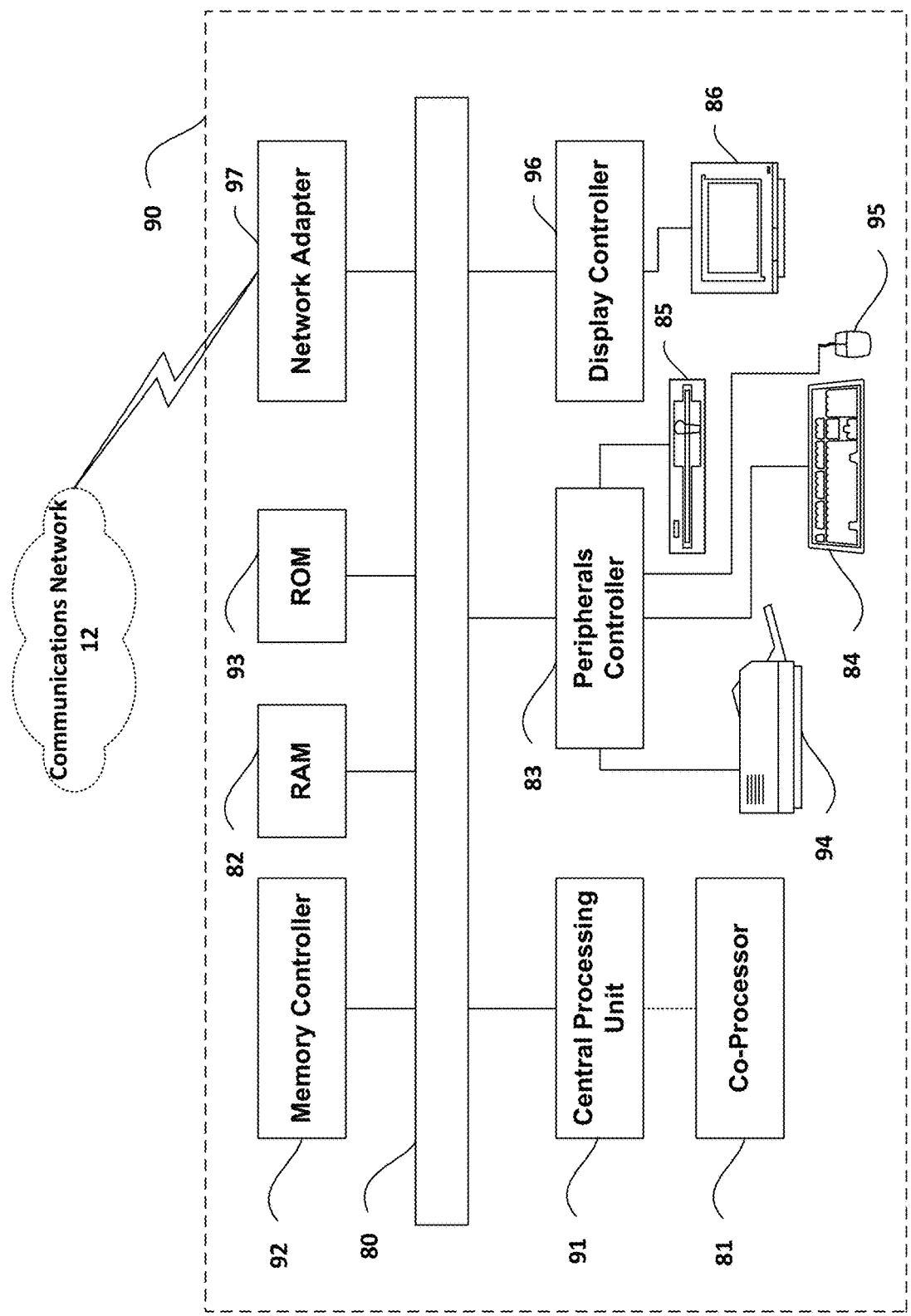
FIG. 51D illustrates an exemplary computing system in which aspects of the communication system of FIG. 51A.

It is understood that the entities performing the steps illustrated in FIG. 21 may be logical entities that may be implemented in the form of software (e.g., computer-executable instructions) stored in a memory of, and executing on a processor of, an apparatus configured for wireless or network communications or a computer system such as those illustrated in FIG. 51C or FIG. 51D. That is, the method(s) illustrated in FIG. 21 may be implemented in the form of software (e.g., computer-executable instructions) stored in a memory of an apparatus, such as the apparatus or computer system illustrated in FIG. 51C or FIG. 51D, which computer executable instructions, when executed by a processor of the apparatus, perform the steps illustrated in FIG. 21. It is also understood that the functionality illustrated in FIG. 21 may implemented as a set of virtualized network functions. The network functions may not necessarily communicate directly, rather, they may communicate via forwarding or routing function. It is also understood that any transmitting and receiving steps illustrated in FIG. 21 may be performed by communication circuitry of the apparatus under control of the processor of the apparatus and the computer-executable instructions (e.g., software) that it executes.

Figure 22:
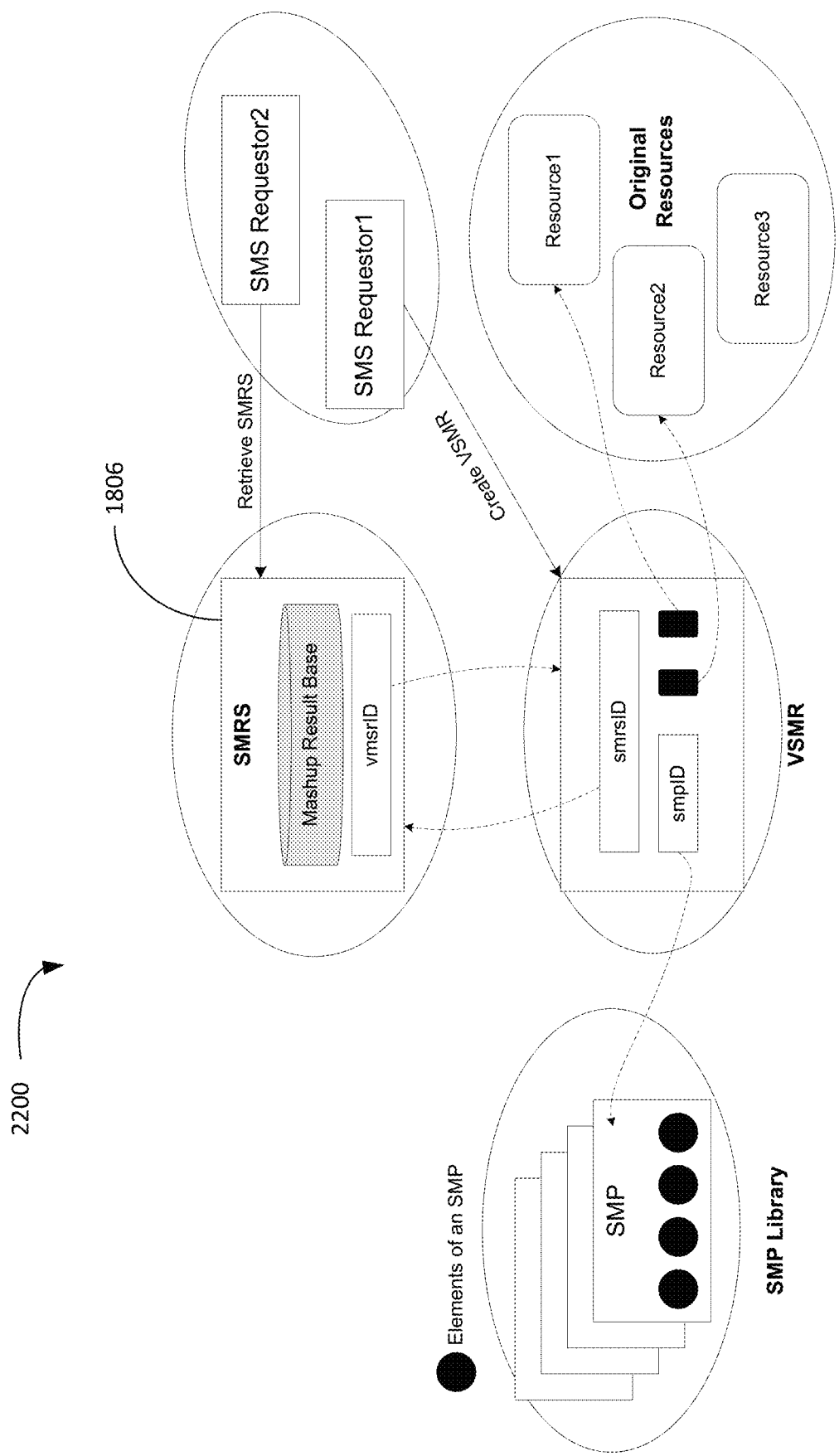
FIG. 22 illustrates an exemplary diagram of the separation of VSMR and mashup result.

In the SMS architecture 1800 shown in FIG. 18, the mashup results of the VSMR 1804 is stored and organized in the SMRS 1806, which is located under the VSMR 1804, e.g., the SMRS 1806 may be considered to be the child resources of the VSMR 1804. In the advanced SMS architecture 2200 in FIG. 22, the VSMR 1804 and its mashup results may be separated, e.g., the mashup results may be considered as a separate resource different from its VSMR 1804. As shown in FIG. 22, an SMRS 1806 is a type of resource, which may include the mashup results generated by one or more VSMRs 1804. SMRS 1806s may be hosted in a different service layer node, referred to as SMRS Host 2304 of FIG. 23. A VSMR 1804 may identify its associated SMRS 1806 by including smrsID. Consequently, the mashup results may no longer be stored in the VSMR 1804. Instead, the corresponding SMRS 1806 may maintain the mashup results, which is generated by the associated VSMRs 1804 as denoted by vsmrID attribute of the SMRS resource. The mashup results in the SMRS 1806 may be semantically modeled and described such that other SMS Requestors, which may be interested in the mashup results, may directly retrieve the mashup results from the corresponding SMRS 1806.

It is understood that the entities performing the steps illustrated in FIG. 22 may be logical entities that may be implemented in the form of software (e.g., computer-executable instructions) stored in a memory of, and executing on a processor of, an apparatus configured for wireless or network communications or a computer system such as those illustrated in FIG. 51C or FIG. 51D. That is, the method(s) illustrated in FIG. 22 may be implemented in the form of software (e.g., computer-executable instructions) stored in a memory of an apparatus, such as the apparatus or computer system illustrated in FIG. 51C or FIG. 51D, which computer executable instructions, when executed by a processor of the apparatus, perform the steps illustrated in FIG. 22. It is also understood that the functionality illustrated in FIG. 22 may implemented as a set of virtualized network functions. The network functions may not necessarily communicate directly, rather, they may communicate via forwarding or routing function. It is also understood that any transmitting and receiving steps illustrated in FIG. 22 may be performed by communication circuitry of the apparatus under control of the processor of the apparatus and the computer-executable instructions (e.g., software) that it executes.

Figure 23:
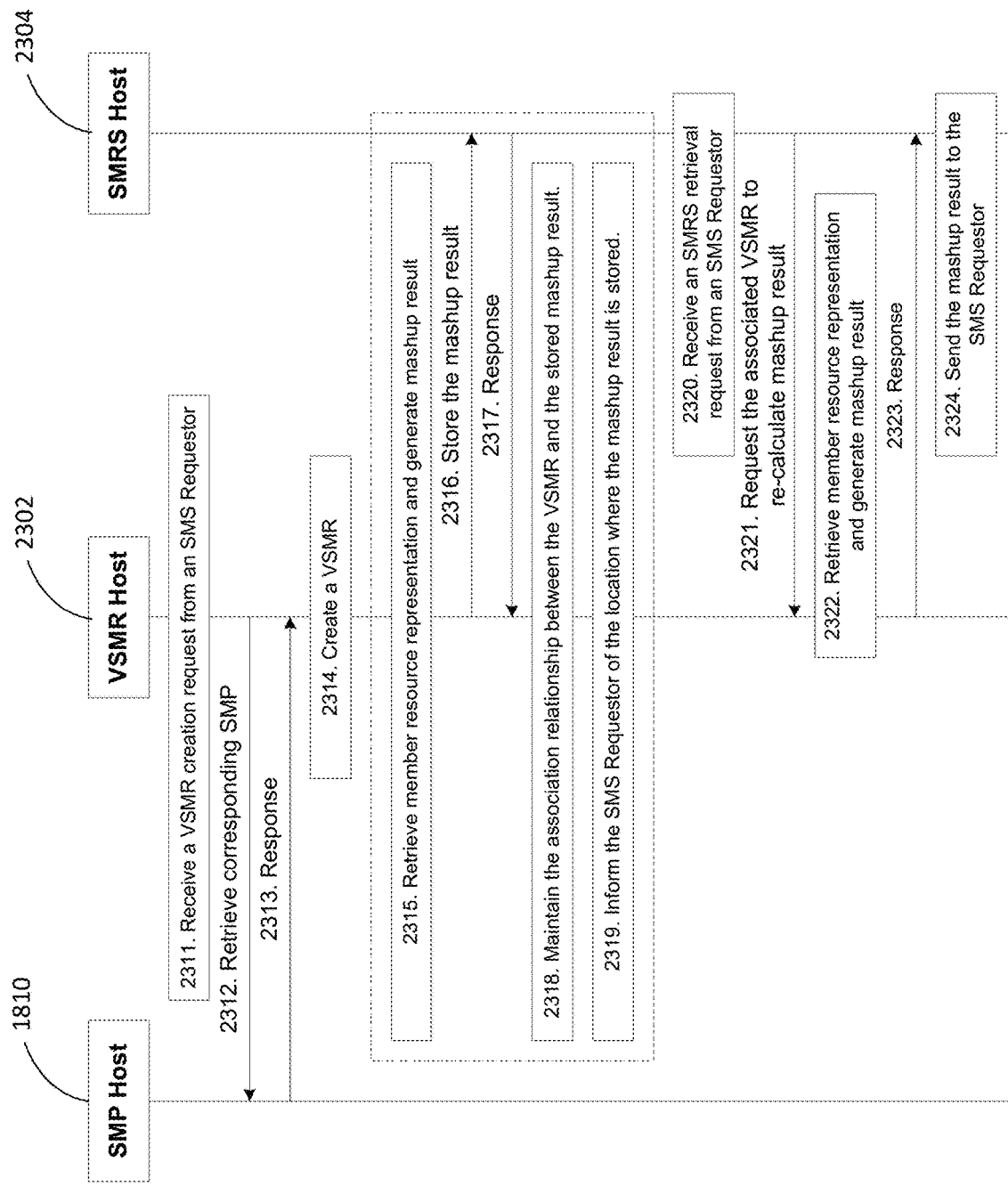
FIG. 23 illustrates an exemplary diagram of interactions among SMP Host, VSMR Host, and SMRS Host.

FIG. 23 illustrates the main procedure of how the SMP Host 1810, VSMR Host 2302, and SMRS Host 2304 interact with each other in order to provide SMS to clients (e.g., SMS requestors) by applying the advanced SMS architecture 2200.

Step 2311 of FIG. 23: The VSMR Host 2302 receives a VSMR creation request from a SMS Requestor. The VSMR creation request can identify which SMP 1802 may be applied in the new VSMR 1804.

Step 2312 of FIG. 23: After receiving the VSMR creation request, the VSMR Host 2302 may send an SMP retrieval request to the corresponding SMP Host 1810. Note that here the SMP Host 1810 and VSMR Host 2302 are considered different entities (which is a slightly different from the architecture shown in FIG. 18 that SMP 1802 and VMSR are both hosted by the SMS Host), and so VSMR Host 2302 may retrieve the corresponding SMPs 1802 from the SMP Host 1810.

Step 2313 of FIG. 23: The SMP Host 1810 may return the representations of the requested SMP 1802.

Step 2314 of FIG. 23: After obtaining the representations of the requested SMP 1802, the VSMR Host 2302 is able to create the VSMR 1804, which is requested by the SMS Requestor in Step 2311. Also, the new VSMR 1804 may associate with a SMRS 1806 to store its mashup results. After creating the VSMR 1804, the VSMR Host 2302 may inform the SMS requestor that the VSMR 1804 has been created by sending the URI of its associated SMRS 1806.

Step 2315 of FIG. 23: The VSMR Host 2302 generates the mashup results by retrieving the representations of its mashup members and conducting the mashup function over these representations.

Step 2316 of FIG. 23: The VSMR Host 2302 may send the generated mashup results to the SMRS Host 2304, which consequently stores and organizes the generated mashup results.

Step 2317 of FIG. 23: The SMRS Host 2304 may send a response to the VSMR Host 2302 to indicate the mashup results have been successfully stored in the SMRS Host 2304 or not.

Step 2318 of FIG. 23: The location for storing the VSMR's mashup results may be adjusted over time, e.g., the VSMR 1804 may select different SMRS Hosts to its mashup results over time (e.g., the original SMRS Host 2304 does not have enough capacity to store the mashup results of the VSMR 1804). Thus, the VSMR Host 2302 may maintain the relationship between the VSMR 1804 and its corresponding SMRS 1806.

Step 2319 of FIG. 23: If the VSMR 1804 changes its SMRS 1806, the VSMR 1804 may inform the SMS Requestors about the URI of the new SMRS 1806. Here, it is assumed that the VSRM Host maintains the address (e.g., URI) of the SMS Requestor so that the VSMR 1804 may send the message to the SMS Requestor; for example, the SMS Requestor may make a subscription to the VSMR Host 2302 and gives a notification URI (e.g., the SMS Requestor's URI) during the subscription to the VSMR Host 2302; then the VSMR Host 2302 may send the URI of the new SMRS Host 2304 to this notification URI, which may be received by the SMS Requestor. Step 2315-Step 2319 are may be used when VSMR Host 2302 periodically executes the semantic mashup profile and generate mashup result by itself.

Step 2320 of FIG. 23: A SMS Requestor (not shown in the figure), who wants to obtain the SMRS 1806, may discover the SMRS 1806 and send an SMRS retrieval request to the SMRS Host 2304.

Step 2321 of FIG. 23: After receiving the SMRS retrieval request, the SMRS Host 2304 may directly respond with the up-to-date mashup result to the SMS Requestor, or the SMRS Host 2304 may generate a mashup results update request to enable its associated VSMR 1804 to re-calculate the mashup results and feedback the refreshing mashup results to the SMRS Host 2304.

Step 2322 of FIG. 23: After receiving the mashup request, the VSMR 1804 may re-generate the mashup results by retrieving the representations of its mashup members and conducting the mashup function over these representations.

Step 2323 of FIG. 23: The VSMR Host 2302 sends the new mashup results to the SMRS Host 2304 in order to respond to the mashup request from Step 2321.

Step 2324 of FIG. 23: After receiving the up-to-date mashup results, the SMRS Host 2304 may store it accordingly and respond to the VSMR Host 2302 in order to confirm the mashup result has been stored, and then send the up-to-date mashup result to the SMS Requestor.

It is understood that the entities performing the steps illustrated in FIG. 23 may be logical entities that may be implemented in the form of software (e.g., computer-executable instructions) stored in a memory of, and executing on a processor of, an apparatus configured for wireless or network communications or a computer system such as those illustrated in FIG. 51C or FIG. 51D. That is, the method(s) illustrated in FIG. 23 may be implemented in the form of software (e.g., computer-executable instructions) stored in a memory of an apparatus, such as the apparatus or computer system illustrated in FIG. 51C or FIG. 51D, which computer executable instructions, when executed by a processor of the apparatus, perform the steps illustrated in FIG. 23. It is also understood that the functionality illustrated in FIG. 23 may implemented as a set of virtualized network functions. The network functions may not necessarily communicate directly, rather, they may communicate via forwarding or routing function. It is also understood that any transmitting and receiving steps illustrated in FIG. 23 may be performed by communication circuitry of the apparatus under control of the processor of the apparatus and the computer-executable instructions (e.g., software) that it executes.

Figure 24:
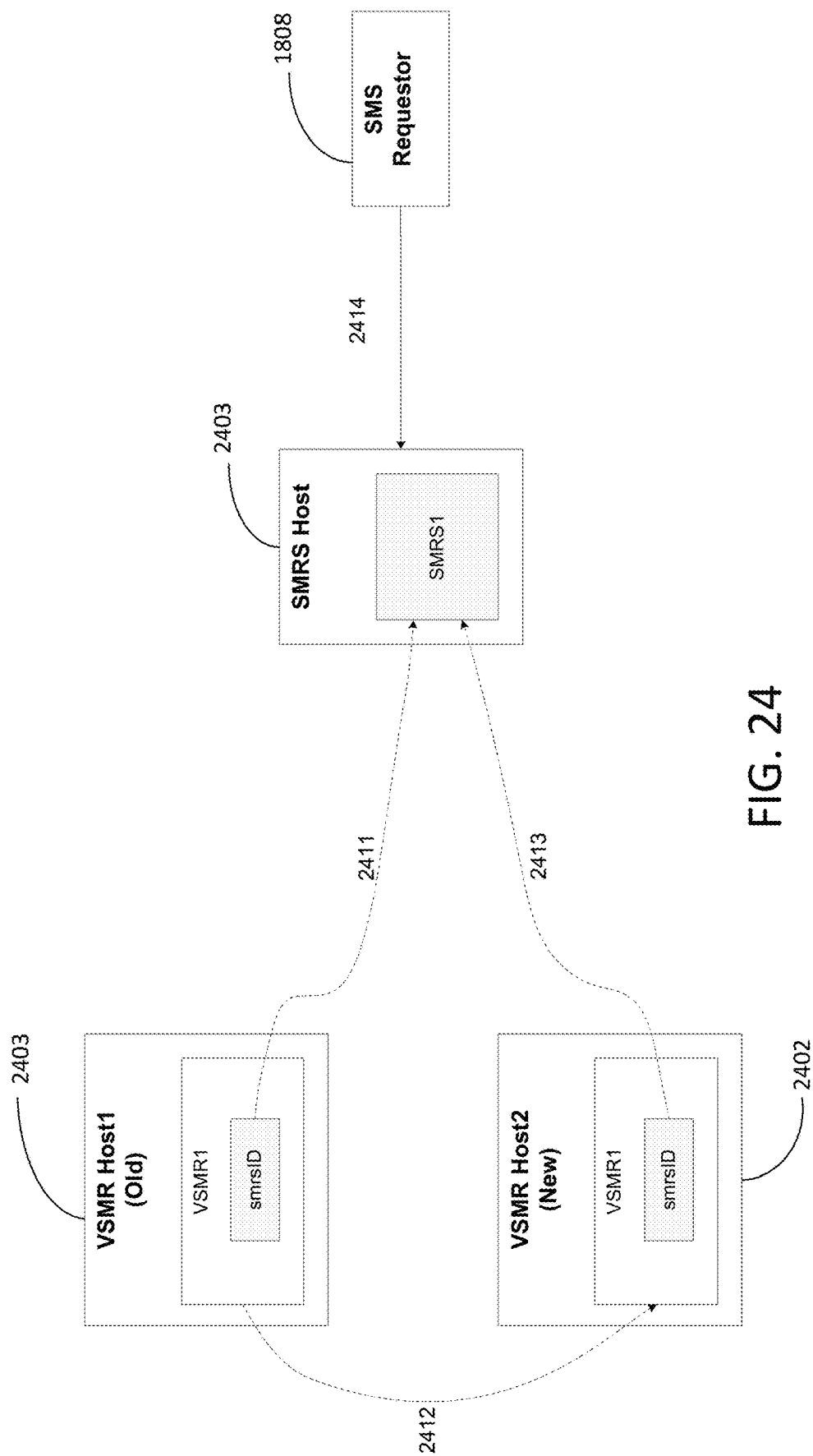
FIG. 24 illustrates an exemplary diagram of VSMR Migration in the advanced SMS architecture.

One benefit for separating the VSMR 1804 and its mashup result is to facilitate the VSMR migration, which is shown in FIG. 24. Specifically, once a VSMR 1804 tries to migrate from one VSMR Host 2302 to a new VSMR Host 2402 (due to some reasons, such as load balancing among VSMR Hosts), the mashup results of the VSMR 1804 would not need to be migrated accordingly if the VSMR 1804 and its mashup results are separated. Without migrating the VSMR's mashup results may reduce the migration traffic. Also, SMS Requestors 1808 may not or do not need to be aware of the VSMR migration if the VSMR and its mashup result are separated. In other words, SMS Requestors 1808 may still retrieve the mashup result by sending the retrieval request to the same SMRS Host 2304.

Particularly with reference to FIG. 24, at step 2411, which may be the beginning, VSMR1 is created and hosted at VSMR Host 2302. The corresponding mashup result is stored at SMRS Host as indicated by smrsID attribute of VSMR1. At step 2412, VSMR1 migrates to another VSMR Host 2402 due to reasons such as load-balancing. The whole VSMR1 may be copied from VSMR Host1 to VSMR Host 2402. At step 2413, the smrsID attribute of VSMR1 at VSMR Host 2402 is the same and still points to SMRS1 host at SMRS Host 2304. Still the mashup result generated at VSMR Host 2402 may be stored at SMRS Host 2304. But SMRS1 may record VSMR Host 2402 as the new host of its corresponding VSMR1. At step 2414, SMS Requestor 1808 still retrieves the mashup result as usual from SMRS Host 2304. SMS Requestor 1808 may not be aware of VSMR1's migration from VSMR Host 2302 to VSMR Host 2402.

It is understood that the entities performing the steps illustrated in FIG. 24 may be logical entities that may be implemented in the form of software (e.g., computer-executable instructions) stored in a memory of, and executing on a processor of, an apparatus configured for wireless or network communications or a computer system such as those illustrated in FIG. 51C or FIG. 51D. That is, the method(s) illustrated in FIG. 24 may be implemented in the form of software (e.g., computer-executable instructions) stored in a memory of an apparatus, such as the apparatus or computer system illustrated in FIG. 51C or FIG. 51D, which computer executable instructions, when executed by a processor of the apparatus, perform the steps illustrated in FIG. 24. It is also understood that the functionality illustrated in FIG. 24 may implemented as a set of virtualized network functions. The network functions may not necessarily communicate directly, rather, they may communicate via forwarding or routing function. It is also understood that any transmitting and receiving steps illustrated in FIG. 24 may be performed by communication circuitry of the apparatus under control of the processor of the apparatus and the computer-executable instructions (e.g., software) that it executes.

Semantic Mashup Profile Discovery and Retrieval (Task( ) of Semantic Mashup)—SMP Resource Any SMP 1802 in the SMP library may include the following attributes: smpID, memberFilter, inputDescriptor, functionDescriptor, and outputDescriptor, which are detailed as follows. The smpID attribute indicates the ID of the SMP (e.g. its URI). It should be a unique identifier within the SMP Host 1810 (or the SMS Host) which hosts the SMP 1802.

The memberFilter attribute may be used to indicate a set of criteria to determine the set of the mashup members from a number of original resources at the same Resource Host or different Resource Hosts 2804. The memberFilter attribute may be described by metadata models, such as RDF triples. The SMS Host may generate a semantic query based on the metadata in the memberFilter attribute. One example is shown in FIG. 25, where the metadata in the memberFilter attribute means the nearby parking lots (e.g., the distance between a parking lot and the destination is less than 1 mile) may be the mashup members of the VSMR 1804 if this SMP 1802 may be used to create a new VSMR 1804; meanwhile, each mashup member may have four attributes, e.g., the URI, status, geolocation, and parking rate of the parking lot.

The inputDescriptor attribute may include a number of input parameters and their types. These input parameters may be specified by the SMS Requestor 1808 when it tries to apply this SMP 1802 to create a VSMR 1804. The inputDescriptor attribute is described by semantic metadata, such as RDF triples. By obtaining inputDescriptor attribute, the SMS Requestor 1808 may understand the number of required input parameters and the type of each required input parameter. One example is shown in FIG. 25, where one geolocation input parameter (which includes the longitude and latitude value of the location) should be provided by the SMS Requestor 1808 when it tries to apply this SMP 1802 to create a VSMR 1804.

The outputDescriptor attribute defines the number of output parameters and their corresponding types. The outputDescriptor attribute is described by semantic metadata, such as RDF triples. One example is shown in FIG. 25, where the metadata in the outputDescriptor attribute means the URI, status, geolocation, and parking rate of the selected parking lot may be returned to the SMS Requestor.

The functionDescriptor attribute is to describe a mashup function of the SMP 1802. The mashup function is applied over the mashup members to generate the outputs (e.g. mashup result), which may be defined in the outputDescriptor attribute. The content of functionDescriptor attribute may be a script described by any programming language that may be understood by the SMS Host. One example is shown in FIG. 25, where the functionDescriptor attribute is described by a set of programming codes indicating how to select the most suitable parking lot among the mashup members and the mashup function would return back the URI, status, geolocation, and parking rate of this suitable parking lot.

A SMP 1802 may also include a <semanticDescriptor> child resource, which is detailed as follows. The <semanticDescriptor> child resource is to indicate what kind of mashup metric is applied, which ontologies may be used for describing this SMP 1802, and this metric may be applied in what kind of SMS (e.g., the metric may be used in what kind of application scenario). The descriptor attribute of the <semanticDescriptor> resource is described as RDF triples. One example is shown in FIG. 25, where the metadata in the <semanticDescriptor> resource indicates the type of this SMP 1802 is "SuitableParkingLot" (e.g., this SMP 1802 is applicable in the FindParkingLot service) and the mashup metric of this SMP 1802 is "jointOptimization" (e.g., jointly consider the parking rate of the parking lot and the distance between the parking lot and the destination). [In order to clearly illustrate the procedure, consider the shorter distance between the parking lot and the destination would result in the lower time cost for this parking lot. In other words, if the parking lot is much closer to the distance, user would cost less time to reach to the destination from the parking lot.] Semantic Mashup Profile Discovery and Retrieval (Task( ) of Semantic Mashup)—SMP Discovery and Retrieval Assuming an SMS Requestor 1808 is provisioned or discovers the address of an SMS Host (or an SMP Host 1810), it may discover a certain type of SMPs 1802 and retrieve its representations from the SMS Host by applying the following steps.

Figure 26:
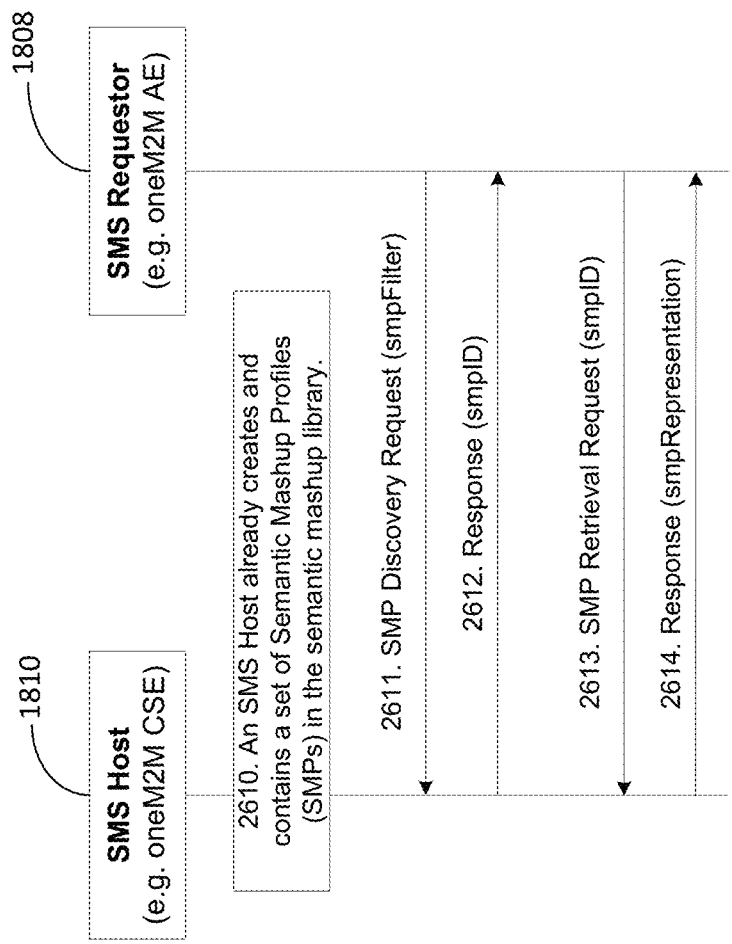
FIG. 26 illustrates an exemplary diagram of SMP discovery and retrieval.

Step 2611 of FIG. 26: The SMS Requestor 1808 sends an SMP discovery request to an SMS Host (note that the SMS Requestor 1808 may also send the SMP discovery request to the central semantic graph store and the central semantic graph store may respond to the request). The SMP discovery request may include smpFilter, which normally specifies the type of SMP 1802 or the mashup metric. For instance, if the SMS Requestor 1808 tries to discover the SMP resources that may be applied in the "FindParkingLot" application, then the value of smpFilter may be as follows:

```
SELECT ?smp
WHERE { ?smp    rdf:type        smp:semanticMashupProfile .
        ?smp    base: hasService   smp:FindParkingLot .
      }
```

Step 2612 of FIG. 26: The SMS Host may send the response to the SMS Requestor 1808 including the smpIDs of the qualified SMPs 1802, which has semantic information included in <semanticDescriptor> child resource and satisfying the criteria described by smpFilter). Note that the SMS Host may conduct the access control to check whether the SMS Requestor 1808 has the proper privileges to discover the qualified SMPs 1802. In other words, if the SMS Requestor 1808 is not authorized to discover an SMP, the SMS Host may not send the corresponding smpID to the SMS Requestor.

Step 2613 of FIG. 26: After receiving the smpIDs of the qualified SMPs 1802, the SMS Requestor 1808 may send an SMP retrieval request to retrieve one of the discovered SMPs 1802 in Step 2612.

Step 2614 of FIG. 26: After receiving the SMP retrieval request, the SMS Host may send a response, which includes the representations of the corresponding SMP 1802. Note that the SMS Host may conduct the access control to check whether the SMS Requestor 1808 has the proper privileges to retrieve the SMP's representations. In other words, if the SMS Requestor 1808 is not authorized to retrieve the SMP's representation, the SMS Host may send a proper error code to the SMS Requestor.

It is understood that the entities performing the steps illustrated in FIG. 26 may be logical entities that may be implemented in the form of software (e.g., computer-executable instructions) stored in a memory of, and executing on a processor of, an apparatus configured for wireless or network communications or a computer system such as those illustrated in FIG. 51C or FIG. 51D. That is, the method(s) illustrated in FIG. 26 may be implemented in the form of software (e.g., computer-executable instructions) stored in a memory of an apparatus, such as the apparatus or computer system illustrated in FIG. 51C or FIG. 51D, which computer executable instructions, when executed by a processor of the apparatus, perform the steps illustrated in FIG. 26. It is also understood that the functionality illustrated in FIG. 26 may implemented as a set of virtualized network functions. The network functions may not necessarily communicate directly, rather, they may communicate via forwarding or routing function. It is also understood that any transmitting and receiving steps illustrated in FIG. 26 may be performed by communication circuitry of the apparatus under control of the processor of the apparatus and the computer-executable instructions (e.g., software) that it executes.

Virtual Semantic Mashup Resource Creation (Task1 of Semantic Mashup)

A VSMR 1804 is considered as a type of resource that may exist at SMS Hosts or VSMR Hosts. Any VSMR 1804 may include vsmrID, smpID, smrsStoreType, smrsID, memberStoreType, mashupMemberID, resultGenType, periodForResultGen, smpInputPara, smrs, mashupMember, <semanticDescriptor>, or <subscription> parameters. Note that each of these parameters may be an attribute or a child resource of the VSMR 1804.

The vsmrID parameter indicates the ID of this VSMR 1804. It may be represented as the URI of the VSMR resource.

The smpID parameter indicates which SMP resource is applied to the VSMR resource.

The smrsStoreType parameter indicates the way which semantic mashup results should be stored. Specifically, if smrsStoreType="Child Resource", then mashup results of this VSMR 1804 may be stored as a child resource of this VSMR 1804. If smrsStoreType="Reference", then mashup results of this VSMR 1804 may be stored in a SMRS resource (a different resource from the VSMR 1804). Note that if the SMRS resource is applied to store the mashup results of the VSMR 1804, then the URI of the SMRS resource may be identified by the smrsID parameter of this VSMR 1804.

The smrsID parameter indicates the identifier of the SMRS resource, which is storing the mashup results of this VSMR 1804. Note that the smrsID parameter may not be used if the value of the smrsStoreType is NOT "Reference".

The memberStoreType parameter indicates the way for storing the mashup members of this VSMR 1804. Specifically, if memberStoreType="URI Only", then the VSMR 1804 may use the mashupMemberID parameter (which is described in the next) to maintain the URI of each member resource; if memberStoreType="URI and Value", then the VSMR 1804 may use mashupMember parameter to maintain both the URI and the values of each member resource (e.g., in the "FindParkingLot" application, the VSMR 1804 may maintain the parkingLotStatus, parkingLotLocation, parkingLotRate, and parkingLotURI for each member resource).

The mashupMemberID parameter indicates identifiers of the mashup members of the VSMR 1804. The value of this parameter is a list. This parameter may not be used if the mashupMember parameter is placed directly under the VSMR 1804 as its child resource (e.g. when memberStoreType="URI Only").

The mashupMember parameter includes a set of mashup members, which may be selected from the original resources based on the criteria described in memberFilter of the corresponding SMP 1802 as denoted by the smpID parameter.

The resultGenType parameter implies how the VSMR 1804 generates the mashup result. Specifically, If resultGenType="When VSMR Is Created", the mashup results may be generated when the VSMR 1804 is created; if resultGenType="When SMS Requestor Requests", the mashup result is to be calculated and generated when an SMS Requestor 1808 tries to retrieve mashup results of the VSMR 1804; if resultGenType="Periodically", the mashup result may be calculated and generated periodically (note that the period length is identified by the periodForResultGen attribute); if resultGenType="When A Mashup Member Is Updated", the mashup result may be calculated and generated whenever any update conducts on the mashup members of the VSMR 1804. Note that the value of this attribute is a list, e.g., multiple events may be triggered to calculate and generate the mashup results for the VSMR 1804.

The periodForResultGen parameter indicates the time period for re-calculating and generating the semantic mashup results for the VSMR 1804. When it is the time to re-calculate the semantic mashup result, the SMS Host, which host the VSMR 1804, may retrieve the latest representations of each mashup member if it is not obtained yet. This attribute may be used when resultGenType="Periodically".

The smpinputPara parameter includes the value of input parameters which may be required to calculate the mashup result. The types of these input parameters may be specified by <inputDescriptor> of the corresponding SMP resource, which is identified by the smpID parameter of this VSMR 1804.

The smrs parameter stores the mashup results of the VSMR resource. Note that the smrs parameter may not be used if the value of the smrsStoreType is NOT "Child Resource".

The <semanticDescriptor> parameter indicates what kind of SMS is provided by this VSMR 1804.

The <subscription> parameter includes subscription information on this VSMR 1804.

Figure 28:
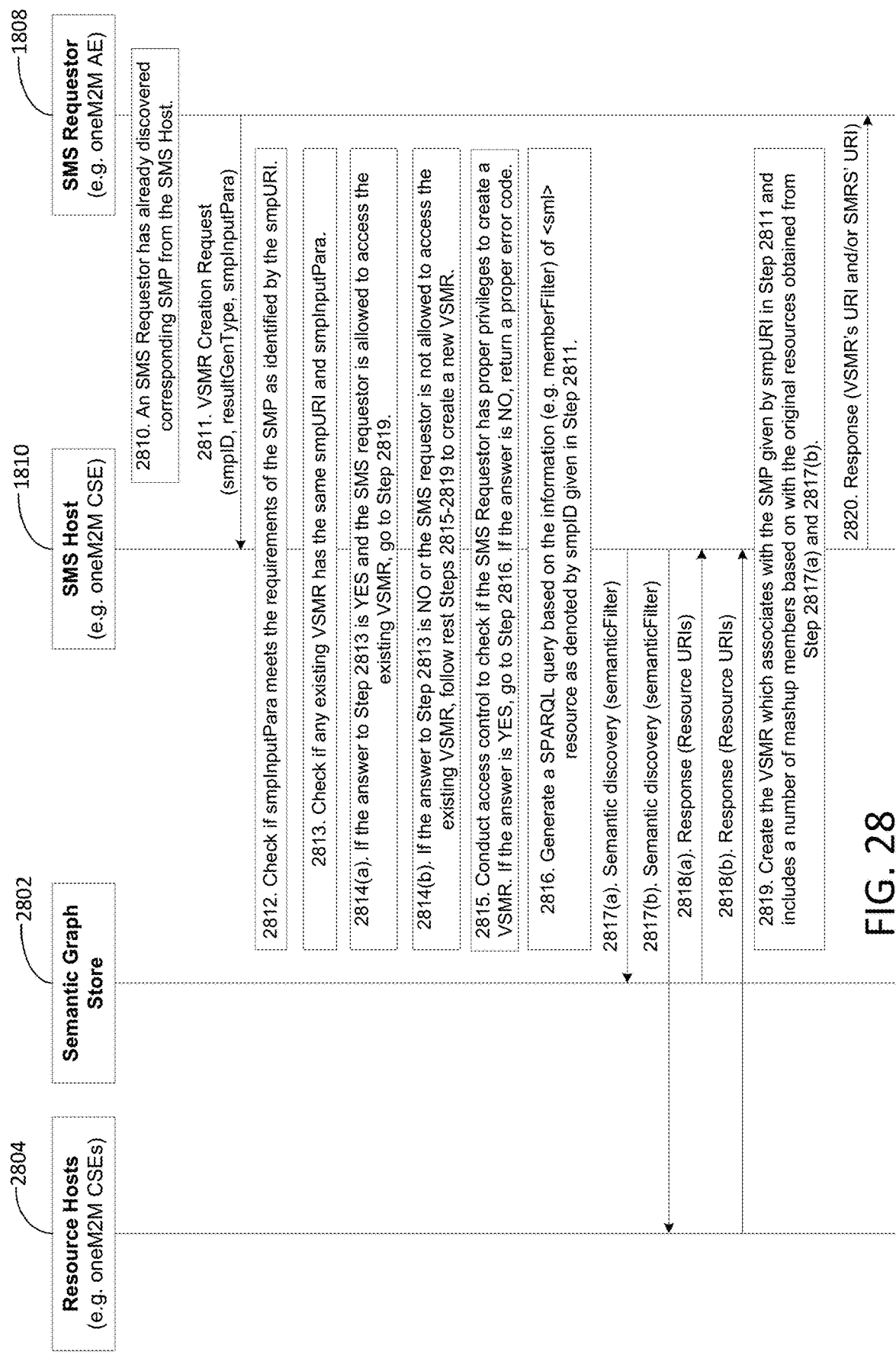
FIG. 28 illustrates an exemplary diagram of a VSMR Creation Procedure.

After obtaining the SMP resource via the semantic mashup profile discovery procedure, the SMS Requestor 1808 may create a VSMR 1804 by applying the discovered SMP resource. The steps for creating a VSMR 1804 is detailed as follows:

Step 2811 of FIG. 28: After an SMS Requestor 1808 discovers and retrieves the SMP 1802, it may send a VSMR creation request to the SMS Host 1810. The VSMR creation request may include the URI of the applied SMP 1802 (e.g., the value of smpID attribute), the value of resultGenType (which indicates how to generate the mashup result), as well as the input parameters (which may be defined and described by the inputDescriptor attribute in the applied SMP 1802). The input parameters may be described by a metadata model, such as RDF triples. For example, if the "SuitableParkingLot" SMP 1802 (described in FIG. 25) is applied to create a new VSMR, then the input parameters in the VSMR creation request may be described as in FIG. 27.

Step 2812 of FIG. 28: After receiving the VSMR creation request, the SMS Host 1810 may first check if the input parameters may be satisfied with the requirement (e.g., the metadata in the inputDescriptor attribute) of the SMP 1802 (which is as identified by the smpID). For instance, if the "SuitableParkingLot" SMP 1802 (described in FIG. 25) is applied, then there should be two input parameters (e.g., the longitude and latitude of the destination) in the VSMR creation request. In other words, the SMS Host may only accept the VSMR creation request, which includes exactly two input parameters (whose types may be longitude and latitude, respectively); otherwise, the SMS Host may reject the VSMR creation request and return an error code to the SMS Requestor.

Step 2813 of FIG. 28: If the received VSMR creation request is valid, the SMS Host may check whether any existing VSMR, which has the same smpID and the same input parameters as those included in the VSMR creation request in Step 2811, has been created or not.

Step 2814 of FIG. 28: If there is an existing VSMR, which has the same smpID and input parameters as those in the VSMR creation request, and the SMS Requestor 1808 is allowed to access this existing VSMR [Normally, the SMS Host may maintain a set of access control polices, which may be pre-configured. Each resource (including VSMR) in the SMS Host may apply any of those access control polices to conduct the access control.] (e.g., Step 2814(*a*)), then the SMS Host may return the URI of this existing VSMR to the SMS Requestor 1808 (e.g., go to Step 2820); otherwise (e.g., the existing VSMR, which has the same smpID and input parameters as those in the VSMR creation request, does NOT allow the SMS requestor 1808 to access; or there is no such an existing VSMR), then the SMS Host may start to create a new VSMR (e.g., go to Step 2825).

Step 2815 of FIG. 28: The SMS Host should determine whether the SMS Requestor 1808 is authorized to create a VSMR for this corresponding type of SMP 1802 by checking the access control policy applied to the SMS Host. If the SMS Requestor 1808 is not allowed to create the VSMR, the SMS Host may return a proper error code to the SMS Requestor 1808 indicating its non-authorization; otherwise, go to Step 2816.

Step 2816 of FIG. 28: The SMS Host may first select suitable original resources to be the new VSMR's mashup members by generating a SPARQL query based on the semantic information included in the memberFilter attribute of corresponding SMP 1802 as denoted by smpID given in the VSMR request. The SPARQL query may be included in Step 2817(*a*) and Step 2817(*b*) as "semanticFilter".

Step 2817 of FIG. 28: If there is a centralized semantic graph store 2802 existed in the service layer, then the SMS Host may send a semantic discovery, which includes "semanticFilter", to the centralized semantic graph store 2802 (e.g., Step 2817(*a*)) in order to find the suitable original resources' URIs. If there is no centralized semantic graph store 2802, then the SMS Host may send the semantic discovery to its registree Resource Hosts 2804 (e.g., Step 2817(*b*)) in order to find the suitable original resources' URIs.

Step 2818 of FIG. 28: If the centralized semantic graph store 2802 receives the semantic discovery request (e.g. Step 2818(*a*)), it may search the maintained RDF triples and return the URIs of qualified original resources to the SMS Host. [The qualified original resource is defined as the original resources, which meet the requirements or criteria in the memberFilter attribute of the applied SMP 1802. For instance, in the "SuitablePakringLot" SMP 1802, the memberFilter attribute defines the qualified resources to be the parking lots, the distance from which to the destination is less than 1 mile.] If the Resource Host receives the semantic discovery request (Step 2818(*b*)), it may build a local semantic graph store, search the RDF triples over the local semantic graph, and return the qualified original resources' URIs to the SMS Host. Note that before returning the qualified original resources' URIs to the SMS Host, the centralized semantic graph store 2802 or Resource Host 2804 could check whether the SMS Host has proper privileges to discover those original resources. [A local semantic graph store is temporary maintained by the Resource Host 2804, e.g., the local semantic graph store one functionality or part of the Resource Host.] It is contemplated herein that the centralized semantic graph store 2802 or Resource Host 2804 may also check whether the SMS Requestor 1808 has proper privileges to include those original resources in the VSMR 1804 (by doing that, the SMS Requestor's information (e.g., ID) may be included in the semantic discovery request in Step 2817). If the SMS Host is not authorized to discover the original resource (alternatively, the SMS Requestor 1808 may not include the original resource in the VSMR 1804), the centralized semantic graph store 2802 or Resource Host 2804 may not send the URI of the original resource to the SMS Requestor 1808.

Step 2819 of FIG. 28: After obtaining the suitable original resources' URI, the SMS Host may create the corresponding VSMR 1804. The values of smpID and resultGenType parameters in the new VSMR may be consistent with the ones included in the VSMR creation request; the value of smrs parameter in the new VSMR may be empty; and the mashupMember parameter includes the qualified original resources and their URIs, which may be obtained from Step 2818, e.g., those qualified original resources become the mashup members of the corresponding VSMR.

Step 2820 of FIG. 28: After successfully creating the requested VSMR, the SMS Host may return the URI of the VSMR or the URI of the VSMR's SMRS to the SMS Requestor 1808 so that the SMS Requestor 1808 may retrieve the content (e.g. mash results) of the VSMR at later time. The response message may also include the number of the mashup members of the created VSMR to the SMS Requestor. This information may be useful since the SMS Requestor 1808 may be aware of the situation where there is no qualified member resources found in Step 2818 (e.g., the VSMR does not have mashup member) or the number of the qualified member resources is not enough to generate the valid mashup results.

It is understood that the entities performing the steps illustrated in FIG. 28 may be logical entities that may be implemented in the form of software (e.g., computer-executable instructions) stored in a memory of, and executing on a processor of, an apparatus configured for wireless or network communications or a computer system such as those illustrated in FIG. 51C or FIG. 51D. That is, the method(s) illustrated in FIG. 28 may be implemented in the form of software (e.g., computer-executable instructions) stored in a memory of an apparatus, such as the apparatus or computer system illustrated in FIG. 51C or FIG. 51D, which computer executable instructions, when executed by a processor of the apparatus, perform the steps illustrated in FIG. 28. It is also understood that the functionality illustrated in FIG. 28 may implemented as a set of virtualized network functions. The network functions may not necessarily communicate directly, rather, they may communicate via forwarding or routing function. It is also understood that any transmitting and receiving steps illustrated in FIG. 28 may be performed by communication circuitry of the apparatus under control of the processor of the apparatus and the computer-executable instructions (e.g., software) that it executes.

After successfully creating a VSMR, other SMS Requestors 1808 may be able to discover and use the VSMR (or the same SMS Requestor 1808 is able to use the VSMR).

Virtual Semantic Mashup Resource Discovery (Task2 of Semantic Mashup)

VSMR discovery means the created VSMR 1804 may be discovered by other SMS Requestors 1808, who are interested in the service provided by the VSMR 1804. Thus, existing VSMRs 1804 may be reused by other SMS Requestors 1808 to improve the system efficiency. For instance, tens of thousands of users may request to find the suitable parking lot near a stadium (e.g. the destination is the same) when there is a football game at the stadium. Then, the VSMR 1804, which provides the service of finding suitable parking lot near the stadium, may be reused by the users so that different users do not necessarily need to create their own VSMRs 1804, which actually provide the same type of SMS.

Figure 29:
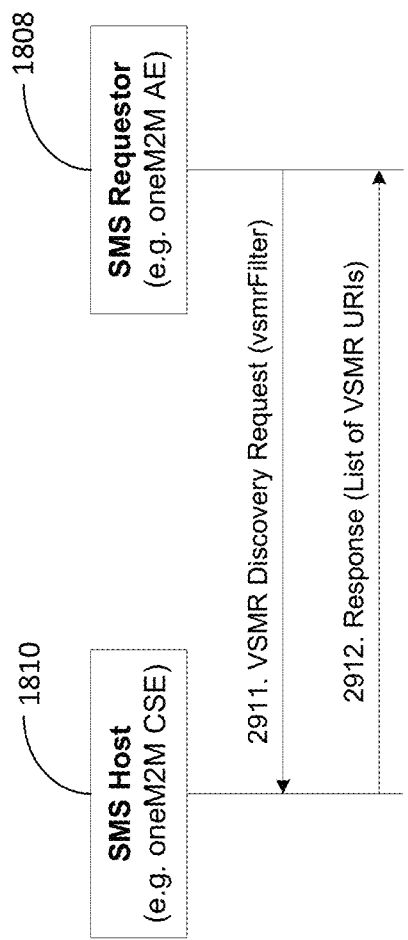
FIG. 29 illustrates an exemplary diagram of a VSMR Discovery.

As shown in FIG. 29, the VSMR discovery procedure may include the following steps:

Step 2911 of FIG. 29: An SMS Requestor, who is interested in a specific SMS, sends a VSMR discovery request to an SMS Host (or a VSMR Host 2302). The VSMR discovery request may include vsmrFilter, which includes a SPARQL query based on the type of SMS requested by the SMS Requestor.

Step 2912 of FIG. 29: After receiving the VSMR discovery request, the SMS Host may build a local semantic graph store, search the RDF triples over the local semantic graph store, and return the list of the VSMRs which match with the requirements of the VSMR discovery request made by the SMS Requestor. If there is a central semantic graph store at the service layer, the SMS Host may also relay the VSMR discovery request to the central semantic graph store, which may search the RDF triples and return the list of the matched VSMRs' URIs to the SMS Host. Consequently, the SMS Host would relay the list of the matched VSMR resources' URIs to the SMS Requestor. Note that the SMS Host or central graph store may conduct the access control to check whether the SMS Requestor 1808 has the proper privileges to discover the matched VSMRs. In other words, if the SMS Requestor 1808 is not authorized to discover a VSMR, then the SMS Host may not send the URI of the VSMR to the SMS Requestor 1808 even if the VSMR matches the requirements of the VSMR discovery request.

It is understood that the entities performing the steps illustrated in FIG. 29 may be logical entities that may be implemented in the form of software (e.g., computer-executable instructions) stored in a memory of, and executing on a processor of, an apparatus configured for wireless or network communications or a computer system such as those illustrated in FIG. 51C or FIG. 51D. That is, the method(s) illustrated in FIG. 29 may be implemented in the form of software (e.g., computer-executable instructions) stored in a memory of an apparatus, such as the apparatus or computer system illustrated in FIG. 51C or FIG. 51D, which computer executable instructions, when executed by a processor of the apparatus, perform the steps illustrated in FIG. 29. It is also understood that the functionality illustrated in FIG. 29 may implemented as a set of virtualized network functions. The network functions may not necessarily communicate directly, rather, they may communicate via forwarding or routing function. It is also understood that any transmitting and receiving steps illustrated in FIG. 29 may be performed by communication circuitry of the apparatus under control of the processor of the apparatus and the computer-executable instructions (e.g., software) that it executes.

Virtual Semantic Mashup Resource Retrieval (Task3 of Semantic Mashup)

An SMS Requestor 1808 may retrieve the content of the mashup results by applying the following steps.

Figure 30:
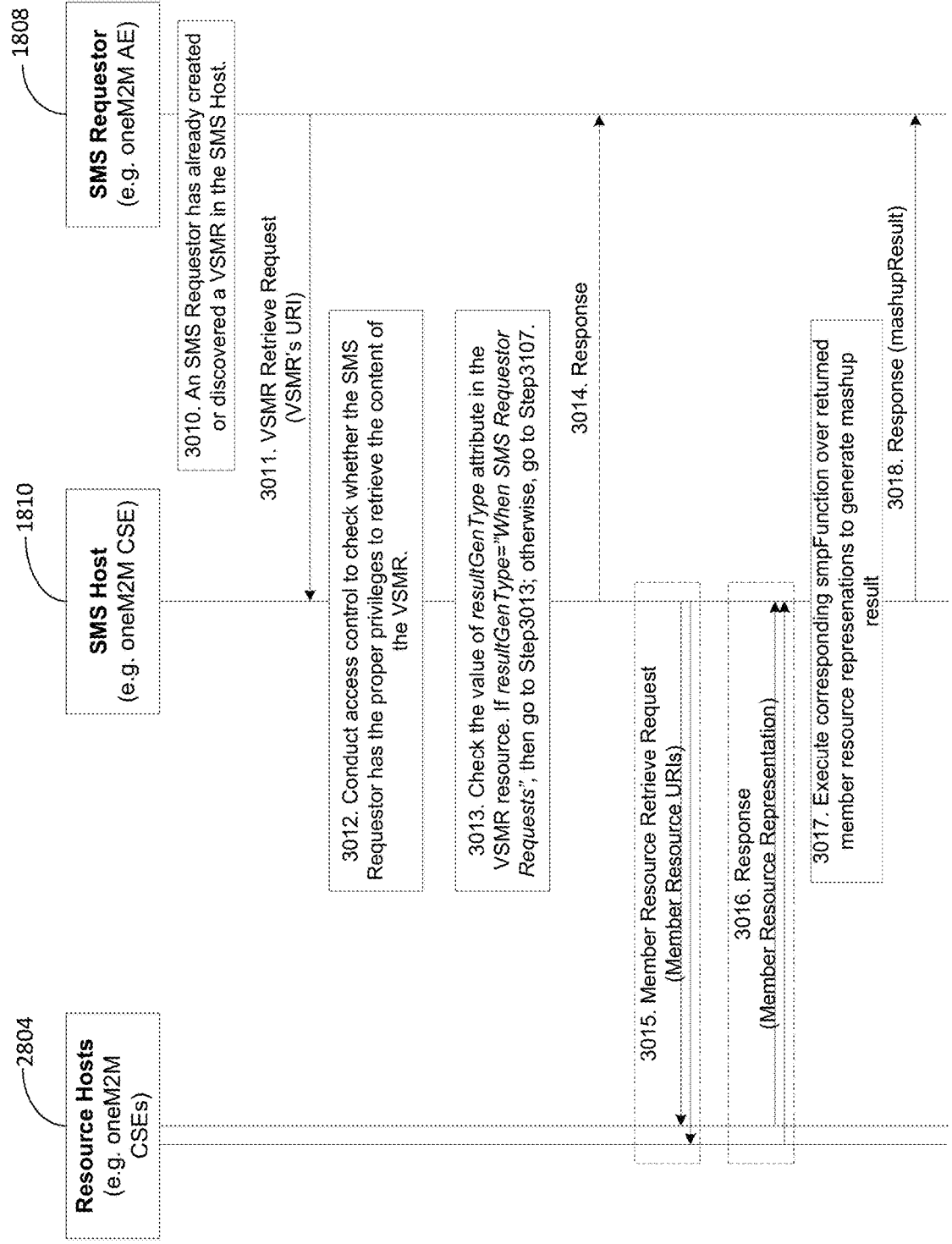
FIG. 30 illustrates an exemplary diagram of a VSMR Retrieval Procedure.

Step 3010 of FIG. 30: Before retrieving the mashup results of the VSMR 1804, the SMS Requestor 1808 may first create or discover the corresponding VSMR 1804.

Step 3011 of FIG. 30: After creating or discovering the VSMR 1804, the SMS Requestor 1808 should have known the URI of the VSMR resource. Thus, the SMS Requestor 1808 may send a VSMR retrieve request, which includes the URI of the VSMR resource, to the SMS Host. [Essentially, the VSMR retrieve request is to retrieve the mashup results of the VSMR 1804. Also, the SMS Requestor 1808 may send SMRS retrieve request to retrieve the mashup results of the corresponding VSMR 1804.]

Step 3012 of FIG. 30: SMS Host should check whether the SMS Requestor 1808 has proper privileges to access the VSMR 1804. If the SMS Requestor 1808 may not access the VSMR 1804, the SMS Host may return a proper error code indicating its non-authorization; otherwise, go to Step 3013.

Step 3013 of FIG. 30: There may be different ways for the VSMR 1804 to generate the mashup result, which may be defined by resultGenType (e.g., one attribute of the VSMR 1804). Specifically, if the value of the resultGenType parameter in the VSMR resource is "When SMS Requestor Requests", then the VSMR 1804 may start to retrieve the representations of its mashup members (e.g., go to Step 3013) once it receives the VSMR retrieve request; otherwise, the VSMR 1804 may directly respond with the current mashup results (e.g., go to Step 3017), which is implied by the <smrs> child resource of the VSMR resource. The detail description of resultGenType is shown in Table 10.

Step 3014 of FIG. 30: Calculating the mashup results may take a long time, in order to avoid the SMS Requestor 1808 retransmitting the VSMR retrieve request (due to the reason that the SMS Requestor 1808 does not receive the response during the timeout period), the SMS Host may immediately send an acknowledgement (without including the mashup results of the VSMR 1804) to the SMS Requestor 1808 to indicate that the SMS Host has received the VSMR retrieve request and is calculating the mashup results.

Step 3015 of FIG. 30: The SMS Host may send a mashup member resource retrieve request to each mashup member. Each mashup member resource retrieve request may include the corresponding mashup member's URI.

Step 3016 of FIG. 30: After receiving the mashup member resource retrieve request, the Resource Host may respond with the representations of the corresponding member resource to the SMS Host. Note that the Resource Host may also conduct the access control to check whether the SMS Host has the proper privileges to retrieve the member resource (in an example the Resource Host may also check the SMS Requestor 1808 has the proper privileges to retrieve the member resource; by doing so, the SMS Requestor's information (e.g., ID) may be included in the member resource retrieve request in Step 3015). If the SMS Host is not authorized to retrieve the member resource (or if the SMS Requestor 1808 is not authorized to retrieve the member resource), then the Resource Host may not send the representations of the member resource to the SMS Requestor; instead, it may return a proper error code.

Figure 31:
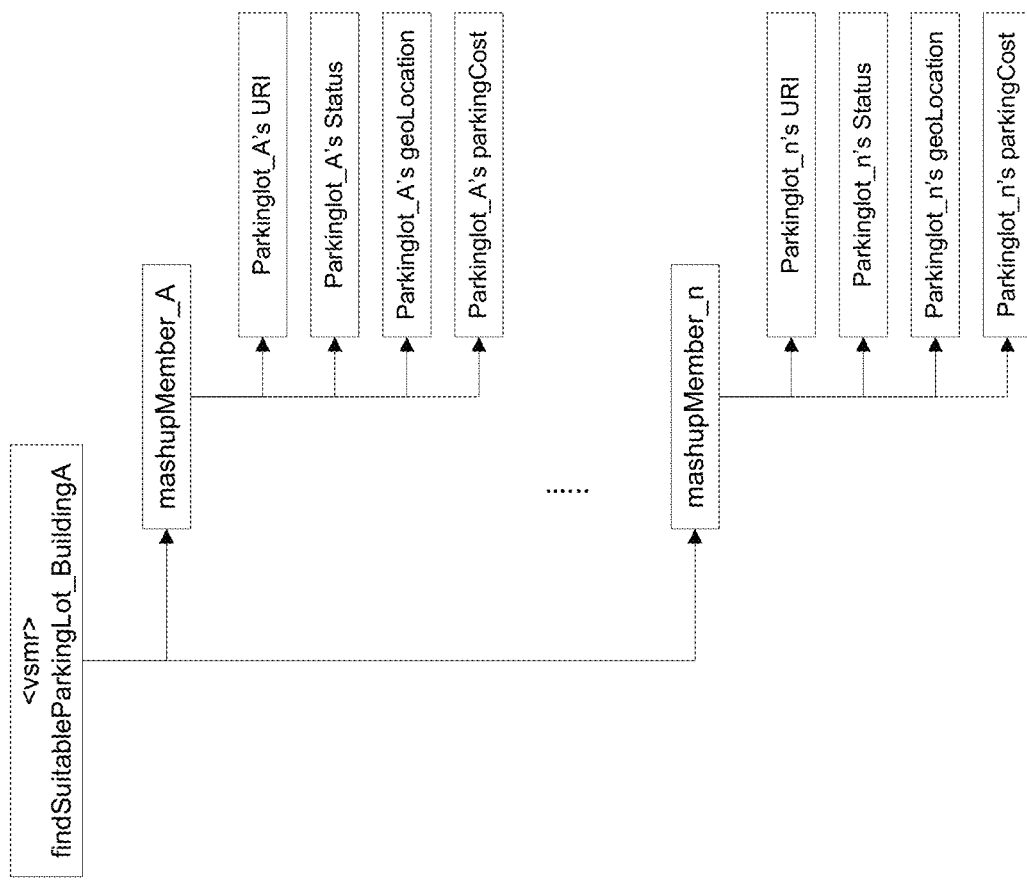
FIG. 31 illustrates an exemplary diagram of one example of storing representations of mashup members in VSMR.

Step 3017 of FIG. 30: After receiving the representations of mashup members, the SMS Host may store these representations in the VSMR resource (note that the expiration time of storing these representations may be based on the expiration time of these representations in the original resources). For instance, in the findParkingLot example, the VSMR resource may obtain the status, geolocation, and parking rate information of its mashup members (which is described as the parking lots near the destination). Thus, as shown in FIG. 31, this information may be stored under the VSMR resource. (Note that it may not be used to store this information under the VSMR 1804, e.g., the VSMR 1804 may just store the URIs of the original resources and retrieve their representations on demand) Afterwards, the SMS Host executes the mashup function, which is described in the functionDescriptor attribute of the corresponding SMP 1802 (which is applied by this VSMR 1804). The outputs of the mashup function may be stored within the VSMR 1804 or in the SMRS 1806. In the findParkingLot example, the outputs may be the status, location, and parking rate information of the most suitable parking lot.

Step 3018 of FIG. 30: The SMS Host sends the mashup results, which is stored in the SMRS 1806, to the SMS Requestor 1808 in order to respond to the VSMR retrieve request from Step 3011.

It is understood that the entities performing the steps illustrated in FIG. 30 may be logical entities that may be implemented in the form of software (e.g., computer-executable instructions) stored in a memory of, and executing on a processor of, an apparatus configured for wireless or network communications or a computer system such as those illustrated in FIG. 51C or FIG. 51D. That is, the method(s) illustrated in FIG. 30 may be implemented in the form of software (e.g., computer-executable instructions) stored in a memory of an apparatus, such as the apparatus or computer system illustrated in FIG. 51C or FIG. 51D, which computer executable instructions, when executed by a processor of the apparatus, perform the steps illustrated in FIG. 30. It is also understood that the functionality illustrated in FIG. 30 may implemented as a set of virtualized network functions. The network functions may not necessarily communicate directly, rather, they may communicate via forwarding or routing function. It is also understood that any transmitting and receiving steps illustrated in FIG. 30 may be performed by communication circuitry of the apparatus under control of the processor of the apparatus and the computer-executable instructions (e.g., software) that it executes.

Also, the SMS Requestor 1808 may subscribe to the VSMR resource so that the SMS Host would automatically send the mashup results to the SMS Requestor 1808 once the mashup result is updated (e.g., the mashup result be should periodically calculated if resultGenType="Periodically" and the SMS Host may send the updated mashup result to the SMS Requestor, who subscribes to the VSMR 1804). The following steps may be applied.

Step 3210: Before subscribing to the VSMR 1804, the SMS Requestor 1808 may have already created or discovered the corresponding VSMR 1804.

Figure 32:
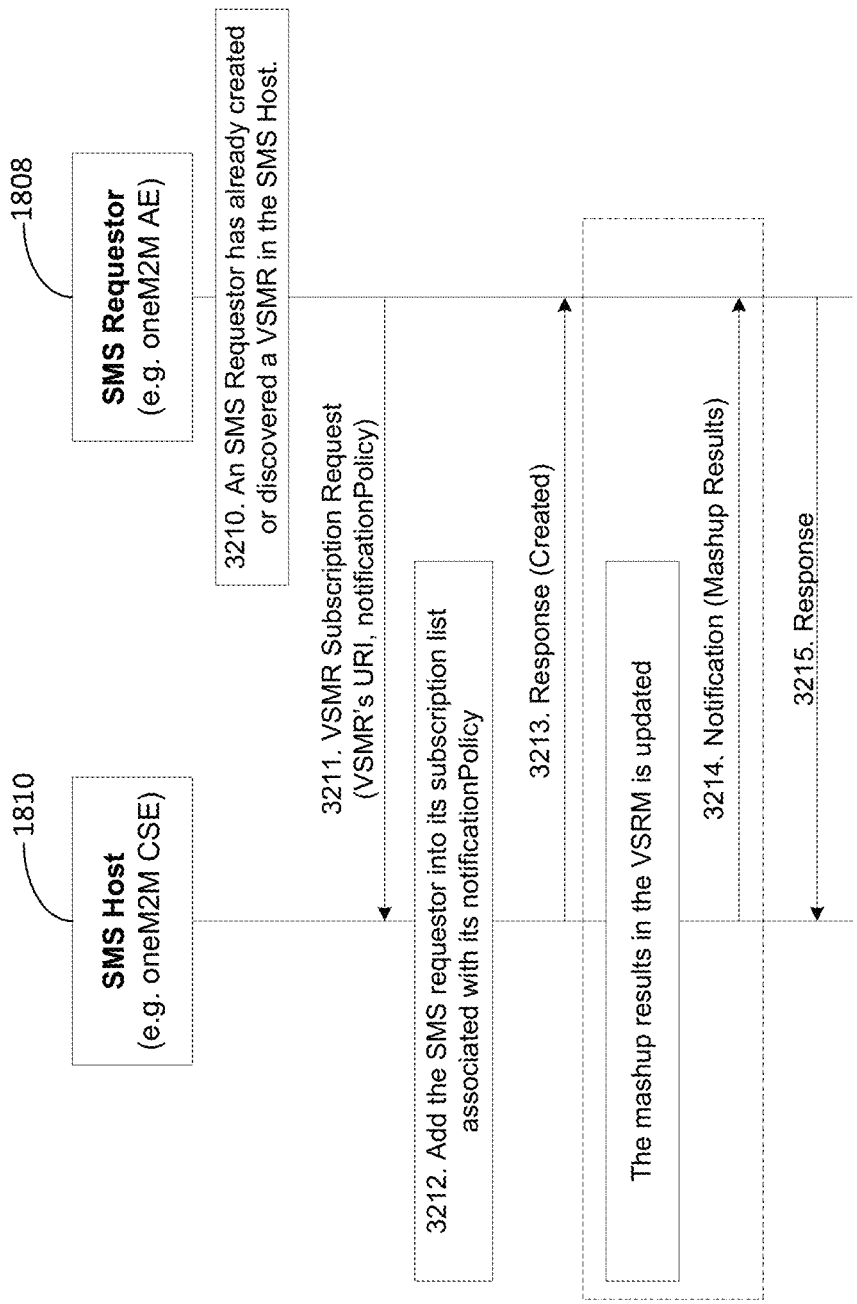
FIG. 32 illustrates an exemplary diagram of an SMS requestor subscribe to a VSMR

Step 3211 of FIG. 32: As shown in FIG. 32, the SMS Requestor 1808 sends a VSMR subscription request to the SMS Host. The VSMR subscription request includes the URI of the SMS Requestor 1808 (e.g., the subscriber's URI, which implies where the notification should be sent), notificationContentType (which indicate the content type of the notification), and eventNotificationCriteria (which indicates the triggering events for the SMS Host sending the notification to the SMS Requestor). Normally, for the VSMR resource, the SMS Host triggers to send the notification to the SMS Requestor 1808 once the mashup result is updated and the content in the notification message may be the updated mashup result (for instance, in the findParkingLot application, the mashup result may be the URI, status, geolocation, and parking rate of the most suitable parking lot).

Step 3212 of FIG. 32: After receiving the VSMR subscription request, the SMS Host may add the SMS Requestor 1808 to the subscription list in the VSMR resource associated with its notificationContentType and eventNotificationCriteria.

Step 3213 of FIG. 32: The SMS Host may send a response message to the SMS Requestor 1808 indicating the SMS Requestor 1808 has successfully subscribed to the VSMR resource.

Step 321 of FIG. 32: Once the mashup result in the VSMR 1804 is updated, the SMS Host may immediately send a notification to the SMS Requestor. The content of the notification message is indicated by notificationContentType.

Step 3215 of FIG. 32: The SMS Requestor 1808 may send a response message to the SMS Host indicating it has successfully received the notification message.

It is understood that the entities performing the steps illustrated in FIG. 32 may be logical entities that may be implemented in the form of software (e.g., computer-executable instructions) stored in a memory of, and executing on a processor of, an apparatus configured for wireless or network communications or a computer system such as those illustrated in FIG. 51C or FIG. 51D. That is, the method(s) illustrated in FIG. 32 may be implemented in the form of software (e.g., computer-executable instructions) stored in a memory of an apparatus, such as the apparatus or computer system illustrated in FIG. 51C or FIG. 51D, which computer executable instructions, when executed by a processor of the apparatus, perform the steps illustrated in FIG. 32. It is also understood that the functionality illustrated in FIG. 32 may implemented as a set of virtualized network functions. The network functions may not necessarily communicate directly, rather, they may communicate via forwarding or routing function. It is also understood that any transmitting and receiving steps illustrated in FIG. 32 may be performed by communication circuitry of the apparatus under control of the processor of the apparatus and the computer-executable instructions (e.g., software) that it executes.

Joint Virtual Semantic Mashup Resource Creation and Retrieval

As described previously, an SMS Requestor 1808 may first create a VSMR 1804; then the SMS Host, which hosts the created VSMR resource, informs the SMS Requestor 1808 of the URI of the created VSMR resource in order to reuse the created VSMR resource in the future (e.g., the SMS Requestor 1808 may retrieve the content of the VSMR resource by sending a VSMR retrieval request to the URI in the future).

However, there are scenarios where it is not necessary to inform the SMS Requestor 1808 about the URI of the VMSR resource since the SMS Requestor 1808 may not retrieve the mashup results of the VSMR in the future. In other words, after obtaining the mashup results, the SMS Requestor 1808 may not be interested in future mashup results of the VSMR 1804 anymore. Thus, instead of sending the URI of the created VSMR 1804 to the SMS Requestor, the SMS Host may immediately calculate the mashup results after creating the VSMR 1804, and send the mashup results to the SMS Requestor. This is referred to as joint virtual semantic mashup resource creation and retrieval.

A SMS Requestor 1808 may apply the following steps to jointly create a VSMR 1804 and retrieve the mashup results of the created VSMR 1804.

Figure 33:
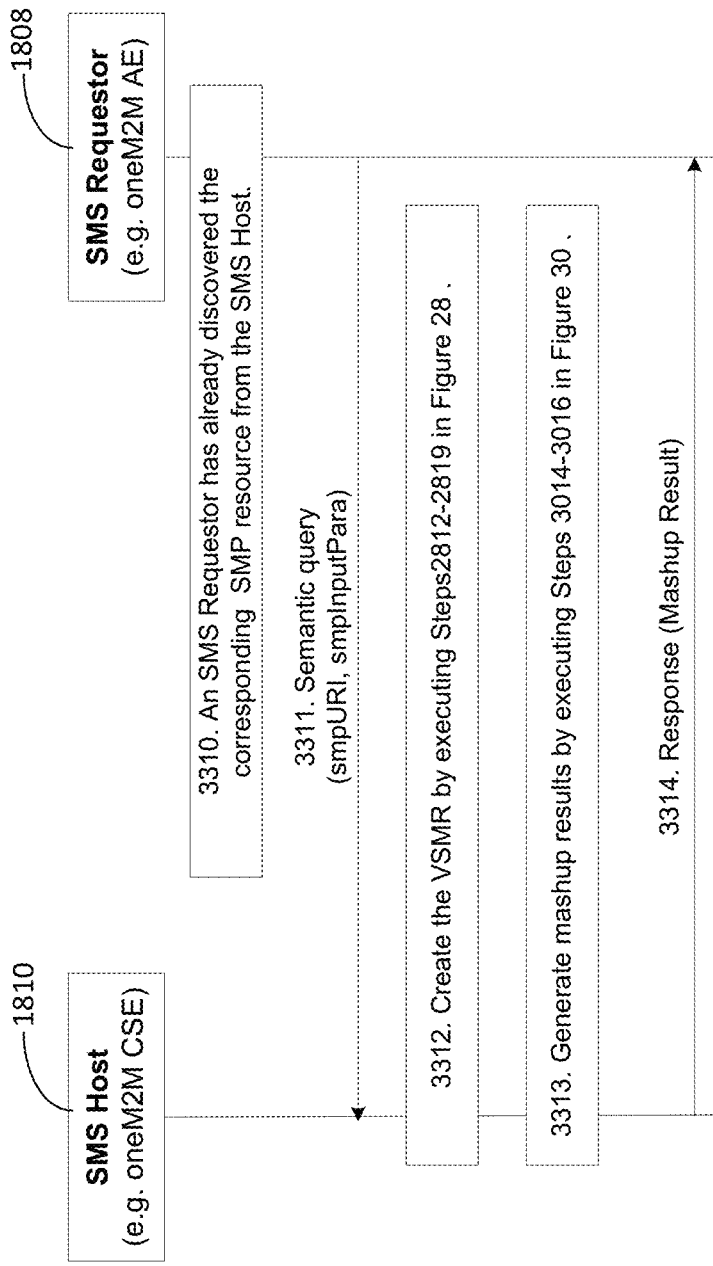
FIG. 33 illustrates an exemplary diagram of joint VSMR creation and retrieval.

Step 3310 of FIG. 33: Before jointly creating and retrieving a new VSMR resource, the SMS Requestor 1808 may have already discovered the corresponding SMP resource from the SMS Host.

Step 3311 of FIG. 33: The joint VSMR creation and retrieval procedure is triggered by the SMS Requestor 1808 sending a semantic query request (rather than sending a VSMR creation request in the VSMR creation procedure). The semantic query may include the value of smpID and smpinputPara. For instance, in the findSuitablePakingLoting application, the semantic query request may be expressed as "find the SuitableParkingLot for me where my destination is [−73.985833°, 40.748417°], where information highlighted in Blue (SuitableParkingLot) includes the value of smpID and the information highlighted in Orange ([−73.985833°, 40.748417°]") includes the value of smpinputPara. Note that if the joint VSMR creation and retrieval method is applied, the value of resultGenType is set to be "When VSMR Is Created" by default (the detail description of resultGenType is shown in Table 10), e.g., the mashup results of the VSMR 1804 may be calculated when the VSMR 1804 is created at the SMS Host.

Step 3312 of FIG. 33: After receiving the semantic query request, the SMS Host may first create the VSMR 1804 by applying the corresponding SMP resource, which is identified by the smpID value in the semantic query request. The procedure for the SMS Host creating the VSMR 1804 follows Step 2812-2819 described in FIG. 28.

Step 3313 of FIG. 33: After successfully creating the resource, the SMS Host may immediately trigger to generate the mashup results in the VSMR resource by executing Step 3014-3016 in FIG. 30.

Step 3314 of FIG. 33: After successfully generating the mashup results in the VSMR 1804, the SMS Host may send the mashup results to the SMS Requestor 1808 in order to respond the semantic query in Step 3311. Then the SMS Host may remove the created VSMR resource.

It is understood that the entities performing the steps illustrated in FIG. 33 may be logical entities that may be implemented in the form of software (e.g., computer-executable instructions) stored in a memory of, and executing on a processor of, an apparatus configured for wireless or network communications or a computer system such as those illustrated in FIG. 51C or FIG. 51D. That is, the method(s) illustrated in FIG. 33 may be implemented in the form of software (e.g., computer-executable instructions) stored in a memory of an apparatus, such as the apparatus or computer system illustrated in FIG. 51C or FIG. 51D, which computer executable instructions, when executed by a processor of the apparatus, perform the steps illustrated in FIG. 33. It is also understood that the functionality illustrated in FIG. 33 may implemented as a set of virtualized network functions. The network functions may not necessarily communicate directly, rather, they may communicate via forwarding or routing function. It is also understood that any transmitting and receiving steps illustrated in FIG. 33 may be performed by communication circuitry of the apparatus under control of the processor of the apparatus and the computer-executable instructions (e.g., software) that it executes.

Virtual Semantic Mashup Resource Maintenance (Task4 of Semantic Mashup)

VSMR 1804 maintenance may include: 1) adding a new qualified resource to be the mashup member in the VSMR resource; 2) removing a deleted or unqualified mashup member in the VSMR resource; or 3) updating the representations of the mashup members in the VSMR resource. The VMSR resource maintenance may be initialized by the SMS Host or by the Resource Host.

Figure 34:
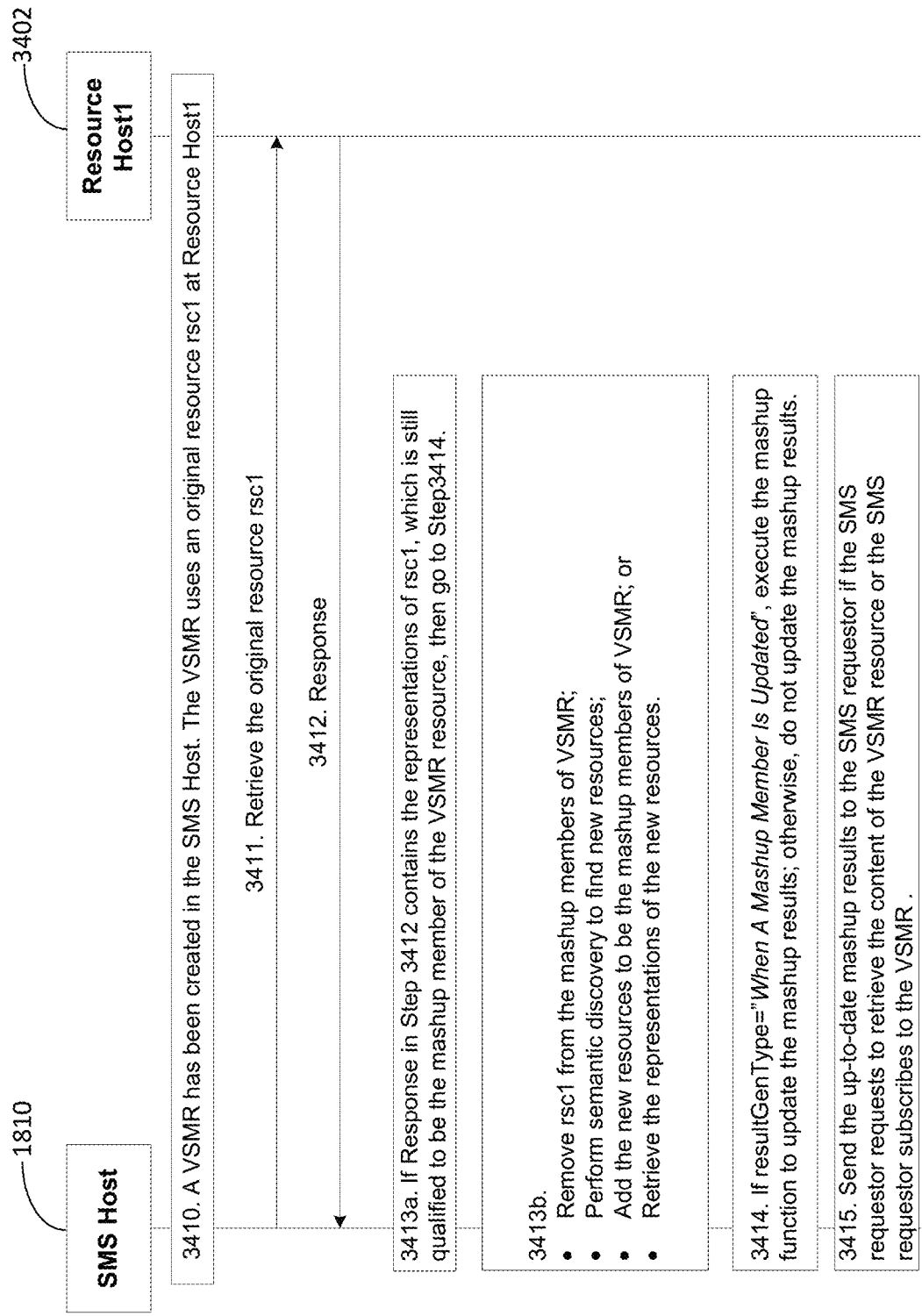
FIG. 34 illustrates an exemplary diagram of a SMS host checking original resources by sending resource retrieve requests.

SMS Host Checks Changes on Original Resource are disclosed below. The SMS Host may initiate the VSMR resource maintenance by applying the following steps:

Step 3410 of FIG. 34: Before the SMS Host 1810 initiates the VSMR resource maintenance, the VSMR 1804 may have already been created in the SMS Host 1810. Assume that one of the mashup member of the VSMR 1804 is the original resource (e.g., rsc1) in Resource Host1 3402.

Step 3411 of FIG. 34: The SMS Host may check changes on the original resource (e.g., conduct the VSMR maintenance) by sending resource retrieval requests to its mashup members. As shown in FIG. 34, the SMS Host sends a resource retrieval request to one of the VSMR's mashup members, e.g., rsc1, hosted by Resource Host1 3402.

Step 3412 of FIG. 34: After receiving the resource retrieval request, Resource Host1 may send the corresponding response to the SMS Host 1810.

Step 3413(*a*) of FIG. 34: If the response message in Step 3412 just includes the representation of rsc1 and rsc1 is still qualified to be the mashup member of the VSMR 1804 (e.g., rsc1 satisfies the criteria described in memberFilter (which is one attribute of the SMP applied by the VSMR 1804)), then the SMS Host 1810 may update the representation of the mashup member based on the representation of rsc1 and go to Step 3414.

Step 3413(*b*) of FIG. 34: If the response message in Step 3412 indicates that rsc1 does not exist (for instance, some street parking meters may be removed during the road construction in the "findSuitableParkingLot" application) or the SMS Host 1810 finds that rsc1 is no longer qualified to be the mashup member of the VSMR resource, then rsc1 may be removed from the mashup members of the VSMR resource. Alternatively, the SMS Host 1810 may check for new resource to become a mashup member of the VSMR 1804 by sending a semantic discovery (note that the procedure of finding new mashup members for the VSMR resource may apply to steps 2815-2817 in FIG. 28). If new resources (which are qualified to become mashup members of the VSMR resource) may be found, these new resources may be added to be the mashup members of the VSMR 1804 and the SMS Host 1810 may retrieve the representations of these new resources.

Step 3414 of FIG. 34: After updating the mashup members of the VSMR 1804 resource and their corresponding representations, the SMS Host 1810 may recalculate the mashup results by executing the mashup function (which is described in the functionDescriptor attribute of the applied SMP resource) of the VSMR 1804 over its mashup members if the value of resultGenType equals to "When A Mashup Member Is Updated" (e.g., the SMS Host 1810 may recalculate the mashup result when any update is conducted on the mashup members of the VSMR 1804); otherwise (e.g., the value of resultGenType is NOT equal to "When A Mashup Member Is Updated"), the SMS host 1810 may not recalculate the mashup results.

Step 3415 of FIG. 34: After updating the mashup results, the SMS Host may store the mashup results in the SMRS 1806 and send them to the SMS Requestors 1808 based on a pending retrieve request or due to a subscription on the content (e.g. the mashup results of the VSMR 1804).

It is understood that the entities performing the steps illustrated in FIG. 34 may be logical entities that may be implemented in the form of software (e.g., computer-executable instructions) stored in a memory of, and executing on a processor of, an apparatus configured for wireless or network communications or a computer system such as those illustrated in FIG. 51C or FIG. 51D. That is, the method(s) illustrated in FIG. 34 may be implemented in the form of software (e.g., computer-executable instructions) stored in a memory of an apparatus, such as the apparatus or computer system illustrated in FIG. 51C or FIG. 51D, which computer executable instructions, when executed by a processor of the apparatus, perform the steps illustrated in FIG. 34. It is also understood that the functionality illustrated in FIG. 34 may implemented as a set of virtualized network functions. The network functions may not necessarily communicate directly, rather, they may communicate via forwarding or routing function. It is also understood that any transmitting and receiving steps illustrated in FIG. 34 may be performed by communication circuitry of the apparatus under control of the processor of the apparatus and the computer-executable instructions (e.g., software) that it executes.

Figure 35:
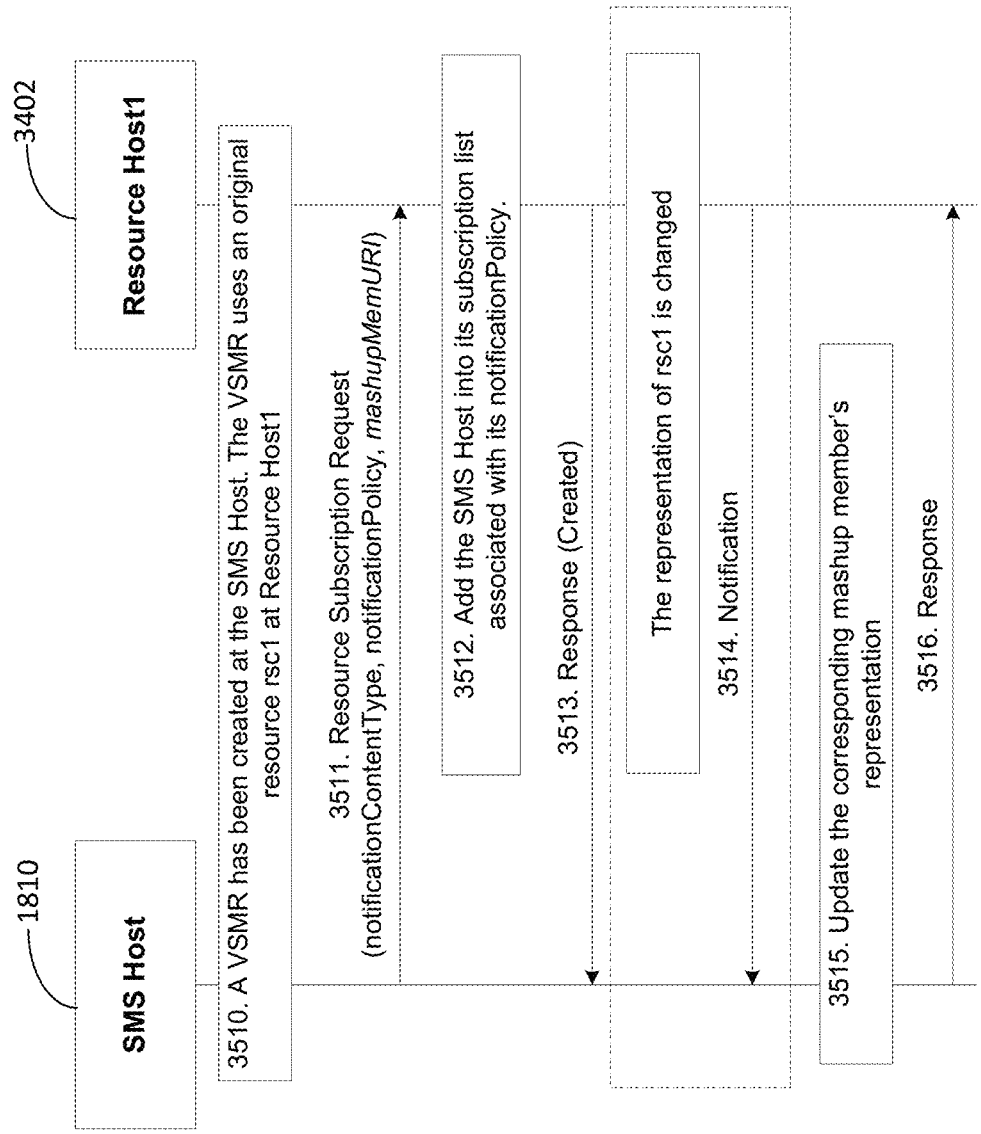
FIG. 35 illustrates an exemplary diagram of SMS host observes on original resources

Resource Host Reports Changes on Original Resources are disclosed below. Resource hosts 2804 may also initiate the VSMR maintenance by proactively reporting changes on original resources. Before the Resource Host proactively reports any changes on the original resources, the SMS Host 1810 (or VSMR Host 2302) may first subscribe to these original resources, which are the mashup members of the corresponding VSMR resource. The following steps are applied:

Step 3510 of FIG. 35: Before subscribing to the VMSR's mashup members, the SMS Host may have already created the VSMR resource. Assume rsc1 (which is a resource hosted by Resource Host1) is one mashup member of the VSMR resource; then FIG. 35 shows the procedures for the SMS Host subscribing to rsc1. Note that SMS Host 1810 subscribing to other original resources may conduct the same steps as the SMS Host 1810 subscribing to rsc1.

Step 3511 of FIG. 35: The SMS Host 1810 may send a resource subscription request to Resource Host1 in order to subscribe to rsc1. The resource subscription request may include notificationContentType, eventNotificationCriteria, and mashupMemURI. nonficationContentType implies the content type in the notification message. eventNotificationCriteria indicates the triggering events for Resource Host1 3402 sending the notification to the SMS Host 1810. Normally, any changes conducted on rsc1 may trigger Resource Host1 sending the notification. mashupMemURI indicates the URI of the VSMR's mashup member; it identifies where the notification should be sent.

Step 3512 of FIG. 35: After receiving the resource subscription request, Resource Host1 may add the mashupMemURI to the subscription list of rsc1 associated with its notificationContentType and eventNotificationCriteria.

Step 3513 of FIG. 35: Resource Host1 3402 may send a response message to the SMS Host indicating the SMS Host has successfully subscribed to rsc1 in Resource Host1.

Step 3514 of FIG. 35: After the SMS Host 1810 subscribing to rsc1, Resource Host1 3402 may send the notification to the URI, which is identified by mashupMemURI in the resource subscription request, once any update is conducted on rsc1's representations.

Step 3515 of FIG. 35: After receiving the notification, the SMS Host 1810 may change the corresponding mashup member's representation.

Step 3516 of FIG. 35: After successfully receiving the notification, the SMS Host 1810 may send the response to Resource Host1 3402 in order to indicate the notification has been successfully received It is understood that the entities performing the steps illustrated in FIG. 35 may be logical entities that may be implemented in the form of software (e.g., computer-executable instructions) stored in a memory of, and executing on a processor of, an apparatus configured for wireless or network communications or a computer system such as those illustrated in FIG. 51C or FIG. 51D. That is, the method(s) illustrated in FIG. 35 may be implemented in the form of software (e.g., computer-executable instructions) stored in a memory of an apparatus, such as the apparatus or computer system illustrated in FIG. 51C or FIG. 51D, which computer executable instructions, when executed by a processor of the apparatus, perform the steps illustrated in FIG. 35. It is also understood that the functionality illustrated in FIG. 35 may implemented as a set of virtualized network functions. The network functions may not necessarily communicate directly, rather, they may communicate via forwarding or routing function. It is also understood that any transmitting and receiving steps illustrated in FIG. 35 may be performed by communication circuitry of the apparatus under control of the processor of the apparatus and the computer-executable instructions (e.g., software) that it executes.

Note that it is possible that rsc1 is not a qualified mashup member of the VSMR 1804 after rsc1's representations have been changed in Step 3515. Thus, the VSMR 1804 may remove rsc1 from its mashup members and send a subscription delete request to Resource Host1. After removing rsc1 from the VSMR's mashup members, the VSMR 1804 may trigger a search for new qualified original resources to be its mashup members by conducting Step 3413(b) and Step 3414 in FIG. 34.

Figure 36:
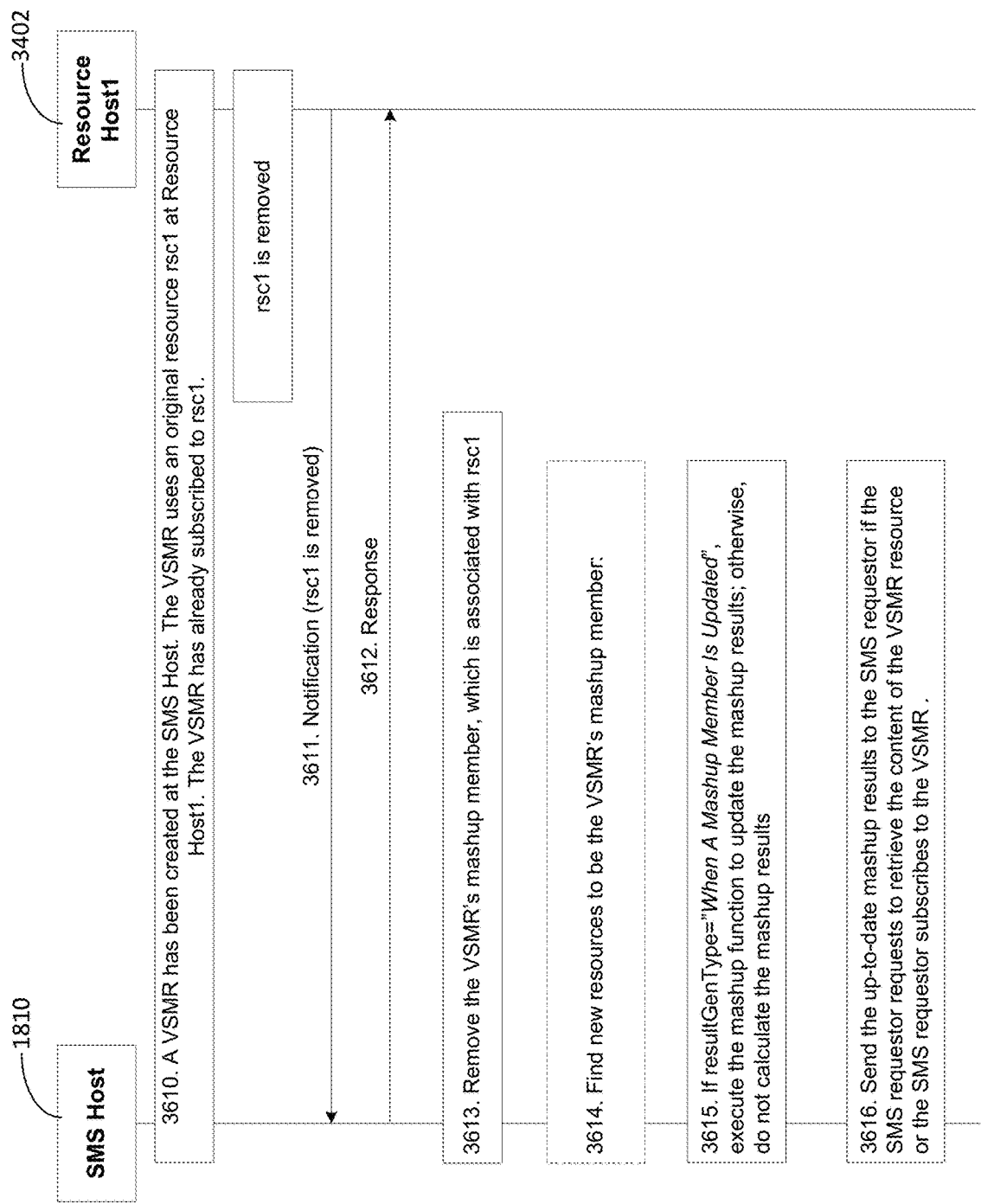
FIG. 36 illustrates an exemplary diagram of a resource host reporting the removal of an original resource

Resource Host Reports the Removal of the Original Resource is disclosed below. Some original resources (which are the mashup member of the VSMR 1804) may be removed from the Resource Host by the creator of those original resources or other service layer entities. Then, the Resource Host may send the notification to inform the VSMR 1804 about the removal of the corresponding original resource. The steps of the Resource Host reporting the removal of the original resource may be shown as follows:

Step 3610 of FIG. 36: Assume the SMS Host 1810 may have already created the VSMR resource and rsc1 (which is a resource hosted by Resource Host1) is one mashup member of the VSMR resource; meanwhile, SMS Host 1810 has already subscribed to rsc1, e.g., the resource host may send the notification to the SMS Host if any change is conducted on rsc1.

Step 3611 of FIG. 36: As shown in FIG. 36, if rsc1 is removed from Resource Host1, then Resource Host1 may send a notification message to the SMS Host 1810 to inform the VSMR 1804 that rsc1 is removed.

Step 3612 of FIG. 36: After successfully receiving the notification message, the SMS Host may send the response message to confirm the notification message has been received.

Step 3613 of FIG. 36: The SMS Host 1810 may delete the corresponding mashup member, which is associated with rsc1, of the VSMR 1804.

Step 3614 of FIG. 36: The SMS Host 1810 may trigger to find a new resource, which may become mashup members of the VSMR 1804. The procedure for finding the new mashup members of the VSMR resource may apply Step 2816-2818 in FIG. 28. If new resources (which are qualified to become mashup members of the VSMR resource) are found, these new resources may be added to be the mashup members of the VSMR resource and the SMS Host 1810 may also retrieve the representations of these new resources.

Step 3615 of FIG. 36: After updating the mashup members of the VSMR resource, the SMS Host 1810 may update or recalculate the mashup results by executing the mashup function (which is described in functionDescriptor attribute of the applied SMP resource) of the VSMR 1804 over its mashup members if the value of resultGenType equals to "When A Mashup Member Is Updated" (e.g., the SMS Host 1810 may re-calculate the mashup result when any update is conducted on the mashup members of the VSMR 1804); otherwise (e.g., the value of resultGenType is NOT equal to "When A Mashup Member Is Updated"), the SMS Host 1810 may not recalculate the mashup results.

Step 3616 of FIG. 36: After updating the mashup results, the SMS Host 1810 may store the mashup results in the SMRS 1806 and send them to the SMS Requestors 1808, who request to retrieve the content of the VSMR resource or have subscription on the content (e.g. the mashup result) of the VSMR 1804.

Figure 37:
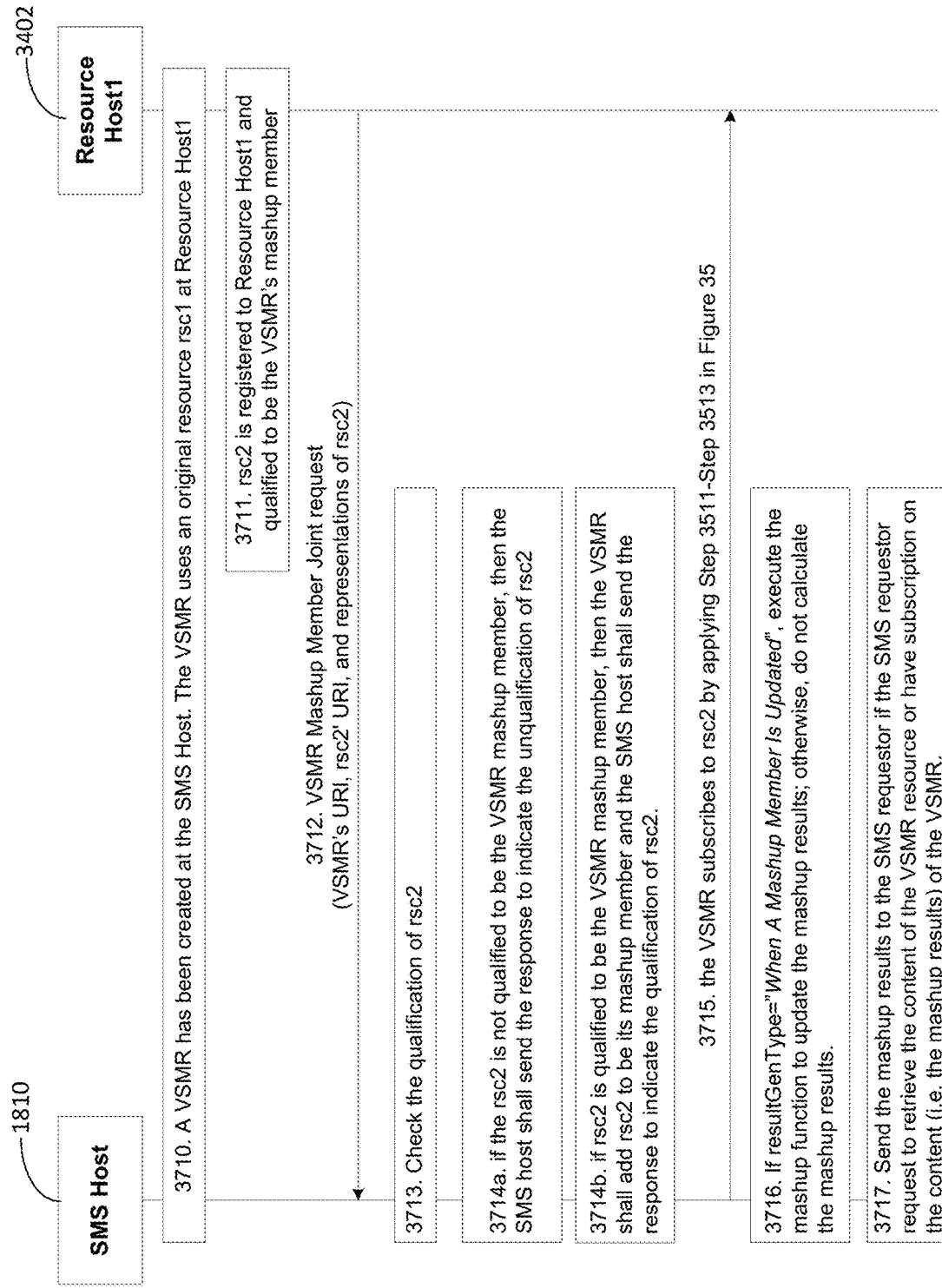
FIG. 37 illustrates an exemplary diagram of a resource host reporting new original resources

It is understood that the entities performing the steps illustrated in FIG. 36 may be logical entities that may be implemented in the form of software (e.g., computer-executable instructions) stored in a memory of, and executing on a processor of, an apparatus configured for wireless or network communications or a computer system such as those illustrated in FIG. 51C or FIG. 51D. That is, the method(s) illustrated in FIG. 36 may be implemented in the form of software (e.g., computer-executable instructions) stored in a memory of an apparatus, such as the apparatus or computer system illustrated in FIG. 51C or FIG. 51D, which computer executable instructions, when executed by a processor of the apparatus, perform the steps illustrated in FIG. 36. It is also understood that the functionality illustrated in FIG. 36 may implemented as a set of virtualized network functions. The network functions may not necessarily communicate directly, rather, they may communicate via forwarding or routing function. It is also understood that any transmitting and receiving steps illustrated in FIG. 36 may be performed by communication circuitry of the apparatus under control of the processor of the apparatus and the computer-executable instructions (e.g., software) that it executes. Resource Host Reports New Original Resources New original resources may be added to the Resource Host and these new original resources may qualify to be the VMSR's mashup members. Thus, the Resource Host may inform the VMSR if any new original resource may become its mashup member. Specifically:

Step 3710 of FIG. 37: Assume the SMS Host 1810 may have already created the VSMR 1804 and rsc1 (which is a resource hosted by Resource host1 3402) is one mashup member of the VSMR 1804; meanwhile, the VSMR 1804 in the SMS Host has already subscribed to Resource host1 3402. The subscription request includes the URI of the VSMR 1804 (e.g., subscriber's URI), notificationContentType, and eventNotificationCriteria. The notificationContentType parameter implies the content type in the notification message. The eventNotificationCriteria parameter indicates that Resource host1 3402 may send the notification once any hosting resource is qualified to be the VSMR's mashup member. Note that the eventNotificationCriteria parameter may include the information for determining whether the hosting resource is qualified to be the VSMR's mashup member or not. This information may be the same as semanticFilter in the semantic discovery.

Step 3711 of FIG. 37: Assume a new original resource, e.g., rsc2, is added to Resource host1 3402 and rsc2 is qualified to be the VSMR's mashup member;

Step 3712 of FIG. 37: Resource host1 3402 may send a VSMR mashup member joint request (which is considered as a notification) to the SMS Host. The VSMR mashup member joint request may include the VSMR' URI, URI of rsc2, as well as the corresponding representations of rsc2;

Step 3713 of FIG. 37: The VMSR may verify if the new original resource is qualified to be the mashup member or not, e.g., the VMSR may check whether the new original resource satisfies the criteria described in memberFilter (which is one attribute of the corresponding SMP 1802 applied by the VSMR 1804) or not.

Step 3714(a) of FIG. 37: If the rsc2 is not qualified to be the VSMR mashup member, then the SMS Host may send the response to indicate the non-qualification of rsc2.

Step 3714(b) of FIG. 37: If rsc2 is qualified to be the VSMR mashup member, then the SMS Host may add rsc2 to be the mashup member of the VSMR resource and the SMS Host may send the response to indicate the qualification of rsc2.

Step 3715 of FIG. 37: The VSMR 1804 may subscribe to rsc2 by applying Step 3511-Step 3513 in FIG. 35 to get automatic notifications on the change to rsc2's representation.

Step 3716 of FIG. 37: The SMS Host may recalculate the mashup results by executing the mashup function of the VSMR 1804 over its mashup members if the value of resultGenType equals to "When A Mashup Member Is Updated" (e.g., the SMS Host may re-calculate the mashup result when any update is conducted on the mashup members of the VSMR 1804); otherwise (e.g., the value of resultGenType is NOT equal to "When A Mashup Member Is Updated"), the SMS Host may not recalculate the mashup results.

Step 3717 of FIG. 37: After updating the mashup results, the SMS Host may store the mashup results in the SMRS 1806 and send them to the SMS Requestors 1808, who request to retrieve the content of the VSMR resource or have subscription on the content (e.g. the mashup results) of the VSMR 1804.

It is understood that the entities performing the steps illustrated in FIG. 37 may be logical entities that may be implemented in the form of software (e.g., computer-executable instructions) stored in a memory of, and executing on a processor of, an apparatus configured for wireless or network communications or a computer system such as those illustrated in FIG. 51C or FIG. 51D. That is, the method(s) illustrated in FIG. 37 may be implemented in the form of software (e.g., computer-executable instructions) stored in a memory of an apparatus, such as the apparatus or computer system illustrated in FIG. 51C or FIG. 51D, which computer executable instructions, when executed by a processor of the apparatus, perform the steps illustrated in FIG. 37. It is also understood that the functionality illustrated in FIG. 37 may implemented as a set of virtualized network functions. The network functions may not necessarily communicate directly, rather, they may communicate via forwarding or routing function. It is also understood that any transmitting and receiving steps illustrated in FIG. 37 may be performed by communication circuitry of the apparatus under control of the processor of the apparatus and the computer-executable instructions (e.g., software) that it executes.

Figure 38:
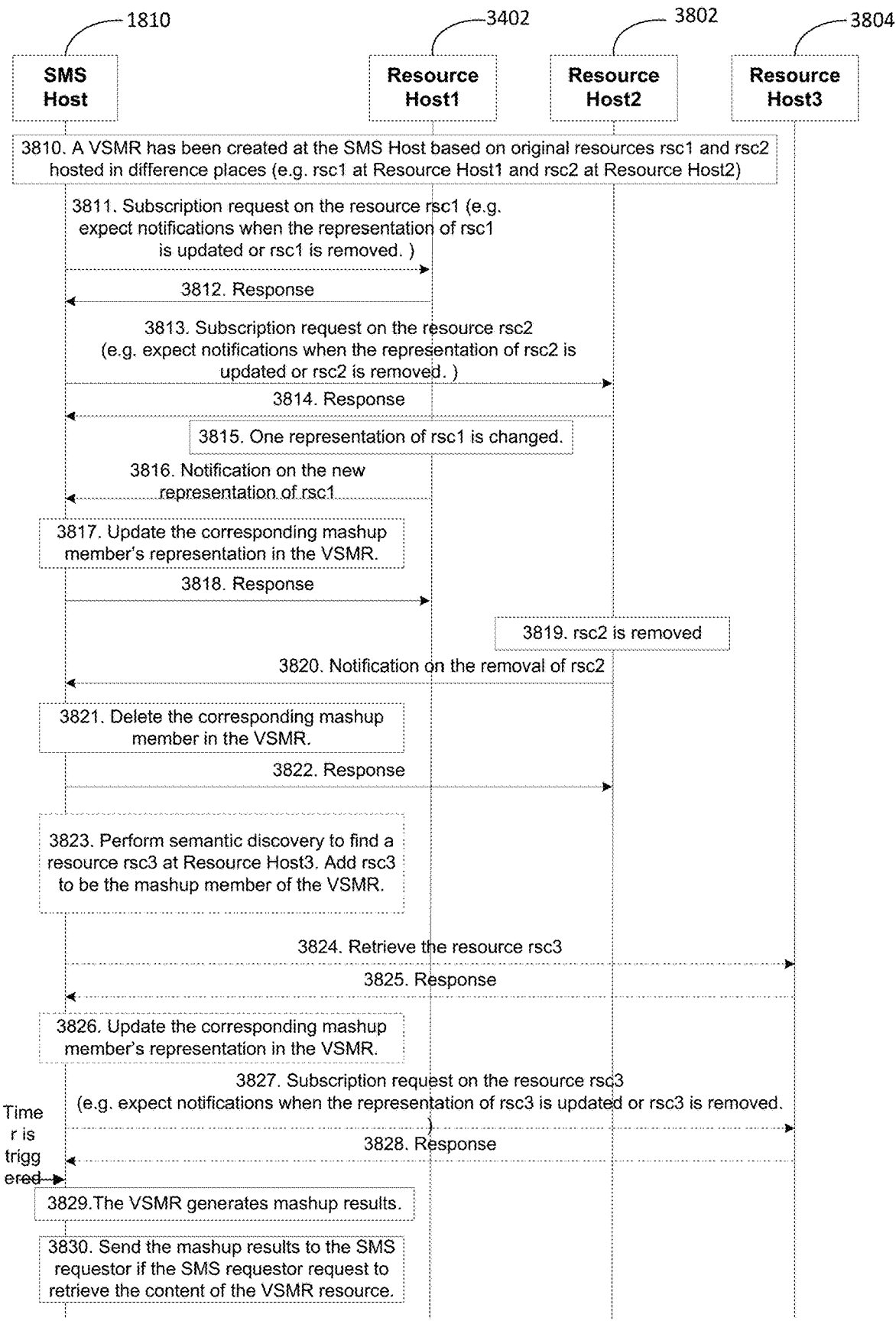
FIG. 38 illustrates an exemplary diagram of overall procedures for VSMR maintenance.

In this section is provided the overall procedure for the VSMR maintenance when Resource Hosts report changes on their original resources:

Step 3810 of FIG. 38: Assume that a VSMR 1804 has already been created by an SMS Requestor 1808 and rsc1 and rsc2 are currently the mashup members of the VSMR 1804. Note that rsc1 and rsc2 may be hosted by Resource host1 3402 and Resource host2 3802, respectively. Suppose the VSMR 1804 periodically generates mashup results, e.g., resultGenType="Periodically".

Step 3811-3814 of FIG. 38: As mentioned previously, in order to enable Resource Hosts 2804 to report changes on their original resources, the SMS Host may subscribe to the original resources of the VSMR 1804. Thus, as shown in FIG. 38, the SMS Host (which host the VSMR 1804) may send VSMR subscription requests to Resource host1 3402 and Resource host2 3802, respectively, in order to enable Resource host1 3402 and Resource host2 3802 to report any change (that are conducted on rsc1 and rsc2) to the SMS Host. Consequently, Resource host1 3402 and Resource host2 3802 may respond to the VSMR subscription requests to inform whether the SMS Host has successfully subscribed to the corresponding original resources.

Step 3815-3816 of FIG. 38: If one representation of rsc1 is changed, Resource host1 3402 may send the notification to the corresponding mashup member of the VSMR 1804 at the SMS Host.

Step 3817-3818 of FIG. 38: Once the SMS Host receives the notification, it may update the corresponding mashup member's representation based on the content in the received notification in Step 3816. Then, the SMS Host may send the message to Resource host1 3402 indicating the notification has been successfully received. Note that if resultGenType="When A Mashup Member Is Updated", then the SMS Host may start to regenerate the mashup results.

Step 3819-3820 of FIG. 38: If rsc2 is removed from Resource host2 3802, Resource host2 3802 may send the notification to the corresponding mashup member of the VSMR 1804 at the SMS Host.

Step 3821-3822: Once the SMS Host receives the notification, the VSMR 1804 may remove the mashup member, which is associated with rsc2. Then, the SMS Host may send the message to Resource host2 3802 indicating the notification has been successfully received.

Step 3823 of FIG. 38: Normally, deleting a mashup member will trigger the SMS Host to discover new qualified original resources to be the mashup members of the VSMR 1804; but the process may not be used for conducting VSMR maintenance. Assuming rsc3 in Resource Host3 3804 is found to be a qualified original resources after conducting the semantic discovery. Then, the VSMR 1804 would add rsc3 to be its mashup member.

Step 3824-3825 of FIG. 38: The SMS Host may retrieve the representations of rsc3 by sending mashup member resource request to the Resource Host3 3804. Resource Host3 3804 may respond rsc3's representations to the SMS Host.

Step 3826 of FIG. 38: After the SMS Host receives the response message, the VSMR 1804 may update the representations of the resource member, which is associated with rsc3. Note that if resultGenType="When A Mashup Member Is Updated", then SMS Host may start to regenerate the mashup results of the VSMR 1804.

Step 3827-3828 of FIG. 38: In order to enable Resource Host3 3804 to report changes on rsc3, the SMS Host may subscribe to rsc3 by sending a VSMR subscription requests to Resource Host3 3804. Consequently, Resource Host3 3804 may respond the VSMR subscription request to inform the SMS Host has successfully subscribed to rsc3.

Step 3829 of FIG. 38: If the timer (which counts the cumulative elapsed time from the end of last time period) reaches the length of the time period (which is identified by periodForResultGen attribute of the VSMR 1804), the VSMR 1804 may immediately generate the mashup results by conducting the mashup function over the mashup members. Note that the timer may be reset at the end of the each time period.

Step 3830 of FIG. 38: After updating the mashup results, the SMS Host may store the mashup results in the SMRS 1806 and send them to the SMS Requestors 1808, who request to retrieve the content of the VSMR resource. Note that if some SMS requestors 1808 previous subscribes the VSMR 1804, then the SMS Host may immediately send the notification to those SMS requestors 1808.

It is understood that the entities performing the steps illustrated in FIG. 38 may be logical entities that may be implemented in the form of software (e.g., computer-executable instructions) stored in a memory of, and executing on a processor of, an apparatus configured for wireless or network communications or a computer system such as those illustrated in FIG. 51C or FIG. 51D. That is, the method(s) illustrated in FIG. 38 may be implemented in the form of software (e.g., computer-executable instructions) stored in a memory of an apparatus, such as the apparatus or computer system illustrated in FIG. 51C or FIG. 51D, which computer executable instructions, when executed by a processor of the apparatus, perform the steps illustrated in FIG. 38. It is also understood that the functionality illustrated in FIG. 38 may implemented as a set of virtualized network functions. The network functions may not necessarily communicate directly, rather, they may communicate via forwarding or routing function. It is also understood that any transmitting and receiving steps illustrated in FIG. 38 may be performed by communication circuitry of the apparatus under control of the processor of the apparatus and the computer-executable instructions (e.g., software) that it executes.

oneM2M is discussed in more detail below. This section describes some architectural configurations, new oneM2M resources and new common attributes, and new oneM2M procedures in order to support the SMS under oneM2M functional architecture.

First, an architectural configuration for supporting semantic mashup service under oneM2M functional architecture is exemplified.

Second, resources and attributes are described. The RESTful procedures for operating each new resource are described as well. New <smp> resource is described to model SMPs 1802 and enable operations on them (e.g. Create an SMP, Retrieve an SMP, Update an SMP, and Delete an SMP). <vsmr> resource is described to model VSMRs and enable operations on them (e.g. Create a VSMR, Retrieve a VSMR, Update a VSMR, and Delete a VSMR). <smrs> resource is described to model SMRS 1806 and enable operations on them (e.g. Create an SMRS, Retrieve an SMRS, Update an SMRS, and Delete an SMRS). parentVSMR is described as an attribute (e.g., a "common" attribute) for existing oneM2M resources to associate them with a <vsmr> if they are used by the <vsmr> as member resources. smpID is described as an attribute for existing oneM2M resources to indicate that they are used as a member resource for semantic mashup service under a <smp>.

Third, an overall procedure example is described for implementing semantic mashup service under oneM2M functional architecture.

SMS Configurations in oneM2M Architecture is disclosed below. The above section describes how semantic mashup is done through the modular design of SMP 1802, VSMR 1804, and SMRS 1806, which together provide SMS. Such SMS may be implemented under oneM2M functional architecture as a new CSF (e.g. SMS CSF). This SMS CSF may be deployed in CSEs (e.g. in FIG. 39). The SMS CSF may be a realization of functionalities of an SMP Host 1810, a VSMR Host 2302, an SMRS Host 2304, or a combination of three (e.g. an SMS Host).

Figure 39:
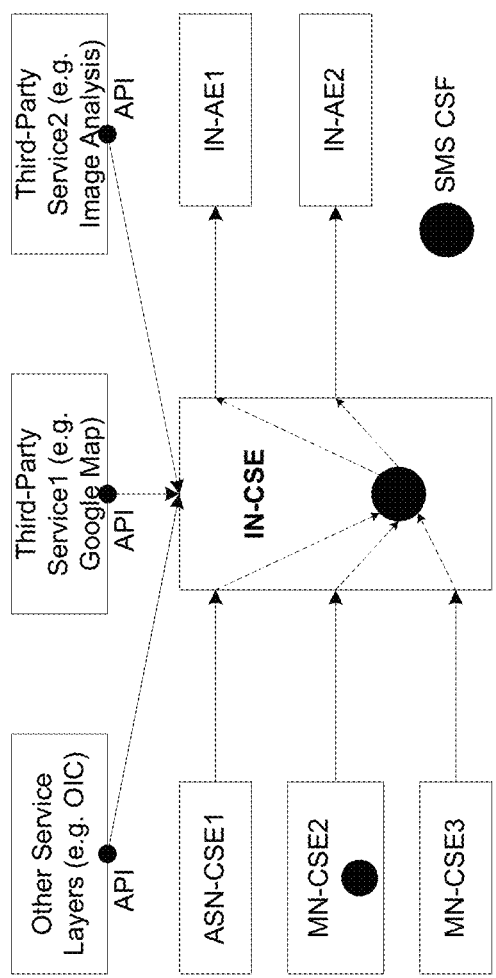
FIG. 39 illustrates an exemplary diagram of a support semantic mashup service in the oneM2M architecture

FIG. 39 shows an example where the SMS CSF is located in IN-CSE (note that SMS CSF may also be hosted by ASN or MN-CSE). The SMS CSF leverages original resources in ASN-CSE1 and MN-CSE2 4608 and MN-CSE3, potentially third-party services, or other service layers, as mashup members to create a parent VSMR and calculate mashup results. IN-AE1 and IN-AE2 may be SMS Requestors 1808 which interface to the IN-CSE to leverage the SMS CSF to create VSMRs, to trigger the calculation of the mashup result, or to access the mashup result.

It is understood that the functionality illustrated in FIG. 39 may be implemented in the form of software (e.g., computer-executable instructions) stored in a memory of, and executing on a processor of, a wireless device or other apparatus (e.g., a server, gateway, device, or other computer system), such as one of those illustrated in FIG. 51C or 51D described below. It is also understood that the functionality illustrated in FIG. 39 may implemented as a set of virtualized network functions. The network functions may not necessarily communicate directly, rather, they may communicate via forwarding or routing function. IN-CSE may provide SMS based on its local resources, resources from other MN-CSEs and ASN-CSE, services from third-parties or even services from other service layers such as OIC. IN-AEs as the SMS requestors may use the SMS from IN-CSE. MN-CSEs and ASN-CSE may be resource host. IN-CSE acts as both an SMS host and a resource host.

Semantic Mashup Profile Resource <smp> resource is described to model and represent a semantic mashup profile. A<smp> resource may be provisioned to the oneM2M CSE which provides semantic mashup service; alternatively, a special administration application or CSE may request to create <smp> resource at an oneM2M CSE. Once an <smp> resource is provisioned or created at the oneM2M CSE (e.g. SMS Host), other oneM2M CSEs or AEs, which act as SMS Requestors 1808, may discover and retrieve it.

Figure 40:
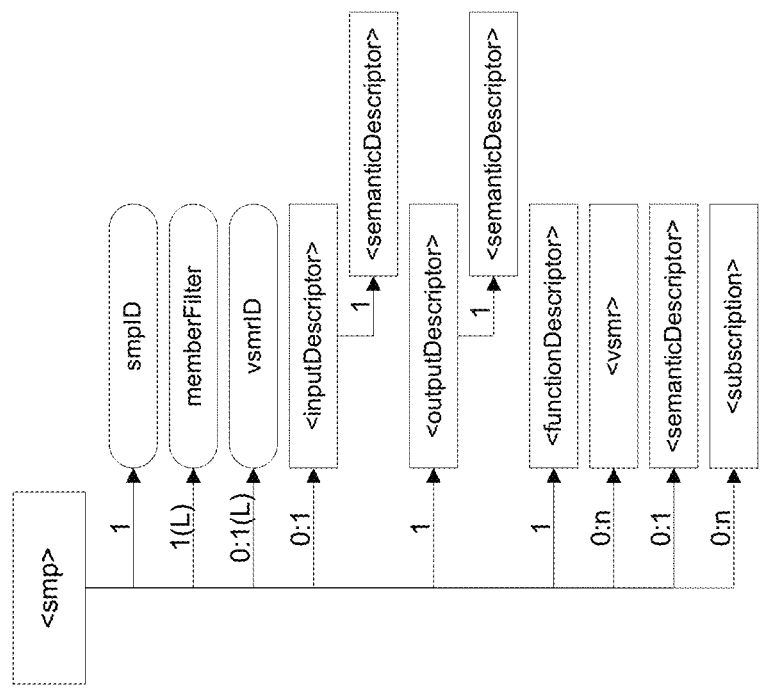
FIG. 40 illustrates an exemplary diagram of a semantic mashup profile resource <smp>.

The <smp> resource may include the child resources specified in Table 3 and the attributes specified in Table 4. The structure of an <smp> resource is also illustrated in FIG. 40. It is contemplated herein that some semantic mashup profiles may not need and therefore may not use certain aspects of Table 3 and Table 4, such as inpuDescriptor.

TABLE 3

Child resources of <smp> resource

| Child Resources of <smp> | Multiplicity | Description |
| --- | --- | --- |
| <vsmr> | 0 . . . n | Stands for virtual semantic mashup resources which have been created based on this semantic mashup profile <smp>. The <smp> and <vsmr> may be stored separately in different places. |
| <semanticDescriptor> | 0:1 | Describes other semantic information about this semantic mashup profile <smp>. This is an existing oneM2M resource. |
| <subscription> | 0:n | Stands for any subscription on this semantic mashup profile <smp>. This is an existing oneM2M resource. |

TABLE 4

Attributes of <smp> resource

| Attributes of <smp> | Multiplicity | Description |
| --- | --- | --- |
| smpID | 1 | Stands for the identifier (e.g. URI) of this semantic mashup profile <smp>. It may also include some keywords which may be used for discovering the <smp>. |
| memberFilter | 1 | Semantically describes (e.g. in semantic triples) the types of member resources, which may be involved in this semantic mashup profile <smp>. When a virtual semantic mashup resource <vsmr> is created based on this <smp>, the member resources of the <vsmr> may be discovered and selected based on this memberFilter attribute. |
| vsmrID | 0:1 (L) | Stands for a list of identifiers of related virtual semantic mashup resources which have been created based on this <smp>. |
| inputDescriptor | 0:1 | Semantically may describe (e.g. in semantic triples) the types of parameters that may be required as input parameters in order to use this semantic mashup profile <smp>. An SMS Requestor understand multiple types of input parameters as described in this attribute in order to create a <vsmr> based on this semantic mashup profile <smp>. |
| outputDescriptor | 1 | Semantically may describe (e.g. in semantic triples) the types of output parameters, which may be generated as semantic mashup results if using this semantic mashup profile <smp>. |
| functionDescriptor | 1 | Semantically may describe the mashup function of this semantic mashup profile <smp>. The mashup function of each <smp> specifies how semantic mashup results should be generated based on input parameters or original member resources, which may be defined by the memberFilter attribute of <smp>. |
| clientEntities | 0:1 | Stands for a list of CSEs which may (or may not) leverage this <smp> to create <vsmr>. If this <smp> does not have this attribute, existing oneM2M common attribute accessControlPolicyIDs may be used to control which CSEs may access and use this <smp>. |

Figure 41:
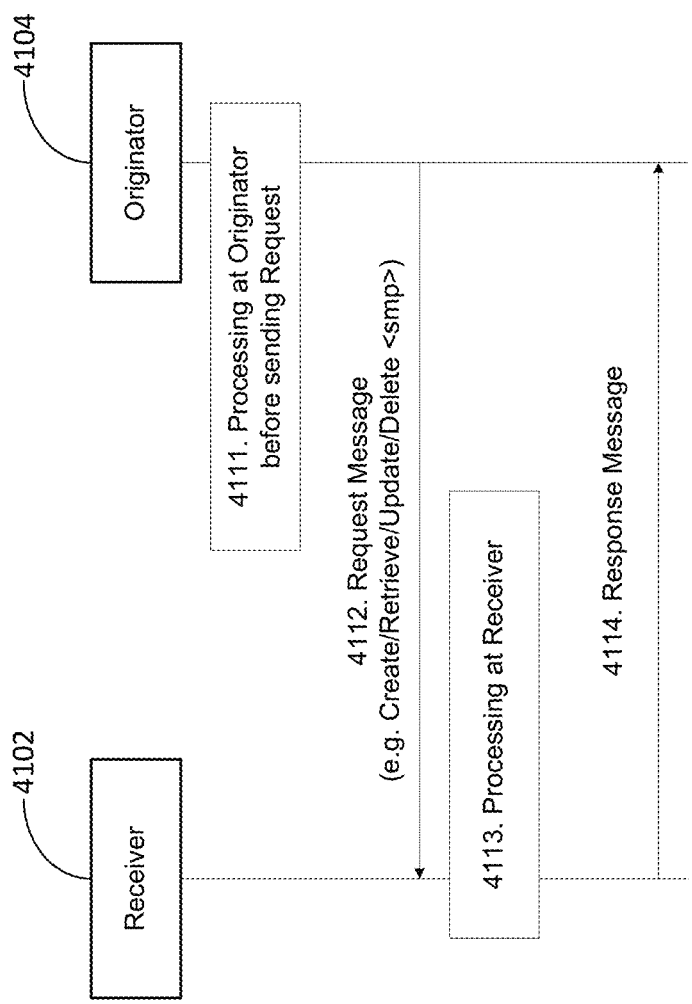
FIG. 41 illustrates an exemplary diagram of procedures for operating an <smp> resource.

FIG. 41 illustrates an exemplary procedure to operate an <smp> resource (e.g. Create, Retrieve, Update, or Delete an <smp> resource) using receiver 4102 and originator 4104.

It is understood that the entities performing the steps illustrated in FIG. 41 may be logical entities that may be implemented in the form of software (e.g., computer-executable instructions) stored in a memory of, and executing on a processor of, an apparatus configured for wireless or network communications or a computer system such as those illustrated in FIG. 51C or FIG. 51D. That is, the method(s) illustrated in FIG. 41 may be implemented in the form of software (e.g., computer-executable instructions) stored in a memory of an apparatus, such as the apparatus or computer system illustrated in FIG. 51C or FIG. 51D, which computer executable instructions, when executed by a processor of the apparatus, perform the steps illustrated in FIG. 41. It is also understood that the functionality illustrated in FIG. 41 may implemented as a set of virtualized network functions. The network functions may not necessarily communicate directly, rather, they may communicate via forwarding or routing function. It is also understood that any transmitting and receiving steps illustrated in FIG. 41 may be performed by communication circuitry of the apparatus under control of the processor of the apparatus and the computer-executable instructions (e.g., software) that it executes.

In FIG. 41, at step 4111, originator 4104 has some processing at originator. This may be according to clause 10.1.1.1 in oneM2M-TS-0001 oneM2M Functional Architecture—V2.9.0 (hereinafter 10.1.1.1) or the like. At step 4112, originator 4104 may send a request message to receiver 4102. The request message may be a create message, retrieve message, an update message, or a delete message for <smp>. At step 4113, processing the message of step 4112. At step 4114, based on the processing of step 4113. These steps are further described in Table 5-Table 8. Create <smp> procedure may be used for creating an <smp> resource as described in Table 5.

TABLE 5

| <smp> CREATE | |
|---|---|
| <smp> CREATE | |
| Associated Reference Point | Mca, Mcc and Mcc'. |
| Information in Request message | Parameters defined in Table 8.1.2-3 in oneM2M-TS-0001 oneM2M Functional Architecture –V2.9.0, or the like, apply with the specific details for: Content: The resource content may provide the information about an <smp> resource (e.g., attribute values) |
| Processing at Originator before sending Request | According to clause 10.1.1.1 in oneM2M-TS-0001 oneM2M Functional Architecture –V2.9.0. |
| Processing at Receiver | According to clause 10.1.1.1 in oneM2M-TS-0001 oneM2M Functional Architecture –V2.9.0. |
| Information in Response message | Parameters defined in Table 8.1.3-1 in oneM2M-TS-0001 oneM2M Functional Architecture –V2.9.0 apply with the specific details for: Content: Address of the created <smp> resource, according to clause 10.1.1.1 in oneM2M-TS-0001 oneM2M Functional Architecture –V2.9.0. |
| Processing at Originator after receiving Response | According to clause 10.1.1.1 in oneM2M-TS-0001 oneM2M Functional Architecture –V2.9.0]. |
| Exceptions | According to clause 10.1.1.1 in oneM2M-TS-0001 oneM2M Functional Architecture –V2.9.0 |

Retrieve <smp> procedure may be used for retrieving the attributes of an <smp> resource as described in Table 6.

TABLE 6

| <smp> RETRIEVE | |
|---|---|
| <smp> RETRIEVE | |
| Associated Reference Point | Mca, Mcc and Mcc'. |
| Information in Request message | Parameters defined in Table 8.1.2-3 in oneM2M-TS-0001 oneM2M Functional Architecture –V2.9.0, or the like, apply with the specific details for: Content: void. |
| Processing at Originator before sending Request | According to clause 10.1.2 in oneM2M-TS-0001 oneM2M Functional Architecture –V2.9.0. |
| Processing at Receiver | Receiver may verify the existence (including Filter Criteria checking, if it is given) of the target resource or the attribute and check if the Originator has appropriate privileges to retrieve information stored in the resource or attribute. Otherwise clause 10.1.2 in oneM2M-TS-0001 oneM2M Functional Architecture –V2.9.0 applies. |
| Information in Response message | Parameters defined in Table 8.1.3-1 in oneM2M-TS-0001 oneM2M Functional Architecture –V2.9.0 apply with the specific details for: Content: attributes of the <smp> resource. |

TABLE 6-continued

| | |
|---|---|
| | <smp> RETRIEVE |
| | <smp> RETRIEVE |
| Processing at Originator after receiving Response | According to clause 10.1.2 in oneM2M-TS-0001 oneM2M Functional Architecture –V2.9.0. |
| Exceptions | According to clause 10.1.2 in oneM2M-TS-0001 oneM2M Functional Architecture –V2.9.0. In addition, a timer has expired. The Receiver responds with an error. |

Update <smp> procedure as described in Table 7 may be used to update an existing <smp>, e.g. an update to its inputDescriptor. The generic update procedure is described in clause 10.1.3 in oneM2M-TS-0001 oneM2M Functional Architecture—V2.9.0.

TABLE 7

| | |
|---|---|
| | <smp> UPDATE |
| | <smp> UPDATE |
| Associated Reference Point | Mca, Mcc and Mcc'. |
| Information in Request message | Parameters defined in Table 8.1.2-3 in oneM2M-TS-0001 oneM2M Functional Architecture –V2.9.0 apply with the specific details for: Content: attributes of the <smp> resource |
| Processing at Originator before sending Request | According to clause 10.1.3 in oneM2M-TS-0001 oneM2M Functional Architecture –V2.9.0. |
| Processing at Receiver | According to clause 10.1.3 in oneM2M-TS-0001 oneM2M Functional Architecture –V2.9.0. |
| Information in Response message | According to clause 10.1.3 in oneM2M-TS-0001 oneM2M Functional Architecture –V2.9.0. |
| Processing at Originator after receiving Response | According to clause 10.1.3 in oneM2M-TS-0001 oneM2M Functional Architecture –V2.9.0. |
| Exceptions | According to clause 10.1.3 in oneM2M-TS-0001 oneM2M Functional Architecture –V2.9.0. |

Delete <smp> procedure as described in Table 8 may be used to delete an existing <smp>. The generic delete procedure is described in clause 10.1.4.1 in oneM2M-TS-0001 oneM2M Functional Architecture—V2.9.0.

TABLE 8

| | |
|---|---|
| | <smp> DELETE |
| | <smp> DELETE |
| Associated Reference Point | Mca, Mcc and Mcc'. |
| Information in Request message | Parameters defined in Table 8.1.2-3 in oneM2M-TS-0001 oneM2M Functional Architecture –V2.9.0 apply. |
| Processing at Originator before sending Request | According to clause 10.1.4.1 in oneM2M-TS-0001 oneM2M Functional Architecture –V2.9.0. |
| Processing at Receiver | According to clause 10.1.4.1 in oneM2M-TS-0001 oneM2M Functional Architecture –V2.9.0. The following may apply: If the <smp> to be deleted has vsmrID attribute and the vsmr attribute has a value, the Receiver may notify each <vsmr> resource as included in the vsmrID of the removal of the <smp> since those <vsmr> resources use this <smp>. For example, the Receiver may send an UPDATE operation to remove this <smp> from the smpID attribute of each corresponding <vsmr> resource. If the <smp> to be deleted has <vsmr> child resources, those <vsmr> child resources may be removed accordingly. As a result, the Originator may notify the Resource Host of each member resource of <vsmr>, which may then disassociate each member resource from the <vsmr>. |

TABLE 8-continued

| | |
|---|---|
| | <smp> DELETE |
| | <smp> DELETE |
| Information in Response message | According to clause 10.1.4.1 in oneM2M-TS-0001 oneM2M Functional Architecture –V2.9.0. |
| Processing at Originator after receiving Response | According to clause 10.1.4.1 in oneM2M-TS-0001 oneM2M Functional Architecture –V2.9.0. |
| Exceptions | According to clause 10.1.4.1 in oneM2M-TS-0001 oneM2M Functional Architecture –V2.9.0. |

Virtual Semantic Mashup Resource <vsmr> resource may be used to model and represent a virtual semantic mashup resource. An oneM2M CSE or AE as an SMS Requestor 1808 may request to create <vsmr> resources at another oneM2M CSE which implements the SMS CSF and acts as an SMS Host or a VSMR Host 2302. Each created <vsmr> resource may correspond to a semantic mashup profile (e.g. an <smp> resource). How the <vsmr> resource should execute the mashup operation to calculate the mashup result may be specified in the corresponding <smp> resource. Note that the <vmsr> and its corresponding <smp> resources may be placed at the same CSE or at different oneM2M CSEs, and the smpID attribute of the <vsmr> may allow the corresponding <smp> resource to be located. If <vsmr> resource (e.g. mashup result) has <smrs> as its child resource, an SMS Requestor 1808 (e.g. an oneM2M CSE or AE) or even an SMS Host may come to the <vsmr> resource to retrieve the mashup result.

Figure 42:
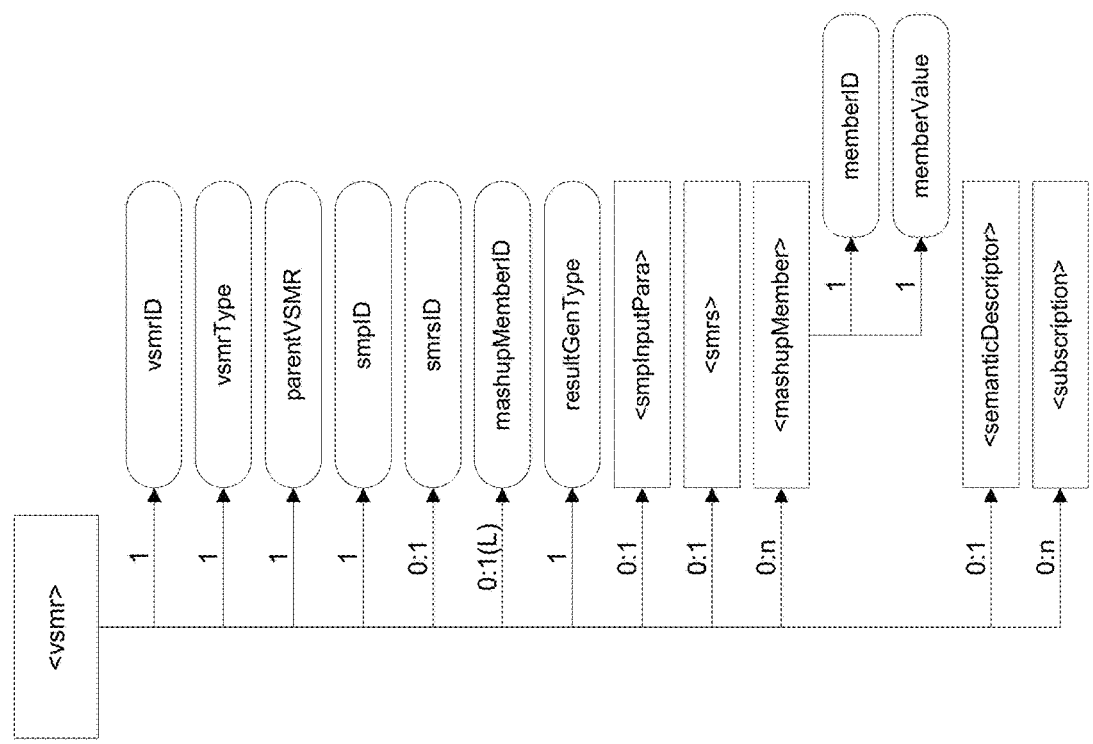
FIG. 42 illustrates an exemplary diagram of a virtual semantic mashup Resource <vsmr>.

The <vsmr> resource may include the child resources specified in Table 9 and the attributes specified in Table 10. The structure of a <vsmr> resource is also illustrated in FIG. 42.

TABLE 9

Child resources of <vsmr> resource

| Child Resources of <vsmr> | Multiplicity | Description |
|---|---|---|
| <smpInputPara> | 0:1 | May include input parameters that may be used to calculate the mashup result. Note that the types of these input parameters may be specified by the <inputDescriptor> child resource of the corresponding <smp> which is denoted by smpID attribute of this <vsmr> resource. For example, child resource may particularly not be used when this <vsmr> includes <smrs> as its child resource because each <smrs> has a corresponding <smpInputPara> child resource. |
| <mashupMember> | 0:1 | May include member resources including the identifier and value (e.g. content representation) of each member resource. For example, this child resource may not be used if this <vsmr> has the attribute mashupMemberID or the like. |
| <smrs> | 0:n | May include mashup result. A <vsmr> resource may have multiple <smrs> child resources and each <smrs> stands for a mashup result instance that may have different values of input parameters. |
| < semanticDescriptor> | 0:1 | Describes other semantic information about this semantic mashup profile <smp>. This is similarly defined as an existing oneM2M resource. |
| <subscription> | 0:n | Stands for subscription on this <vsmr>. This is similarly defined as an existing oneM2M resource. |
| mashup | 0:1 | May be a oneM2M virtual resource. For example, when an SMS Requestor sends a RETRIEVE operation on this child resource, it may trigger to re-calculate and re-generate the mashup result.<br>In an example, when this virtual resource is included, <smrs> child resource or smrsID attribute may not be used since the SMS Requestor may simply retrieve this virtual resource to trigger the SMS Host hosting the <vsmr> to recalculate mashup result and return the mashup result back to the SMS Requestor.<br>Note that when the resultGenType attribute of a <vsmr> resource is "Periodical", this virtual resource may not be used since the mashup result may be generated periodically without relying on active triggering from the SMS Requestor. |

TABLE 10

| Attributes of <vsmr> | Multiplicity | Description |
|---|---|---|
| | Attribute of <vsmr> resource | |
| vsmrID | 1 | The identifier (e.g., URI) of this virtual semantic mashup resource <vsmr>. It may also include some keywords which may be used for discovering the <vsmr>. Alternatively, vsmrID may also be included as a part of the oneM2M labels attribute. |
| smpInputPara | 1 | May include the value of input parameters that are used to calculate the mashup result. Note that the types of these input parameters may be specified by the inputDescriptor attribute of the corresponding <smp> that is denoted by smpID attribute of this <vsmr> resource. In an example, this attribute may not be used if the corresponding <smp> does not have inputDescriptor attribute. |
| smpID | 1 | Denotes the identifier (e.g. URI) of the semantic mashup profile resource <smp> which this <vsmr> is based on. |
| smrsStoreType | 1 | May indicate the way which semantic mashup results should be stored. For example,<br>If smrsStoreType="Child Resource", semantic mashup results of this <vsmr> may be stored as a child resource (e.g. <smrs>) of this <vsmr>;<br>If smrsStoreType="Reference", semantic mashup results of this <vsmr> may be stored in separate <smrs> resources but the smrsID attribute of this <vsmr> gives the <smrs> URI. |
| smrsID | 0:1 (L) | The identifier of semantic mashup result resource <smrs> for storing the mashup result, which is generated from this virtual semantic mashup resource <vsmr>. In an example, this attribute may not be used if <smrs> is placed directly under this <vsmr> as its child resource (e.g. when smrsStoreType="Child Resource"). |
| memberStoreType | 1 | May indicate the way which member resources should be stored under this <vsmr>. Example include the following:<br>If memberStoreType="URI Only", this <vsmr> may only use the mashupMemberID attribute to maintain the URI of each member resource; or<br>If memberStoreType="URI and Value", this <vsmr> may use <mashupMember> child resource to maintain both the URI and content values of each member resource. |
| mashupMemberID | 0:1 (L) | The identifiers of member resources (e.g. an <contentInstance> resource in a CSE). The value of this attribute may be a list. In an example, this attribute may not be used if <mashupMember> resource is placed directly under this <vsmr> as its child resource (e.g., when memberStoreType="URI Only".<br>Note that alternatively, a VSMR may have a oneM2M <group> resource to maintain the identifiers of mashup members; in this case, this attribute may not be used. |
| resultGenType | 1 (L) | Describes how the mashup result may be generated using this <vsmr>. Example values for this attribute include the following:<br>If resultGenType="WhenVSMR Is Created", the semantic mashup result may be generated when this <vsmr> is created by running semantic functions specified by the corresponding <smp>;<br>If resultGenType="When SMS Requestor Requests", the mashup result is to be calculated and generated when requested or triggered by an SMS Requestor by sending a RETRIEVE operation to the virtual child resource mashup of corresponding <smrs> resource;<br>If resultGenType="Periodically", SMS Host (or VSMR Host 2302) may calculate and generate the semantic mashup result periodically; as such, another attribute periodForResultGen may be used; or<br>If resultGenType="When A Mashup Member Is Updated", SMS Host (or VSMR Host 2302) may calculate and generate the semantic mashup result whenever any update conducts on the mashup members of the VSMR. |

TABLE 10-continued

Attribute of <vsmr> resource

| Attributes of <vsmr> | Multiplicity | Description |
|---|---|---|
| periodForResultGen | 0:1 | The period for re-calculating and generating the semantic mashup result. For example, when it is the time to re-calculate the semantic mashup result, the CSE hosting this <vsmr> may retrieve the latest content value of each member resource if it is not obtained yet. This attribute may be used when resullGenType="Periodically". |

Figure 43:
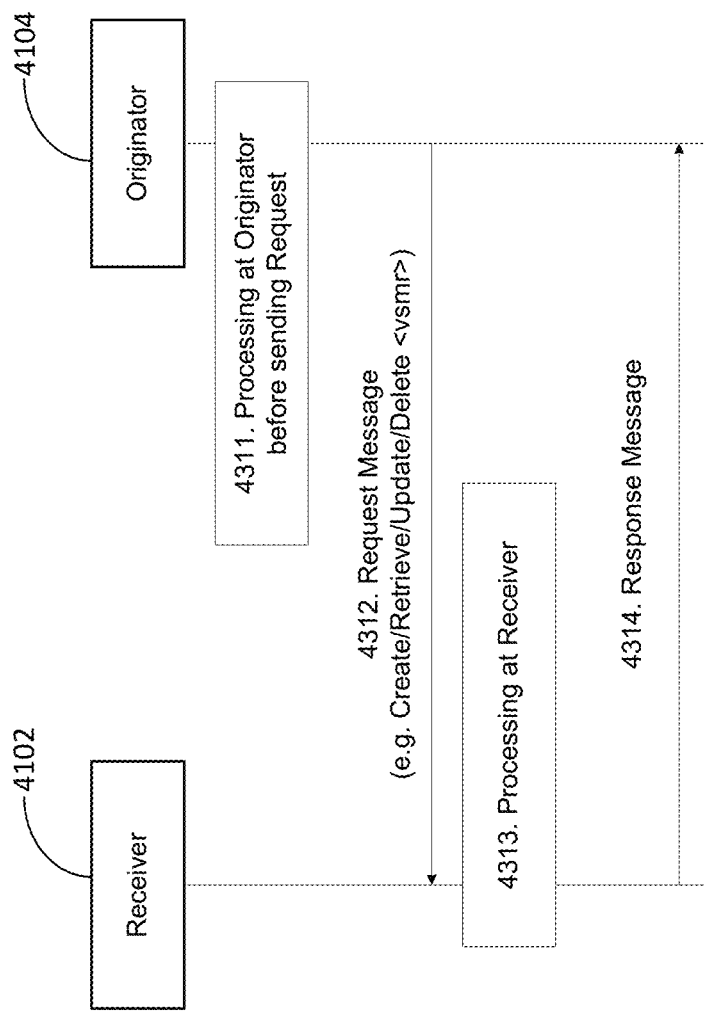
FIG. 43 illustrates an exemplary diagram of procedures for operating a <vsmr> resource.

FIG. 43 illustrates an exemplary procedure to operate a <vsmr> resource (e.g. Create, Retrieve, Update, or Delete a <vsmr> resource).

It is understood that the entities performing the steps illustrated in FIG. 43 may be logical entities that may be implemented in the form of software (e.g., computer-executable instructions) stored in a memory of, and executing on a processor of, an apparatus configured for wireless or network communications or a computer system such as those illustrated in FIG. 51C or FIG. 51D. That is, the method(s) illustrated in FIG. 43 may be implemented in the form of software (e.g., computer-executable instructions) stored in a memory of an apparatus, such as the apparatus or computer system illustrated in FIG. 51C or FIG. 51D, which computer executable instructions, when executed by a processor of the apparatus, perform the steps illustrated in FIG. 43. It is also understood that the functionality illustrated in FIG. 43 may implemented as a set of virtualized network functions. The network functions may not necessarily communicate directly, rather, they may communicate via forwarding or routing function. It is also understood that any transmitting and receiving steps illustrated in FIG. 43 may be performed by communication circuitry of the apparatus under control of the processor of the apparatus and the computer-executable instructions (e.g., software) that it executes.

In FIG. 43, at step 4311, originator 4104 has some processing at originator. This may be according to clause 10.1.1.1 in oneM2M-TS-0001 oneM2M Functional Architecture—V2.9.0 (hereinafter 10.1.1.1) or the like. At step 4312, originator 4104 may send a request message to receiver 4102. The request message may be a create message, retrieve message, an update message, or a delete message for <smp>. At step 4313, processing the message of step 4312. At step 4314, based on the processing of step 4313. These steps are further described in Table 11-Table 15. Create <vsmr> procedure may be used for creating a <vsmr> resource as described in Table 11.

TABLE 11

| | <vsmr> CREATE |
|---|---|
| | <vsmr> CREATE |
| Associated Reference Point | Mca, Mcc and Mcc'. |
| Information in Request message | Parameters defined in Table 8.1.2-3 in oneM2M-TS-0001 oneM2M Functional Architecture –V2.9.0, or the like, may apply with the specific details for: Content: The resource content may provide the information about a <vsmr> resource (e.g. attribute values) |
| Processing at Originator before sending Request | According to clause 10.1.1.1 in oneM2M-TS-0001 oneM2M Functional Architecture –V2.9.0. If the Originator knows the identifier or URI of each members, it may include the value of memberID attribute in the Request message. |
| Processing at Receiver | According to clause 10.1.1.1 in oneM2M-TS-0001 oneM2M Functional Architecture –V2.9.0. The Receiver may first check if the corresponding <smp> as denoted by smpID attribute exists or not. If it does not exist, the Receiver may not create the <vsmr> and may report an error (e.g. "<smp> does not exist") in the Response message to the Originator. If it exists, the Receiver may retrieve its content. The Receiver may check if smpInputPara included in the Request message meets the input parameter requirement as specified by the inputDescriptor attribute of corresponding <smp>. If it does not meet the requirement, the Receiver may not create the <vsmr> and may report an error (e.g. "smpInputPara does not meet the requirement") in the Response message to the Originator. According to the memberFilter attribute of the retrieved <smp>, the Receiver composes a SPARQL query and may send it to SGS to discover and determine member resources for the <vsmr> to be created. Dependent on the memberStoreType attribute included in the Request message, the Receiver may maintain each member resource in different ways. If memberStoreType="URI Only", the Receiver may create the mashupMemberID attribute and let it include the URIs of determined member resources. If memberStoreType="URI and Value", the Receiver may not |

TABLE 11-continued

<vsmr> CREATE
<vsmr> CREATE

| | |
|---|---|
| | create the mashupMemberID attribute; instead, it may first retrieve content value of each member resource and then create <mashupMember> child resource to store both the identifier and the content value of each member resource. Each <mashupMember> child resource may correspond to a member resource.<br>Dependent on the smrsStoreType attribute included in the Request message, the Receiver maintains semantic mashup result in different ways. If smrsStoreType="Child Resource", the Receiver may create a <smrs> child resource whenever a new semantic mashup result is generated. If smrsStoreType="Reference", the Receiver may create a separate <smrs> resource (not the child resource of <vsmr>) which may be placed in different places at the Receiver or at other CSEs; then the Receiver creates the smrsID attribute which may point to the separate <smrs> resource.<br>Dependent on the resultGenType attribute included in the Request message, the Receiver executes corresponding semantic mashup profile <smp> and generates mashup results in different ways.<br>   If resultGenType="When VSMR Is Created", the Receiver retrieves the content value of each member resource if not retrieved yet; then it may execute mashup functions as specified by the <smp> and generate semantic mashup result, which may be stored in the way as specified by smrsStore Type attribute.<br>   If resultGenType="When SMS Requestor Requests", the Receiver may do nothing at the moment.<br>   If resultGenType="Periodically", the Receiver may be set up a timer according to the periodForResultGen attribute included in the Request message. When the timer expires, the Receiver may retrieve the content value of each member resource and re-generate the mashup result; then it may renew the timer.<br>   If resultGenType="When a Resource Host Sends an Update", the Receiver may do nothing at the moment. |
| Information in Response message | Parameters defined in Table 8.1.3-1 in oneM2M-TS-0001 oneM2M Functional Architecture –V2.9.0, or the like, may apply with the specific details for:<br>Content: Address of the created <vsmp> resource and address of created <smrs> resource, according to clause 10.1.1.1 in oneM2M-TS-0001 oneM2M Functional Architecture –V2.9.0. |
| Processing at Originator after receiving Response | According to clause 10.1.1.1 in oneM2M-TS-0001 oneM2M Functional Architecture –V2.9.0. |
| Exceptions | According to clause 10.1.1.1 in oneM2M-TS-0001 oneM2M Functional Architecture –V2.9.0. |

Retrieve <vsmr> procedure may be used for retrieving the attributes of a <vsmr> resource as described in Table 12.

TABLE 12

<vsmr> RETRIEVE
<vsmr> RETRIEVE

| | |
|---|---|
| Associated Reference Point | Mca, Mcc and Mcc'. |
| Information in Request message | Parameters defined in Table 8.1.2-3 in oneM2M-TS-0001 oneM2M Functional Architecture -V2.9.0, or the like, may apply with the specific details for:<br>Content: void. |
| Processing at Originator before sending Request | According to clause 10.1.2 in oneM2M-TS-0001 oneM2M Functional Architecture -V2.9.0. |
| Processing at Receiver | The Receiver ay verify the existence (including Filter Criteria checking, if it is given) of the target resource or the attribute and check if the Originator has appropriate privileges to retrieve information stored in the resource or attribute. Otherwise clause 10.1.2 in oneM2M-TS-0001 oneM2M Functional Architecture -V2.9.0 applies. |
| Information in Response message | Parameters defined in Table 8.1.3-1 in oneM2M-TS-0001 oneM2M Functional Architecture -V2.9.0, or the like, may apply with the specific details for:<br>Content: attributes of the <vsmr> resource |

TABLE 12-continued

| | <vsmr> RETRIEVE<br><vsmr> RETRIEVE |
|---|---|
| Processing at Originator after receiving Response | According to clause 10.1.2 in oneM2M-TS-0001 oneM2M Functional Architecture -V2.9.0. |
| Exceptions | According to clause 10.1.2 in oneM2M-TS-0001 oneM2M Functional Architecture -V2.9.0.<br>In addition: a timer has expired. The Receiver responds with an error. |

Retrieve <vsmr>/mashup procedure may be used for triggering the CSE which hosts the <vsmr> to recalculate mashup results and returning the mashup result back to the requestor 1808 (e.g. an AE) of this retrieve request as described in Table 13.

TABLE 13

| | <vsmr>/mashup RETRIEVE<br><vsmr>/mashup RETRIEVE |
|---|---|
| Associated Reference Point | Mca, Mcc and Mcc'. |
| Information in Request message | Parameters defined in Table 8.1.2-3 in oneM2M-TS-0001 oneM2M Functional Architecture -V2.9.0, or the like may apply with the specific details for:<br>To: <vsmr>/mashup<br>Content: void. |
| Processing at Originator before sending Request | According to clause 10.1.2 in oneM2M-TS-0001 oneM2M Functional Architecture -V2.9.0. |
| Processing at Receiver | The Receiver may verify the existence (including Filter Criteria checking, if it is given) of the target resource or the attribute and check if the Originator has appropriate privileges to retrieve information stored in the resource or attribute. Otherwise clause 10.1.2 in oneM2M-TS-0001 oneM2M Functional Architecture -V2.9.0 may apply.<br>In an example, the targeted mashup is a virtual child resource of the <vsmr>, which means to trigger the recalculation of semantic mashup result. The Receiver causes the <vsmr> to recalculate semantic mashup result. The recalculated mashup result may be sent back to the Originator or stored back to the mashupResult attribute of the child resource <smrs>. |
| Information in Response message | Parameters defined in Table 8.1.3-1 in oneM2M-TS-0001 oneM2M Functional Architecture -V2.9.0 may apply with the specific details for:<br>Content: the mashup result. |
| Processing at Originator after receiving Response | According to clause 10.1.2 in oneM2M-TS-0001 oneM2M Functional Architecture -V2.9.0. |
| Exceptions | According to clause 10.1.2 in oneM2M-TS-0001 oneM2M Functional Architecture -V2.9.0.<br>In addition: a timer has expired. The Receiver responds with an error. |

Update <vsmr> procedure as described in Table 14 may be used to update an existing <vsmr>, e.g. an update to its memberStoreType. The generic update procedure may described in clause 10.1.3 in oneM2M-TS-0001 oneM2M Functional Architecture—V2.9.0.

TABLE 14

| | <vsmr> UPDATE<br><vsmr> UPDATE |
|---|---|
| Associated Reference Point | Mca, Mcc and Mcc'. |
| Information in Request message | Parameters defined in Table 8.1.2-3 in oneM2M-TS-0001 oneM2M Functional Architecture -V2.9.0 apply with the specific details for:<br>Content: attributes of the <vsmr> resource that need be updated. |

TABLE 14-continued

| | <vsmr> UPDATE |
|---|---|
| | <vsmr> UPDATE |
| Processing at Originator before sending Request | According to clause 10.1.3 in oneM2M-TS-0001 oneM2M Functional Architecture -V2.9.0. |
| Processing at Receiver | According to clause 10.1.3 in oneM2M-TS-0001 oneM2M Functional Architecture -V2.9.0.<br>If the updated attribute in the Request message is smpInputPara and if resultGenType = "When VSMR Is Created", the Receiver may recalculate the semantic mashup result using the new values of input parameters.<br>If the updated attribute in the Request message is smrsStoreType, the Receiver may change the way to store the semantic mashup result. For example, if smrsStoreType is updated from "Child Resource" to "Reference", the Receiver may remove <smrs> child resource and add smrsID attribute. If smrsStoreType is updated from "Reference" to "Child Resource", the Receiver may copy the <smrs> resource as the child resource of <vsmr> and remove smrsID attribute.<br>If the updated attribute in the Request message is memberStoreType, the Receiver may change the way to maintain member resources. For example, if memberStoreType is updated from "URI Only" to "URI and Value", the Receiver may retrieve the content value of each member resource and create <mashMember> child resource for each member resource; then the Receiver may remove mashupMemberID attribute. If memberStoreType is updated from "URI and Value" to "URI Only", the Receiver may add mashupMemberID attribute and remove <mashupMember> child resources.<br>If the updated attribute in the Request message is resultGenType, the Receiver may change the way to calculate the semantic mashup result accordingly. For example, if resultGenType is changed from other values to "When VSMR Is Created", the Receiver may calculate the semantic mashup result which may trigger to retrieve the latest content value of each member resource. When resultGenType is changed to other values, the Receiver may determine to take no other actions instead of updating the value of resultGenType attribute. |
| Information in Response message | According to clause 10.1.3 in oneM2M-TS-0001 oneM2M Functional Architecture -V2.9.0. |
| Processing at Originator after receiving Response | According to clause 10.1.3 in oneM2M-TS-0001 oneM2M Functional Architecture -V2.9.0. |
| Exceptions | According to clause 10.1.3 in oneM2M-TS-0001 oneM2M Functional Architecture -V2.9.0. |

Delete <vsmr> procedure as described in Table 15 may be used to delete an existing <vsmr>. The generic delete procedure is described in clause 10.1.4.1 in oneM2M-TS-0001 oneM2M Functional Architecture—V2.9.0.

TABLE 15

| | <vsmr> DELETE |
|---|---|
| | <vsmr> DELETE |
| Associated Reference Point | Mca, Mcc and Mcc'. |
| Information in Request message | Parameters defined in Table 8.1.2-3 in oneM2M-TS-0001 oneM2M Functional Architecture -V2.9.0 apply. |
| Processing at Originator before sending Request | According to clause 10.1.4.1 in oneM2M-TS-0001 oneM2M Functional Architecture -V2.9.0. |
| Processing at Receiver | According to clause 10.1.4.1 in oneM2M-TS-0001 oneM2M Functional Architecture -V2.9.0.<br>The Receiver may remove the <vmsr> from the vsmrID attribute of corresponding <smp>.<br>If the removed <vsmr> does not have <smrs> child resource but smrsID attribute, the Receiver may remove the <vsmr> from the vsmrID attribute of corresponding <smrs> resources.<br>For each member resource that has parentVSMR attribute pointing to the removed <vsmr>, the Receiver may remove the <vsmr> from parentVSMR attribute. |

TABLE 15-continued

| | |
|---|---|
| | <vsmr> DELETE |
| | <vsmr> DELETE |
| Information in Response message | According to clause 10.1.4.1 in oneM2M-TS-0001 oneM2M Functional Architecture -V2.9.0. |
| Processing at Originator after receiving Response | According to clause 10.1.4.1 in oneM2M-TS-0001 oneM2M Functional Architecture -V2.9.0. |
| Exceptions | According to clause 10.1.4.1 in oneM2M-TS-0001 oneM2M Functional Architecture -V2.9.0. |

Semantic Mashup Result Resource <smrs> resource may be used to model and represent the mashup result of a virtual semantic mashup resource. A<smrs> resource may be placed under a <vsmr> as its child resource; alternatively, a <smrs> resource may be stored in a separate location (e.g. not a child resource of a <vsmr>) since the <vsmr> resource may have the smrsID attribute which points to the <smrs> resource. An <smrs> resource may be automatically generated as a result of mashup operation execution. <smrs> resources may be exposed to SMS Requestors 1808 which may be an oneM2M CSE or an oneM2M AE. As an SMS Requestor, an oneM2M CSE or AE may access the <smrs> resource to trigger the re-calculation of the mashup result or to retrieve the mashup result. When <smrs> and the corresponding <vsmr> are located in different places (e.g. not child-parent relationship), VSMR Host 2302 (e.g. where the <vsmr> is placed) may access the <smrs> resource to update the mashup result; likewise, SMRS Host 2304 (e.g. where the <smrs> is maintained) may access the <vsmr> to trigger the execution of mashup operation to get the new mashup result.

Figure 44:
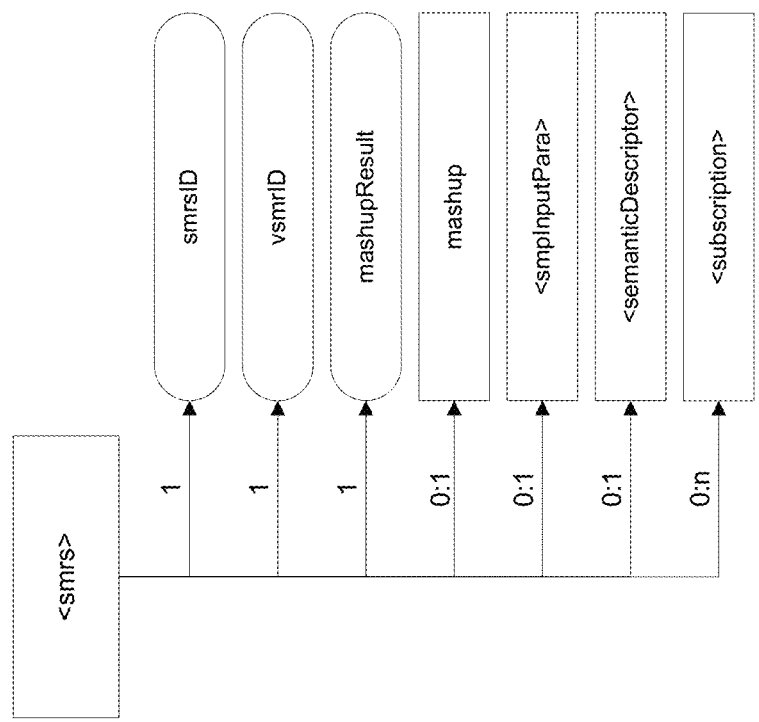
FIG. 44 illustrates an exemplary diagram of semantic mashup result resource <smrs>.

The <smrs> resource may include the child resources specified in Table 16 and the attributes specified in Table 17. The structure of <smrs> resource is also illustrated in FIG. 44.

TABLE 16

Child resources of <smrs> resource

| Child Resources of <smrs> | Multiplicity | Description |
|---|---|---|
| mashup | 0:1 | Is an oneM2M virtual resource. For example, when an SMS Requestor sends a RETRIEVE operation on this child resource, it triggers to re-calculate and re-generate the mashup result. Note that when the resultGenType attribute of a <vsmr> resource is "Periodical", this virtual resource may not be used since the mashup result may be generated periodically without relying on active triggering from the SMS Requestor. |
| <semanticDescriptor> | 0:1 | Describes other semantic information about this semantic mashup profile <smp>. This is similar to an existing oneM2M resource. |
| <subscription> | 0:n | Stands for subscription on this semantic mashup profile <smp>. This is similar to an existing oneM2M resource. |

TABLE 17

Attribute of <smrs> resource

| Attributes of <smrs> | Multiplicity | Description |
|---|---|---|
| smrsID | 1 | Stands for the identifier (e.g. URI) of this semantic mashup result resource <smrs>. It may also include some keywords that may be used for discovering this <smrs>. Alternatively, smrsID may be considered as oneM2M's labels attribute. |
| vsmrID | 1 | The identifier (e.g. URI) of the virtual semantic mashup resource <vsmr>, which is responsible for generating the mashup result stored in this <smrs> resource. |
| smpInputPara | 0:1 | May include the value of input parameters that are used to calculate this semantic mashup result. Note that the types of these input parameters may be specified by the <inputDescriptor> child resource of the corresponding <smp> that may be denoted by smpID attribute of the <vsmr> resource. The <vsmr> resource may be denoted by the vsmrID attribute of this <smrs>. |

TABLE 17-continued

Attribute of <smrs> resource

| Attributes of <smrs> | Multiplicity | Description |
|---|---|---|
| mashupResultFormat | 1 | Formatting of mashupResult representation (e.g. Integer, Float, Text, XML, JSON, Turtle, etc.) |
| mashupResult | 1 | Includes the representation of mashup result. |

Figure 45:
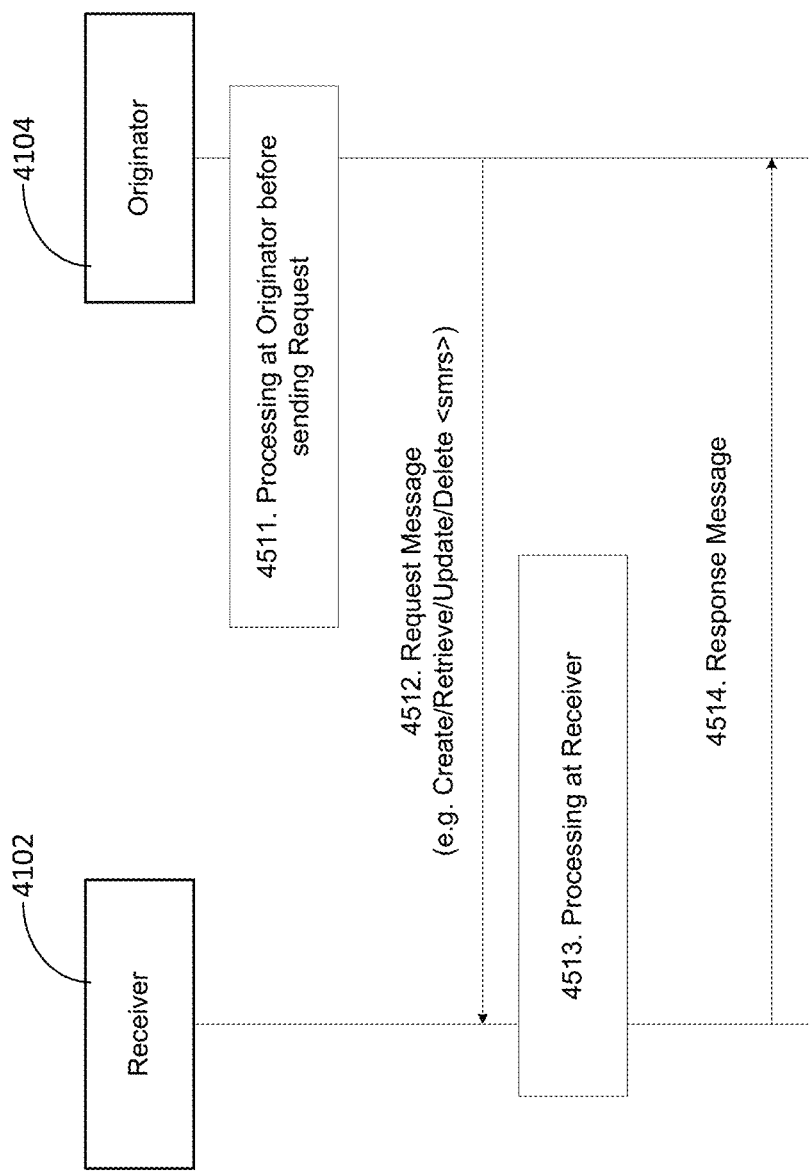
FIG. 45 illustrates an exemplary diagram of procedures for operating an <smrs> resource.

FIG. 45 illustrates the procedure to operate an <smrs> resource (e.g. Create, Retrieve, Update, or Delete an <smrs> resource).

It is understood that the entities performing the steps illustrated in FIG. 45 may be logical entities that may be implemented in the form of software (e.g., computer-executable instructions) stored in a memory of, and executing on a processor of, an apparatus configured for wireless or network communications or a computer system such as those illustrated in FIG. 51C or FIG. 51D. That is, the method(s) illustrated in FIG. 45 may be implemented in the form of software (e.g., computer-executable instructions) stored in a memory of an apparatus, such as the apparatus or computer system illustrated in FIG. 51C or FIG. 51D, which computer executable instructions, when executed by a processor of the apparatus, perform the steps illustrated in FIG. 45. It is also understood that the functionality illustrated in FIG. 45 may implemented as a set of virtualized network functions. The network functions may not necessarily communicate directly, rather, they may communicate via forwarding or routing function. It is also understood that any transmitting and receiving steps illustrated in FIG. 45 may be performed by communication circuitry of the apparatus under control of the processor of the apparatus and the computer-executable instructions (e.g., software) that it executes.

In FIG. 45, at step 4511, originator 4104 has some processing at originator. This may be according to clause 10.1.1.1 in oneM2M-TS-0001 oneM2M Functional Architecture—V2.9.0 (hereinafter 10.1.1.1) or the like. At step 4512, originator 4104 may send a request message to receiver 4102. The request message may be a create message, retrieve message, an update message, or a delete message for <smp>. At step 4513, processing the message of step 4512. At step 4514, based on the processing of step 4513. These steps are further described in Table 18-Table 22. Create <smrs> procedure may be used for creating an <smrs> resource as described in Table 18.

TABLE 18

| <smrs> CREATE | |
|---|---|
| <smrs> CREATE | |
| Associated Reference Point | Mca, Mcc and Mcc'. |
| Information in Request message | Parameters defined in Table 8.1.2-3 in oneM2M-TS-0001 oneM2M Functional Architecture -V2.9.0 apply with the specific details for: Content: The resource content may provide the information about an <smrs> resource (e.g. attribute values). |
| Processing at Originator before sending Request | According to clause 10.1.1.1 in oneM2M-TS-0001 oneM2M Functional Architecture -V2.9.0. |
| Processing at Receiver | According to clause 10.1.1.1 in oneM2M-TS-0001 oneM2M Functional Architecture -V2.9.0. |
| Information in Response message | Parameters defined in Table 8.1.3-1 in oneM2M-TS-0001 oneM2M Functional Architecture -V2.9.0 apply with the specific details for: Content: Address of the created <smrs> resource, according to clause 10.1.1.1 in oneM2M-TS-0001 oneM2M Functional Architecture - V2.9.0. |
| Processing at Originator after receiving Response | According to clause 10.1.1.1 in oneM2M-TS-0001 oneM2M Functional Architecture -V2.9.0. |
| Exceptions | According to clause 10.1.1.1 in oneM2M-TS-0001 oneM2M Functional Architecture -V2.9.0. |

Retrieve <smrs> procedure may be used for retrieving the attributes of an <smrs> resource as described in Table 19.

TABLE 19

| <smrs> RETRIEVE | |
|---|---|
| <smrs> RETRIEVE | |
| Associated Reference Point | Mca, Mcc and Mcc'. |
| Information in Request message | Parameters defined in Table 8.1.2-3 in oneM2M-TS-0001 oneM2M Functional Architecture -V2.9.0 apply with the specific details for: Content: void. |

TABLE 19-continued

| | <smrs> RETRIEVE |
|---|---|
| | <smrs> RETRIEVE |
| Processing at Originator before sending Request | According to clause 10.1.2 in oneM2M-TS-0001 oneM2M Functional Architecture -V2.9.0. |
| Processing at Receiver | The Receiver may verify the existence (including Filter Criteria checking, if it is given) of the target resource or the attribute and check if the Originator has appropriate privileges to retrieve information stored in the resource or attribute. Otherwise clause 10.1.2 in oneM2M-TS-0001 oneM2M Functional Architecture -V2.9.0 applies. |
| Information in Response message | Parameters defined in Table 8.1.3-1 in oneM2M-TS-0001 oneM2M Functional Architecture -V2.9.0 apply with the specific details for: Content: attributes of the <smrs> resource |
| Processing at Originator after receiving Response | According to clause 10.1.2 in oneM2M-TS-0001 oneM2M Functional Architecture -V2.9.0. |
| Exceptions | According to clause 10.1.2 in oneM2M-TS-0001 oneM2M Functional Architecture -V2.9.0. In addition: a timer has expired. The Receiver responds with an error. |

Retrieve <smrs>/mashup procedure may be used for retrieving the virtual child resource mashup of an <smrs> resource as described in Table 20.

TABLE 20

| | <smrs> RETRIEVE |
|---|---|
| | <smrs> RETRIEVE |
| Associated Reference Point | Mca, Mcc and Mcc'. |
| Information in Request message | Parameters defined in Table 8.1.2-3 in oneM2M-TS-0001 oneM2M Functional Architecture -V2.9.0 apply with the specific details for: To: <smrs>/mashup Content: void. |
| Processing at Originator before sending Request | According to clause 10.1.2 in oneM2M-TS-0001 oneM2M Functional Architecture -V2.9.0. |
| Processing at Receiver | The Receiver may verify the existence (including Filter Criteria checking, if it is given) of the target resource or the attribute and check if the Originator has appropriate privileges to retrieve information stored in the resource or attribute. Otherwise clause 10.1.2 in oneM2M-TS-0001 oneM2M Functional Architecture -V2.9.0 applies. The targeted mashup may be a virtual child resource of the <smrs>, which means to trigger the recalculation of semantic mashup result. The Receiver locates the corresponding <vsmr> according to the vsmrID attribute of the <smrs> if the <smrs> is not the child resource of the <vsmr>. Then Receiver may copy smpInputPara attribute of the <smrs> to the smpInputPara attribute of the <vsmr> and cause the <vsmr> to recalculate semantic mashup result. The recalculated mashup result may be stored back to the mashupResult attribute of the <smrs>. |
| Information in Response message | Parameters defined in Table 8.1.3-1 in oneM2M-TS-0001 oneM2M Functional Architecture -V2.9.0 apply with the specific details for: Content: attributes of the <smrs> resource. |
| Processing at Originator after receiving Response | According to clause 10.1.2 in oneM2M-TS-0001 oneM2M Functional Architecture -V2.9.0. |
| Exceptions | According to clause 10.1.2 in oneM2M-TS-0001 oneM2M Functional Architecture -V2.9.0. In addition: a timer has expired. The Receiver responds with an error. |

Update <smrs> procedure as described in Table 21 may be used to update an existing <smrs>, e.g. an update to its mashupResultFormat. The generic update procedure is described in clause 10.1.3 in oneM2M-TS-0001 oneM2M Functional Architecture—V2.9.0.

TABLE 21

| <smrs> UPDATE | |
|---|---|
| <smrs> UPDATE | |
| Associated Reference Point | Mca, Mcc and Mcc'. |
| Information in Request message | Parameters defined in Table 8.1.2-3 in oneM2M-TS-0001 oneM2M Functional Architecture -V2.9.0 apply with the specific details for: Content: attributes of the <smrs> resource which need be updated. |
| Processing at Originator before sending Request | According to clause 10.1.3 in oneM2M-TS-0001 oneM2M Functional Architecture -V2.9.0. |
| Processing at Receiver | According to clause 10.1.3 in oneM2M-TS-0001 oneM2M Functional Architecture -V2.9.0. |
| Information in Response message | According to clause 10.1.3 in oneM2M-TS-0001 oneM2M Functional Architecture -V2.9.0. |
| Processing at Originator after receiving Response | According to clause 10.1.3 in oneM2M-TS-0001 oneM2M Functional Architecture -V2.9.0. |
| Exceptions | According to clause 10.1.3 in oneM2M-TS-0001 oneM2M Functional Architecture -V2.9.0. |

Delete <smrs> procedure as described in Table 22 may be used to delete an existing <smrs>. The generic delete procedure is described in clause 10.1.4.1 in oneM2M-TS-0001 oneM2M Functional Architecture—V2.9.0.

TABLE 22

| <smrs> DELETE | |
|---|---|
| <smrs> DELETE | |
| Associated Reference Point | Mca, Mcc and Mcc'. |
| Information in Request message | Parameters defined in Table 8.1.2-3 in oneM2M-TS-0001 oneM2M Functional Architecture -V2.9.0 apply. |
| Processing at Originator before sending Request | According to clause 10.1.4.1 in oneM2M-TS-0001 oneM2M Functional Architecture -V2.9.0. |
| Processing at Receiver | According to clause 10.1.4.1 in oneM2M-TS-0001 oneM2M Functional Architecture -V2.9.0. If the <smrs> to be deleted has vsmrID attribute and is not a child resource of a <vsmr>, the Receiver may remove the <smrs> from the corresponding <vsmr> resources as denoted by the <smrs>'s vsmrID attribute. |
| Information in Response message | According to clause 10.1.4.1 in oneM2M-TS-0001 oneM2M Functional Architecture -V2.9.0. |
| Processing at Originator after receiving Response | According to clause 10.1.4.1 in oneM2M-TS-0001 oneM2M Functional Architecture -V2.9.0. |
| Exceptions | According to clause 10.1.4.1 in oneM2M-TS-0001 oneM2M Functional Architecture -V2.9.0. | oneM2M Common Attributes Table 23 lists new attributes which may be added as common attributes for some oneM2M resources (e.g. <container>, <group>, etc.).

TABLE 23

Common Attributes of an oneM2M Resource for Supporting SMS

| New Common Attributes of an oneM2M Resource | Multiplicity | Description |
|---|---|---|
| parentVSMR | 0:1(L) | Identifiers (e.g. URI) of virtual semantic mashup resources <vsmr>, which use this oneM2M resource its child resources as its member resource. An oneM2M resource (or its child resource) may be the member |

TABLE 23-continued

Common Attributes of an oneM2M Resource for Supporting SMS

| New Common Attributes of an oneM2M Resource | Multiplicity | Description |
| --- | --- | --- |
| | | resource of multiple <vsmr>s; as such, the value of this attribute may be a list including multiple <vsmr> identifiers. An oneM2M <container>, <flexContainer>, <group>, or other resource may have this attribute. For example, when an oneM2M <group> resource has this attribute, members of this <group> resources may be the mashup member resources of the corresponding <vsmr> resources as denoted by this attribute. |
| smpID | 0:1(L) | Identifier (e.g. URI) of a semantic mashup profile <smp> resource, based on which the mashup result may be calculated by using this resource or its child resource as member resources. An oneM2M resource (or its child resource>) may be leveraged for calculating mashup results by multiple semantic mashup profiles <smp>s; as such, the value of this attribute may be a list including multiple <smp> identifiers. An oneM2M <container>, <flexContainer>, <group>, or other resources may have this attribute. For example, when an oneM2M <group> resource has this attribute, members of this <group> resource may be used as mashup member resources for calculating the mashup result as described and specified by the corresponding semantic mashup profile <smp> as denoted by this attribute. |

Figure 46A:
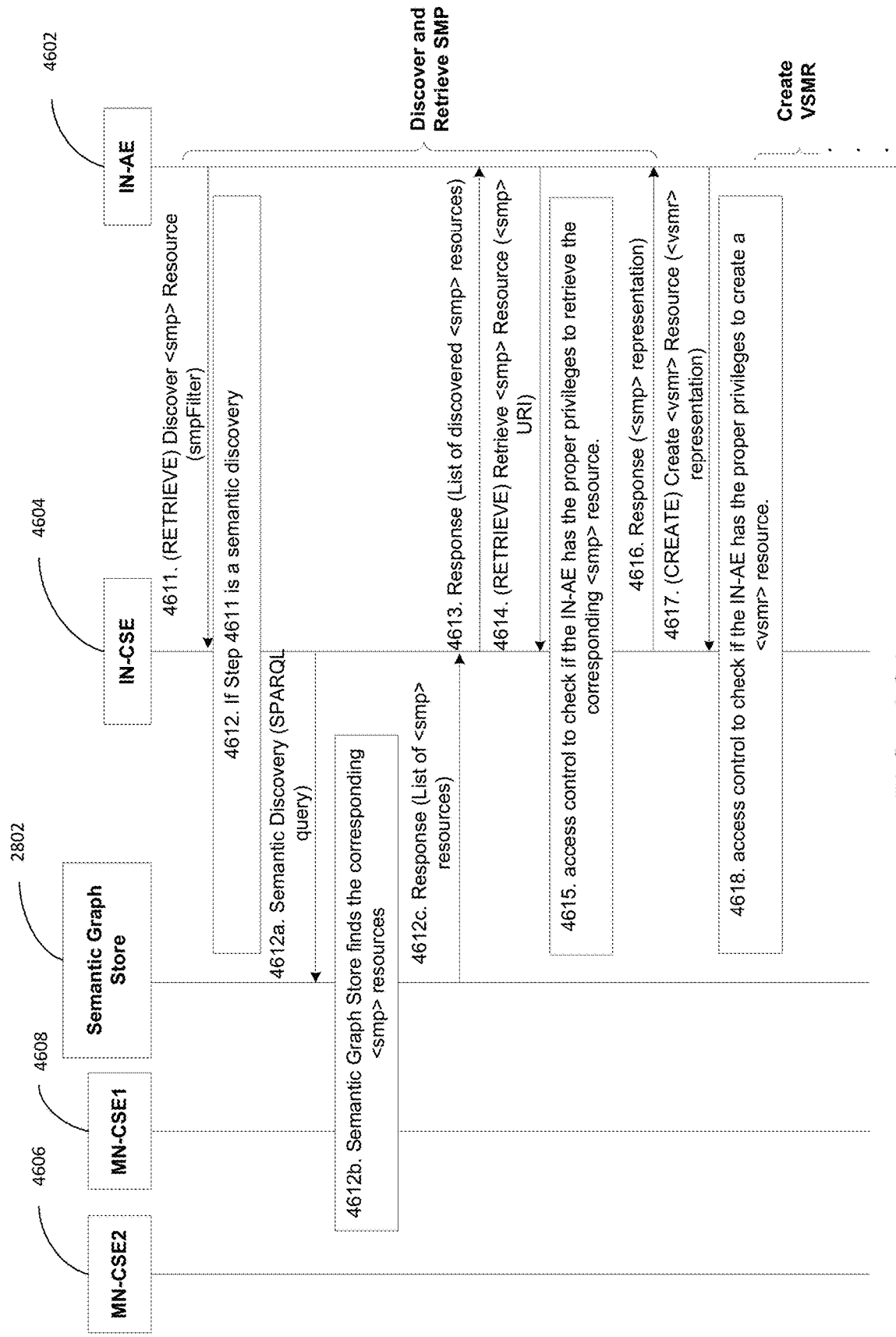
FIG. 46A illustrates an exemplary diagram of overall procedures of semantic mashup in oneM2M
Figure 46B:
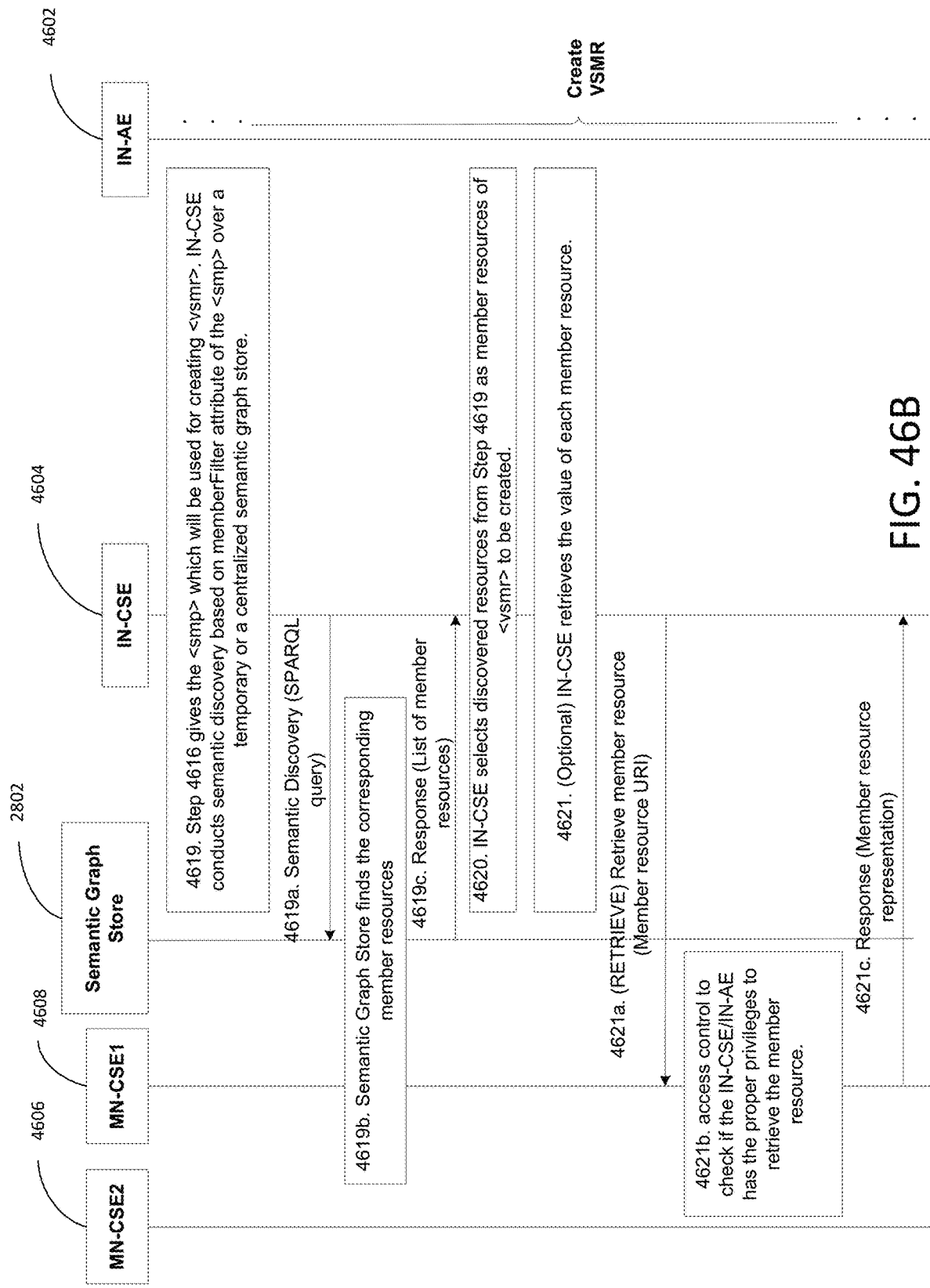
FIG. 46B illustrates an exemplary diagram of overall procedures of semantic mashup in oneM2M continued.
Figure 46C:
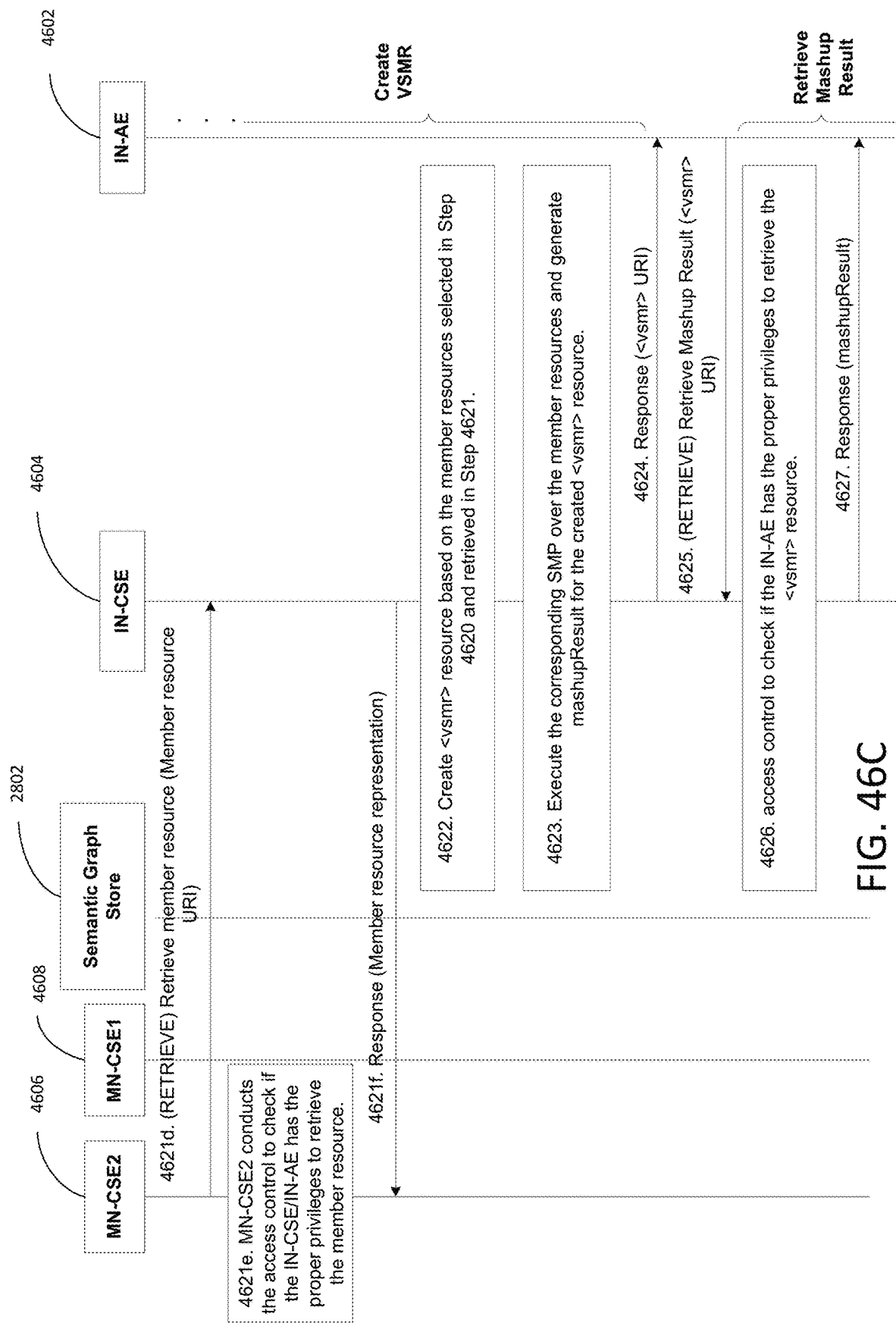
FIG. 46C illustrates an exemplary diagram of overall procedures of semantic mashup in oneM2M continued.

FIG. 46A-FIG. 46C (herein FIG. 46) illustrates an overall procedure example for supporting semantic mashup in oneM2M functional architecture. It may include the following parts: Discover and Retrieve SMP 1802 (e.g. Steps 4611-4615 of FIG. 46), Create VSMR (e.g. Steps 466-4612 of FIG. 46), or Retrieve Mashup Result (e.g. Steps 4613-4615 of FIG. 46). In this example, the following assumptions may be made. IN-AE 4602 is an SMS Requestor; IN-CSE 4604 acts as an SMS Host and host <smp> resources, <vsmr> resources, and <smrs> resource to provide semantic mashup services; member resources of <vsmr> resources for mashup may be from MN-CSE1 4606 and MN-CSE2 4608. Semantic triples for describing <smp> resources, <vsmr> resources, and <smrs> resources may be stored at Semantic Graph Store (SGS) to enable semantic resource discovery. Semantic triples for describing original resources (e.g. member resources) at MN-CSE1 4606 and MN-CSE2 4608 may be stored at SGS as well to enable semantic resource discovery. The resource URIs (e.g. <smp>, <vsmr>, <smrs>, and original member resources) have been included in their semantic triples, which may be stored at SGS and may be discovered or filtered out using semantic resource discovery.

Steps shown on FIG. 46 are described in more detail below. Step 4611 of FIG. 46: IN-AE 4602 sends a RETRIEVE operation to IN-CSE 4604 to discover a <smp> resource which may support a specific mashup service, referred to as "SuitableParkingService". This message includes a smpFilter (or using the existing oneM2M semanticFilter parameter), which is actually a SPARQL query pattern. An example of smpFilter is shown below.

```
(Line1) @PREFIX    smp:         <http://smp.example.com> .
(Line2) select ?smp
(Line3) where {
(Line4)    ?smp    rdf:type     smp:SMPResource .
(Line5)    ?smp    smp:hasService    "SuitableParkingService" .
(Line6)    }
```

Alternatively Line5 may be changed to the following triple if
SuitableParkingService has been defined as a class in the semantic mashup ontology.
?smp rdf:type smp:SuitableParkingService.

Step 4612 of FIG. 46: IN-CSE 4604 performs semantic resource discovery or filtering by sending the SPARQL query pattern in Step 4611 to SGS.

Step 4612.a of FIG. 46: IN-CSE 4604 sends a SPARQL query to SGS to discover expected <smp> resources. The SPARQL query is in fact the SPARQL query pattern received from step 4611.

Step 4612.b of FIG. 46: SGS executes the SPARQL query, finds the corresponding <smp> resources, and conducts the access control to check if the IN-CSE 4604 or IN-AE 4602 has the proper privileges to discover those <smp> resources. [The mentioned access control strategy may simply adopt the existing access control policies in the oneM2M system.] Note that SGS may not return the <smp> resource's URI if the IN-CSE 4604 or IN-AE 4602 is not authorized to discover it.

Step 4612.c of FIG. 46: SGS sends a response to IN-CSE 4604. This response message includes a list of <smp> URIs which meet the conditions in the SPARQL query and discovered by the IN-CSE 4604 or IN-AE 4602.

Step 4613 of FIG. 46: IN-CSE 4604 returns the discovered <smp> URIs to IN-AE 4602.

Step 4614 of FIG. 46: IN-AE 4602 picks an <smp> from the <smp> URI list included in Step 4613. Then it sends a RETRIEVE operation to retrieve attributes and child resources of this <smp>. The purpose of this step is for IN-AE 4602 to understand the types of input parameters required by this <smp> (e.g. its inputDescriptor attribute) and the types of mashup result (e.g. its outputDescriptor attribute) which may be generated by this <smp>.

Step 4615 of FIG. 46: IN-CSE 4604 conducts the access control to check if the IN-AE 4602 has the proper privileges to retrieve the corresponding <smp> resource. Note that if the IN-AE 4602 is not authorized to retrieve the <smp> resource, IN-CSE 4604 may send a proper error code.

Step 4616 of FIG. 46: If the IN-AE 4602 is authorized to retrieve the <smp> resource, IN-CSE 4604 sends a response to IN-AE 4602. This response message includes the representation of <smp> (or together with the representation of its child resources).

Step 4617 of FIG. 46: Based on the retrieved <smp>, IN-AE 4602 sends a CREATE operation to IN-CSE 4604 to create a <vsmr> resource. This message may include the representation of the <vsmr> resource to be created (e.g. its smpID attribute). IN-AE 4602 may set the following attributes of <vsmr>.

smpID=the <smp> URI discovered in Step 4613 and selected in Step 4614.

smrsStoreType="Child Resource". It means semantic mashup results may be created as child resources of this <vsmr>.

memberStoreType="URI Only".

resultGenType="When VSMR Is Created" & "When SMS Requestor Requests". It means IN-CSE 4604 may calculate semantic mashup result when <vsmr> is created and when IN-AE 4602 sends a RETRIEVE request to the virtual child resource mashup of <smrs>.

Step 4618 of FIG. 46: IN-CSE 4604 conducts the access control to check if the IN-AE 4602 has the proper privileges to create a <vsmr> resource. Note that if the IN-AE 4602 is not authorized to create a <vsmr> resource, IN-CSE 4604 may send a proper error code to the IN-AE 4602.

Step 4619 of FIG. 46: If IN-AE 4602 is authorized to create a <vsmr> resource, then IN-CSE 4604 locates the corresponding <smp> resource according to the smpID given in Step 4617. It composes a SPARQL query according to the memberFilter attribute of the <smp> resource. The SPARQL query may be sent to SGS to discover member resources for the <vsmr> to be created in Step 4622.

Step 4619.a of FIG. 46: The SPARQL query composed in Step 4619 is sent from IN-CSE 4604 to SGS.

Step 4619.b of FIG. 46: SGS executes the SPARQL query, finds the corresponding member resources, and conducts the access control to check if the IN-CSE 4604 or IN-AE 4602 has the proper privileges to discover these member resources. Note that SGS may not return the member resource's URI if the IN-CSE 4604 or IN-AE 4602 is not authorized to discover it.

Step 4619.c of FIG. 46: SGS sends a response to IN-CSE 4604, which includes a list of discovered member resources (e.g. their URIs).

Step 4620 of FIG. 46: IN-CSE 4604 selects resources from the returned list in Step 4619.c as the member resources for the <vsmr> to be created in Step 4622.

Step 4621 of FIG. 46: Since it was given in Step 4617 that resultGenType="When VSMR Is Created", IN-CSE 4604 may retrieve the content value or representation of each member resource. In this example, it is assumed that there are two member resources rsc1 and rsc2, respectively, hosted by MN-CSE1 4606 and MN-CSE2 4608.

Step 4621.a of FIG. 46: IN-CSE 4604 sends a RETRIEVE operation to MN-CSE1 4606 to retrieve the first member resource rsc1.

Step 4621.b of FIG. 46: MN-CSE1 4606 conducts the access control to check if the IN-CSE 4604 or IN-AE 4602 has the proper privileges to retrieve the member resource (e.g., rsc1). Note that if the IN-CSE 4604 or IN-AE 4602 is not authorized to retrieve the member resource, MN-CSE1 4606 may send a proper error code.

Step 4621.c of FIG. 46: if the IN-CSE 4604 or IN-AE 4602 is not authorized to retrieve the member resource, then the content value or representation of the first member resource rsc1 is returned to IN-CSE 4604.

Step 4621.d of FIG. 46: IN-CSE 4604 sends a RETRIEVE operation to MN-CSE2 4608 to retrieve the second member resource rsc2.

Step 4621.e of FIG. 46: MN-CSE2 4608 conducts the access control to check if the IN-CSE 4604 or IN-AE 4602 has the proper privileges to retrieve the member resource (e.g., rsc2). Note that if the IN-CSE 4604 or IN-AE 4602 is not authorized to retrieve the member resource, MN-CSE2 4608 may send a proper error code.

Step 4621.f of FIG. 46: if the IN-CSE 4604 or IN-AE 4602 is not authorized to retrieve the member resource, then the content value or representation of the second member resource rsc2 is returned to IN-CSE 4604.

Step 4622 of FIG. 46: IN-CSE 4604 creates a <vsmr> resource based on the attribute values given in Step 4617, member resources determined in Step 4620. Since smrsStoreType="Child Resource" as given in Step 4617, IN-CSE 4604 may also create and place semantic mashup result resource <smrs> as the child resource of the created <vsmr>.

Step 4623 of FIG. 46: Since resultGenType="When VSMR Is Created", IN-CSE 4604 executes the mashup operations as specified in the functionDescriptor attribute of the corresponding <smp> resource. The mashup operations may be executed over the content values of each member resource (as retrieved in Step 4621.c and Step 4621.f) and input parameters (as included in Step 4617.). Then IN-CSE 4604 stores the calculated mashup result in the mashupResult attribute of <vsmr>/<smrs> resource.

Step 4624 of FIG. 46: IN-CSE 4604 sends a response to IN-AE 4602. This response message may include the URI of the created <vmsr> and may also include the URI for retrieving semantic mashup result (e.g. <vsmr>/<smrs>).

Step 4625 of FIG. 46: IN-AE 4602 sends a RETRIEVE operation to IN-CSE 4604 to retrieve the semantic mashup result. The targeted URI of this request is <vsmr>/<smrs>, but to retrieve the mashupResult attribute of <smrs> resource, since the semantic mashup result has been calculated in Step 4623.

Alternatively, since it has been indicated in Step 4617 that resultGenType="When SMS Requestor Requests" as well, IN-AE 4602 may send the RETRIEVE operation to <vsmr>/<smrs>/mashup to trigger IN-CSE 4604 to re-calculate the semantic mashup result. In this case, the following Step 4626 may be used.

Step 4626 of FIG. 46: If the target URI in Step 4625 is <vsmr>/<smrs>/mashup, this step may be used. After receiving the RETRIEVE operation, IN-CSE 4604 may first conduct the access control to check if the IN-AE 4602 has the proper privileges to retrieve the <vsmr>/<smrs>/mashup resource. If the IN-AE 4602 is authorized to retrieve the <vsmr>/<smrs>/mashup resource, then IN-CSE 4604 executes Step 4621 and Step 4623 to re-calculate the mashup results; otherwise, IN-CSE 4604 sends a proper error code.

Step 4627 of FIG. 46: IN-CSE 4604 returns the semantic mashup results back to IN-AE 4602.

It is understood that the entities performing the steps illustrated in FIG. 46 may be logical entities that may be implemented in the form of software (e.g., computer-executable instructions) stored in a memory of, and executing on a processor of, an apparatus configured for wireless or network communications or a computer system such as those illustrated in FIG. 51C or FIG. 51D. That is, the method(s) illustrated in FIG. 46 may be implemented in the form of software (e.g., computer-executable instructions) stored in a memory of an apparatus, such as the apparatus or computer system illustrated in FIG. 51C or FIG. 51D, which computer executable instructions, when executed by a processor of the apparatus, perform the steps illustrated in FIG. 46. It is also understood that the functionality illustrated in FIG. 46 may implemented as a set of virtualized network functions. The network functions may not necessarily communicate directly, rather, they may communicate via forwarding or routing function. It is also understood that any transmitting and receiving steps illustrated in FIG. 46 may be performed by communication circuitry of the apparatus under control of the processor of the apparatus and the computer-executable instructions (e.g., software) that it executes.

Alternatively, an oneM2M CSE may leverage existing oneM2M <group> resource to implement SMS, instead of creating new <vsmr> resource. It may work as follows. A<group> resource may have most attributes of <vsmr> resources (e.g. smpID, smpinputPara, resultGenType, etc.) as defined in Table 10. This <group> resource basically provides a particular SMS. The CSE which hosts the <group> resource is actually an SMS Host. In addition, <group> may have <smrs> as its child resource or simply has a new attribute "smrs" to store the mashup result. Each member of the <group> resource is regarded as a mashup member (e.g. the original resource>. As a result, the memberIDs attribute of <group> resource may be used to include the list of mashup members involved or required by a semantic mashup process.

The <group> resource may have a new virtual resource "mashup." When another CSE or AE wants to leverage the SMS provided by the <group> resource, it sends a RETRIEVE request targeting this new virtual resource "mashup" (e.g. /<group>/mashup). Whenever receiving a RETRIEVE request targeting "mashup" virtual resource, the CSE hosting the <group> resource may calculate the mashup result using input parameters included in smpinputPara attribute, mashup profile information in <smp> resource as denoted by the new smpID attribute, and the representation of each mashup member (which may be retrieved using "fanOutPoint" virtual resource of this <group> resource). Then the CSE hosting the <group> resource sends a response to the requesting CSE or AE; the response message may include the calculated mashup result. The calculated mashup result may be stored in the new attribute "smrs" or in <smrs> child resource if the <group> resource has <smrs> as its child resource.

In addition, the CSE hosting the <group> resource may periodically retrieve the representation of each mashup member (as included in memberIDs attribute of the <group> resource), and re-calculate the mashup result based on the new representations of mashup members. Other CSEs or AEs may make a subscription on the "mashup" virtual resource. Then, the CSE hosting the <group> resource may send automatic notifications (which include new mashup result) to those other CSEs or AEs, which may be actually the subscriber of mashup result.

Also, the CSE hosting the <group> resource may make subscription to each mashup member (as included in memberIDs attribute of the <group> resource). When there are changes to a mashup member, the CSE may receive automatic notifications. Then the CSE may need find another mashup member if an existing one becomes unavailable, or recalculate the mashup result if the representations of one or more mashup members have been changed. Other CSEs or AEs may make a subscription on the "mashup" virtual resource. Then, the CSE hosting the <group> resource may send automatic notifications (which include new mashup result) to those other CSEs or AEs when new mashup result is generated.

A VSMR may subscribe to the original resources, which may be the mashup members of the VSMR. The subscription request sent by the VSMR may include the URI of the original resource, mashupMemURI, notificationContentType, and eventNotificationCriteria, where the mashupMem URI parameter indicates where the notification should be delivered, notificationContentType implies the content type of the notification, and the eventNotificationCriteria parameter indicates the triggering events for the Resource Host sending the notification. The condition of the eventNotificationCriteria parameter may be similar with the one provided in the oneM2M spec [oneM2M-TS-0001 oneM2M Functional Architecture—V2.9.0]. Specifically, the eventType condition tag in the eventNotificationCriteria parameter indicates the type of events (which may happen on the subscribed-to resource) may trigger the Resource Host to send the notification.

Exemplary values of eventType condition (that may be applied to the VSMR subscribing to original resources) are: A) Update to attributes of the subscribed-to original resource; note that the VSMR may also use the attribute condition tag to specify which attributes of the subscribed-to original resource may trigger the Resource Host sending the notification; B) Deletion of the subscribed-to original resource; C) Creation of a direct child of the subscribed-to original resource; or D) Deletion of a direct child of the subscribed-to original resource.

With reference to creation of a direct child of the subscribed-to original resource, note that here we introduce a new condition tag, e.g., creationFilter, to specify creating what kind of child of the subscribed-to original resource may trigger the Resource Host sending the notification. This condition tag may be used for the Resource Host to check whether the new original resource is qualified to be the mashup member of the VSMR (if the new original resource is qualified, the Resource Host should send the notification to inform the VSMR about the new qualified mashup member; otherwise, the Resource Host should not send the notification). The value of creationFilter may be a set of programming code.

Open Interconnect Consortium (OIC) example is disclosed below. The OIC architecture may include OIC Servers and OIC Clients. An OIC Server, which is considered as a resource provider, hosts OIC resources, while an OIC Client is a resource consumer, which accesses and manipulates resources hosted at the OIC Server. The resources may be manipulated based on Request or Response model. Basically, an OIC Client sends a RESTful request (e.g. Create, Retrieve, Update, Delete, and Notify) targeting a resource at the OIC Server; then the OIC Server may process the RESTful request and send a corresponding response to the OIC Client. OIC specification has defined different types of resources; each type of resources may have multiple Properties; each Property may be read-only or read-write and may be accessed by different resource Interfaces. Moreover, some common Properties, e.g., Resource Type ("rt"), Interface ("if"), Name ("n"), and Resource Identity ("id"), have also been detailed. As a result, the content of a response message from the OIC Server to the OIC Client may depend on multiple factors, such as: 1) the type of RESTful request being sent from the OIC Client to the OIC Server; 2) the type of the resource being targeted by the RESTful operation; or 3) the type of Interfaces included in the query parameter of the RESTful operation.

There are multiple options to implement the SMS in OIC architecture. Since an OIC Server may host resources and receive requests from OIC Clients, the OIC Server may be regarded as Resource Host or SMS Host; in other words, functionalities of SMS Host and Resource Host may be implemented within the OIC Server. In contrast, OIC Clients may implement the functionalities of SMS Requestors 1808. The following exemplary methods shown and disclosed with regard Method1 or Method2 are implementing the SMS in OIC architecture.

In Method1, OIC Server1 4702 may provide SMS based on its local resources, which are used as mashup members. As shown in FIG. 47(*a*), the OIC Server1 4702 acts as an SMS Host and a Resource Host. As a Resource Host, its OIC Resources may be leveraged as mashup members; as an SMS Host, it implements SMS functionalities and procedures This SMS may leverage existing OIC Collection resource to implement VSMR functions. OIC Server1 4702 calculates mashup result based on the representations of mashup members which may be from local OIC resources in this case. OIC Client2 and OIC Client3 may be two SMS Requestors 1808 that access the SMS at the OIC Server1 4702 using OIC CRUDN operations.

In Method2, an OIC Server1 4702 may provide SMS, but mashup members may be from other OIC Servers. As shown in FIG. 47(*b*), OIC Server1 4702 still acts as an SMS Host, but mashup members may not be from its local resources; instead, OIC resources from OIC Server2 4708 and OIC Server3 4710 may be used as mashup members. In order to access these mashup members (e.g. original resources at OIC Server2 4708 or OIC Server3 4710), OIC Server1 4702 leverages OIC Client1 to interact with OIC Server2 4708 and OIC Server3 4710; here we assume OIC Server1 4702 and OIC Client1 reside at the same physical device and there is an internal interface between OIC Server1 4702 and OIC Client1. Similar to FIG. 47(*a*), OIC Server1 4702 still uses its local Collection resource to implement VSMR functions. A difference from FIG. 47(*a*) is that mashup members in this case may not be from local resources. In order to calculate mashup result, OIC Server1 4702 may retrieve (via OIC Client1) the representations of mashup members from OIC Server2 4708 and OIC Server3 4710. The calculated mashup result may be maintained locally at OIC Server1 4702, which may be accessed by OIC Client2 and OIC Client3 (both may be SMS Requestors) using OIC CRUDN operations.

Figure 47A:
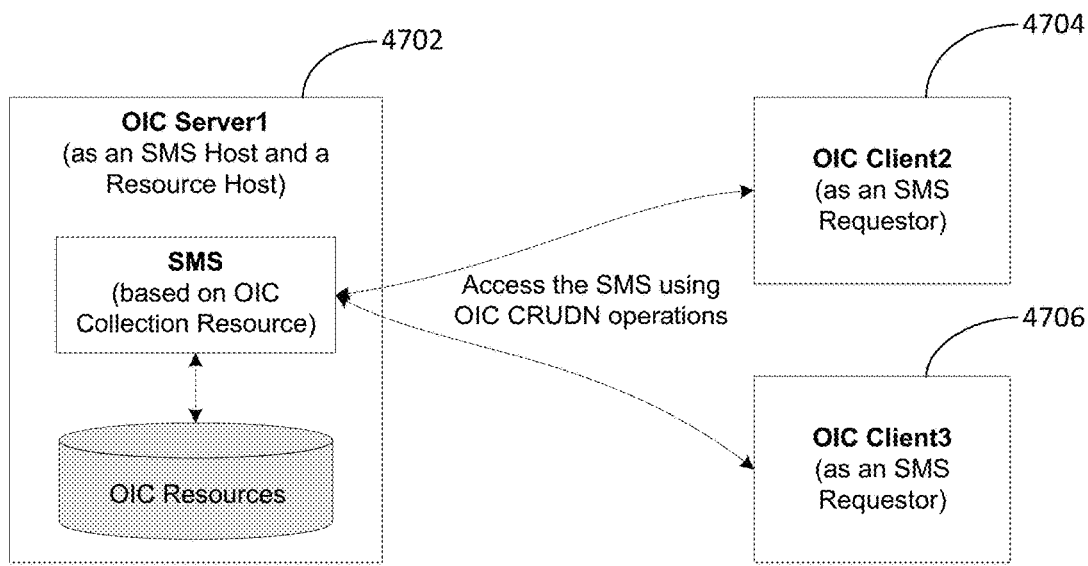
FIG. 47A illustrates an exemplary diagram of SMS under an OIC architecture.
Figure 47B:
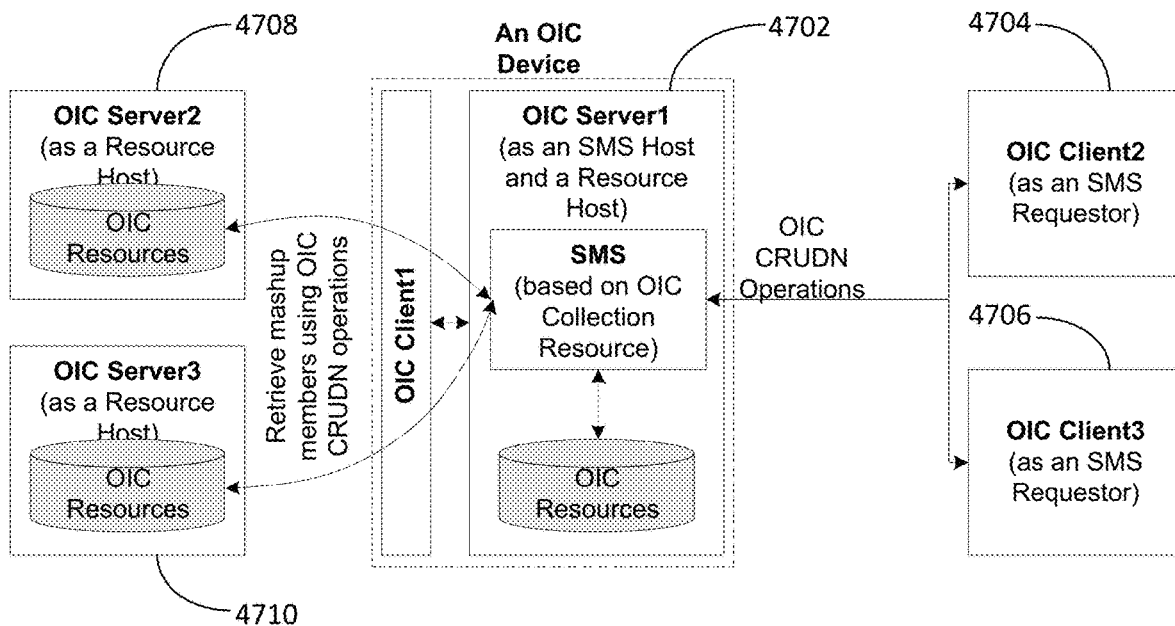
FIG. 47B illustrates an exemplary diagram of SMS under an OIC architecture.

It is understood that the entities performing the steps illustrated in FIG. 47A-B may be logical entities that may be implemented in the form of software (e.g., computer-executable instructions) stored in a memory of, and executing on a processor of, an apparatus configured for wireless or network communications or a computer system such as those illustrated in FIG. 51C or FIG. 51D. That is, the method(s) illustrated in FIG. 47A-B may be implemented in the form of software (e.g., computer-executable instructions) stored in a memory of an apparatus, such as the apparatus or computer system illustrated in FIG. 51C or FIG. 51D, which computer executable instructions, when executed by a processor of the apparatus, perform the steps illustrated in FIG. 47A-B. It is also understood that the functionality illustrated in FIG. 47A-B may implemented as a set of virtualized network functions. The network functions may not necessarily communicate directly, rather, they may communicate via forwarding or routing function. It is also understood that any transmitting and receiving steps illustrated in FIG. 47A-B may be performed by communication circuitry of the apparatus under control of the processor of the apparatus and the computer-executable instructions (e.g., software) that it executes.

Method1—An OIC Server Provides SMS and Its Local Resources Are Mashup Members. To support the SMS, the following may be used with reference to FIG. 48. There may be new resource properties and new resource interface (Table 24 and Table 25). Semantic Mashup Profile ("smp") may be used as a new Property of a Collection resource to describe how mashup should be performed on links of the Collection resource. In this case, links of the Collection resource may be regarded as member resources for a mashup operation. Semantic Input Parameters ("sip") may be used as a new Property of a Collection resource to include input parameters which may be required for the mashup as described in "smp" Property. Semantic Mashup Result ("smrs") may be used as a new Property of a Collection resource to maintain the mashup resource. New resource Interfaces (e.g. mashup1 and mashup2) may be used for a Collection resource. mashup1 Interface may be used to retrieve "smrs" property of a Collection resource, while mashup2 Interface may be used to trigger mashup operation to recalculate the mashup result and in turn obtain the latest mashup result.

Figure 48:
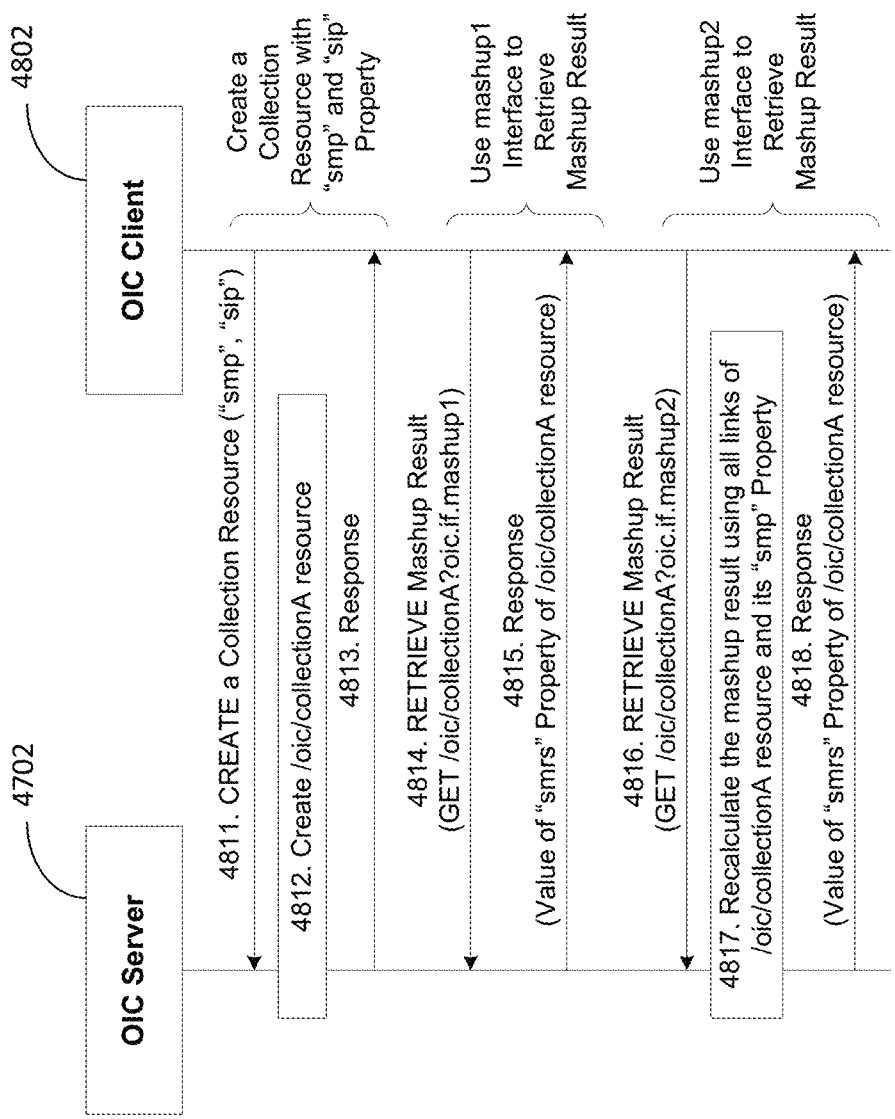
FIG. 48 illustrates an exemplary diagram of an OIC server providing SMS and using its local resources as mashup members.

FIG. 48 illustrates an exemplary semantic mashup procedure. For steps 4811-4813 of FIG. 48, a collection resource (e.g. /oic/collectionA) may created at an OIC Server by an OIC Client (or the OIC Server itself). The Collection resource may include a few links; each link is a semantic mashup member. The Collection resource may have new Properties: "smp", "sip", or "smrs." The profile information about an SMP 1802 (especially semantic mashup function description and mashup result description) may be included in the "smp" property. The value of "smp" Property may be set when the Collection resource is created. The "sip" Property may give the name and value of each input parameter. The value of "sip" Property may be set when the Collection resource is created. The "smrs" Property may be used to store the mashup result once it is calculated by the OIC Server over the links (e.g. mashup members) according to the profile information in "smp" Property.

For steps 4815-4816 of FIG. 48, an OIC Client 4802 may use mashup1 Interface to directly retrieve the mashup result. For example, it may send the following request to the OIC Server; once receiving this request, the OIC Server 4702 may send a response message including the value of "smrs" Property to the OIC Client 4802. (The request message sent to the OIC Server) GET/oic/collectionA ?oic.if.mashup1

Steps 4816-4818 of FIG. 48, alternatively, an OIC Client 4802 may use mashup2 Interface to trigger the OIC Server 4702 to recalculate the mashup result. For example, it may send the following request to the OIC Server 4702: (The request message sent to the OIC Server) GET/oic/collectionA ?oic.if.mashup2. This request message may include a value of "sip" Property. Once receiving this request, the OIC Server 4702 may re-calculate the mashup result over links of the Collection resource (e.g. regard them as mashup member resources), store the new mashup result in the "smrs" Property, and send a response message including the updated value of "smrs" Property to the OIC Client 4802.

be performed by communication circuitry of the apparatus under control of the processor of the apparatus and the computer-executable instructions (e.g., software) that it executes.

Alternatively, a new OIC resource (referred to as VSMR) may be introduced instead of leveraging the Collection resource. The new OIC VSMR resource has "smp", "sip" and "smrs" Properties as defined in Table 24, and supports

TABLE 24

New Resource Properties to Support SMS in OIC Architecture

| Property title | Property name | Value type | Value rule | Description |
| --- | --- | --- | --- | --- |
| Semantic Mashup Profile | smp | json | Array of Dot separated strings | A new property for a Collection resource to describe mashup profile information (e.g. similar information as an oneM2M <smp>) |
| Semantic Mashup Result | smrs | json | Array of Dot separated strings | A new property for a Collection resource to store the calculated mashup result. |
| Semantic Input Parameters | sip | json | Array of Dot separated strings | A new property for a Collection resource to include input parameters required by calculating mashup result. The value of this Property may be given when the Collection resource is created or when an OIC Client uses mashup1 or mashup2 interface to access the Collection resource. |

TABLE 25

New Resource Interfaces to Support SMS in OIC Architecture

| Interface | Name | Applicable Methods | Description |
| --- | --- | --- | --- |
| mashup1 | oic.if.mashup1 | RETRIEVE | The mashup1 Interface allows an OIC Client to retrieve the new "smrs" Property of a Collection resource from an OIC Server. |
| mashup2 | oic.if.mashup2 | RETRIEVE | The mashup2 Interface allows an OIC Client to trigger an OIC Server to perform mashup operations on links of a Collection resource; then the OIC Server returns the mashup result to the OIC Client or stores the mashup result in the new "smrs" Property of the Collection resource. |

It is understood that the entities performing the steps illustrated in FIG. 48 may be logical entities that may be implemented in the form of software (e.g., computer-executable instructions) stored in a memory of, and executing on a processor of, an apparatus configured for wireless or network communications or a computer system such as those illustrated in FIG. 51C or FIG. 51D. That is, the method(s) illustrated in FIG. 48 may be implemented in the form of software (e.g., computer-executable instructions) stored in a memory of an apparatus, such as the apparatus or computer system illustrated in FIG. 51C or FIG. 51D, which computer executable instructions, when executed by a processor of the apparatus, perform the steps illustrated in FIG. 48 It is also understood that the functionality illustrated in FIG. 48 may implemented as a set of virtualized network functions. The network functions may not necessarily communicate directly, rather, they may communicate via forwarding or routing function. It is also understood that any transmitting and receiving steps illustrated in FIG. 48 may both mashup1 and mashup2 interface as described in Table 25. In addition, similar to a Collection resource, a VSMR resource has a set of links as mashup members. The mashup result is calculated based on mashup profile information (e.g. mashup function) included in "smp" Property, input parameters included in "sip" Property, and values of each mashup member (e.g. all links included in the VSMR). The mashup result is exposed to OIC Clients via mashup1 Interface; in other words, an OIC Client may come to the VSMR resource to retrieve the mashup result using mashup1 Interface (e.g. GET/oic/vsmrExample?mashup1, where/oic/vsmrExample is a VSMR resource example). If an OIC Client wants to trigger the OIC Server to recalculate the mashup result, it may use the mashup2 Interface and may send such a message to the OIC Server: GET/oic/vsmsExample?mashup2, where/oic/vsmrExample is a VSMR resource example. Similar procedures of FIG. 48 may be applied.

Figure 49:
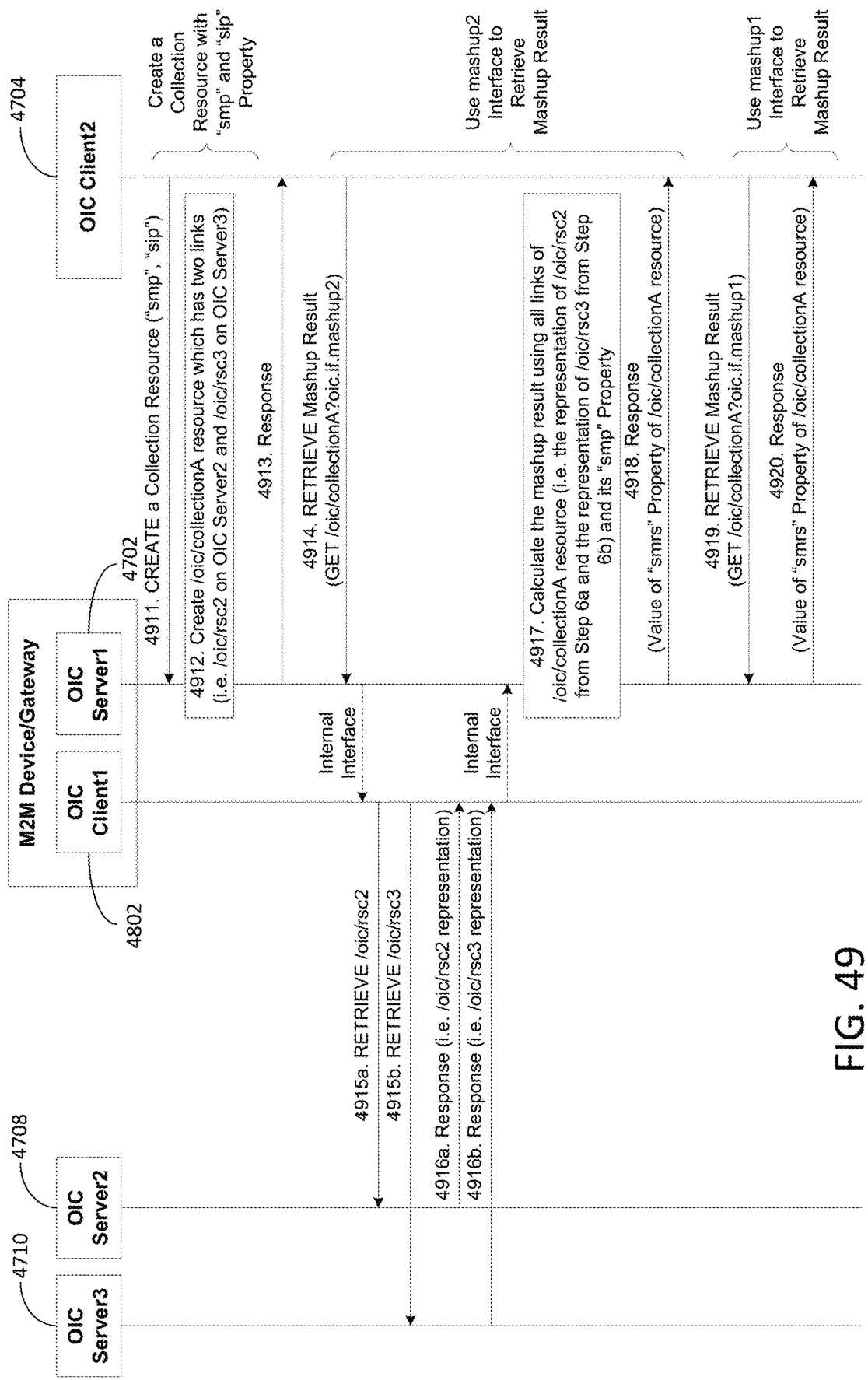
FIG. 49 illustrates an exemplary diagram of an OIC server providing SMS where mashup members are from other OIC servers.

Method2—An OIC Server Provides SMS but Mashup Members Are From Other OIC Servers—as shown in FIG. 49, OIC Server1 4702 provides SMS by hosting a Collection resource (e.g. /oic/collectionA). Similar to Method1 above, /oic/collectionA has new Properties (e.g. "smp", "sip", and "smrs") and supports new Interfaces (e.g. mashup1 and mashup2). However, different from Method1, the links of/oic/collectionA resource are not hosted at OIC Server1 4702, but at OIC Server2 4708 and OIC Server3 4710, respectively. When OIC Server1 4702 calculates mashup results, it may retrieve the representation of each link of /oic/collectionA; in other words, mashup members may not be stored at OIC Server1 4702 but from other OIC Servers (e.g. OIC Server2 4708 and OIC Server3 4710). In addition, it is assumed that OIC Client1 4802 and OIC Server1 4702 may be physically co-located and belong to the same M2M Device or Gateway. Procedures of FIG. 49 are described below.

Steps 4911-4913 of FIG. 49 are similar to Steps 4811-4813 on FIG. 48. In step 4912 of FIG. 49, it's assumed that OIC Server1 4702 already knows the two links of /oic/collectionA to be created (i.e /oic/rsc2 resource on OIC Server2 4708 and /oic/rsc3 resource on OIC Server3 4710).

Steps 4914-4918 of FIG. 49 are used by OIC Client2 4704 to retrieve mashup result from OIC Server1 4702 using the new mashup2 Interface.

Step 4914 of FIG. 49 is the same as Step 6 of FIG. 48. Via internal interface, OIC Server1 4702 talks to OIC Client1 and leverages it to retrieve those two links of /oic/collectionA.

Step 4915a and 4915b of FIG. 49: OIC Client1 sends RETRIEVE to OIC Server2 4708 and OIC Server3 4710, respectively, to retrieve/oic/rsc2 from OIC Server2 4708 and/oic/rsc3 from OIC Server2 4708.

Step 4916a and 4916b of FIG. 49: the representations of/oic/rsc2 and/oic/rsc3 may be sent back to OIC Client1, which may forward them to OIC Server1 4702.

Step 4917 of FIG. 49: OIC Server1 4702 may calculate the mashup result based on its "smp" and "sip" Property value and the response from Step 6a/6b (e.g. representation of mashup members). The calculated mashup result may be stored in the Property "smrs".

Step 4918 of FIG. 49: OIC Server1 4702 may send a response to OIC Client2. This response message may include the value of "smrs" Property (e.g. the mashup result calculated in Step 4917).

Steps 4919-4920 of FIG. 49: OIC Client2 may use the new mashup1 Interface to retrieve the mashup result from OIC Server1 4702. They may be the same as Steps 4814-4815 on FIG. 48.

It is understood that the entities performing the steps illustrated in FIG. 49 may be logical entities that may be implemented in the form of software (e.g., computer-executable instructions) stored in a memory of, and executing on a processor of, an apparatus configured for wireless or network communications or a computer system such as those illustrated in FIG. 51C or FIG. 51D. That is, the method(s) illustrated in FIG. 49 may be implemented in the form of software (e.g., computer-executable instructions) stored in a memory of an apparatus, such as the apparatus or computer system illustrated in FIG. 51C or FIG. 51D, which computer executable instructions, when executed by a processor of the apparatus, perform the steps illustrated in FIG. 49 It is also understood that the functionality illustrated in FIG. 49 may implemented as a set of virtualized network functions. The network functions may not necessarily communicate directly, rather, they may communicate via forwarding or routing function. It is also understood that any transmitting and receiving steps illustrated in FIG. 49 may be performed by communication circuitry of the apparatus under control of the processor of the apparatus and the computer-executable instructions (e.g., software) that it executes.

Figure 50:
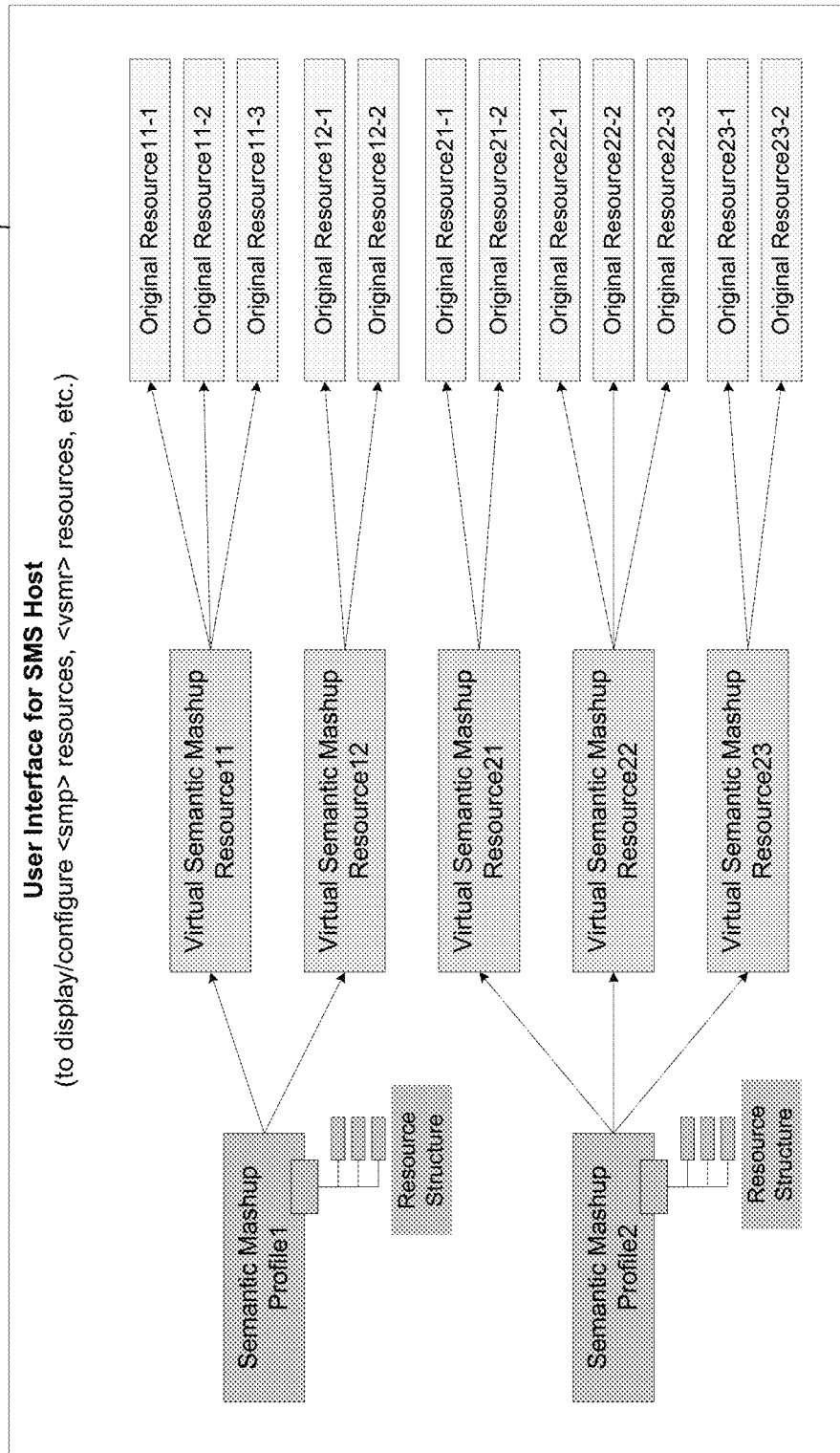
FIG. 50 illustrates an exemplary diagram of a Graphical User Interface.

Interfaces, such as Graphical User Interfaces (GUIs), may be used to assist user to control or configure functionalities related to semantic mashup. FIG. 50 is a diagram that illustrates an exemplary interface 5002 that allows a user to display or configure relationship among semantic mashup profiles (e.g. <smp> resources), virtual semantic mashup resources (e.g. <vsmr> resources), or original resources. Each resource structure of each semantic mashup profile may be displayed or configured. Virtual semantic mashup resources using the same semantic mashup profile may be displayed or configured. For example, it is shown that Semantic Mashup Profile1 may be used by Virtual Semantic Mashup Resource11 and Virtual Semantic Mashup Resource12.

With continued reference to FIG. 50, Semantic Mashup Profile2 may be used by three virtual semantic mashup resources (e.g. Virtual Semantic Mashup Resource21, Virtual Semantic Mashup Resource22, and Virtual Semantic Mashup Resource23). Member resources of each virtual semantic mashup resource may be displayed or configured. For example, Virtual Semantic Mashup Resource12 has two member resources (e.g. Original Resource12-1 and Original Resource12-2). Through this interface, a member resource may be removed from or a new member resource may be added to a virtual semantic mashup resource. It is to be understood that interface 5002 may be produced using displays such as those shown in FIG. 51C-FIG. 51D described below.

FIG. 51A illustrates an exemplary diagram of an example machine-to machine (M2M), Internet of Things (IoT), or Web of Things (WoT) communication system 10 in which one or more disclosed concepts associated with enabling a semantic mashup in IoT may be implemented (e.g., FIG. 17-FIG. 50 and accompanying discussion). Generally, M2M technologies provide building blocks for the IoT/WoT, and any M2M device, M2M gateway or M2M service platform may be a component of the IoT/WoT as well as an IoT/WoT service layer, etc. Communication system 10 may be used to implement functionality of the disclosed examples and may include functionality and logical entities, such as SMS architecture 1800, SMP 1802, VSMR 1804, SMRS 1806, requestor 1808, SMS host 1810, original resources, mashup function 2002, advanced SMS architecture 2200, VSMR Host 2302, SMRS Host 2304, 2402, resource hosts 2804, 3402, semantic graph store 2802, receiver 4102, originator 4104, MN-CSE 4606, 4608, IN-CSE 4604, IN-AE 4602, OIC server 4702, 4708, 4710, OIC client 4704, 4706, 4802, sensors 1502, 1504, and logical entities to create GUIs such as GUI 5002.

As shown in FIG. 51A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may comprise of multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 51A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain includes M2M gateways 14 and terminal devices 18. It may be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals via the communication network 12 or direct radio link. The M2M gateway device 14 allows wireless M2M devices (e.g. cellular and non-cellular) as well as fixed network M2M devices (e.g., PLC) to communicate through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service layer 22, as described below. M2M devices 18 and gateways 14 may communicate via various networks including, cellular, WLAN, WPAN (e.g., Zigbee, 6LoWPAN, Bluetooth), direct radio link, and wireline for example.

Referring to FIG. 51B, the illustrated M2M service layer 22 in the field domain provides services for the M2M application 20 (e.g., Application 1721 or Application2 1722), M2M gateway devices 14, and M2M terminal devices 18, and the communication network 12. Communication network 12 may be used to implement functionality of the disclosed examples and can include functionality and logical entities such as basic SMS architecture 1800, SMP 1802, VSMR 1804, SMRS 1806, requestor 1808, SMS host 1810, original resources, mashup function 2002, advanced SMS architecture 2200, VSMR Host 2302, SMRS Host 2304, 2402, resource hosts 2804, 3402, semantic graph store 2802, receiver 4102, originator 4104, MN-CSE 4606, 4608, IN-CSE 4604, IN-AE 4602, OIC server 4702, 4708, 4710, OIC client 4704, 4706, 4802, sensors 1502, 1504, and logical entities to create GUIs such as GUI 5002. The M2M service layer 22 may communicate with any number of M2M applications, M2M gateway devices 14, M2M terminal devices 18, and communication networks 12 as desired. The M2M service layer 22 may be implemented by one or more servers, computers, or the like. The M2M service layer 22 provides service capabilities that apply to M2M terminal devices 18, M2M gateway devices 14 and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateway devices 14 and M2M terminal devices 18 in the field domain. It may be understood that the M2M service layer 22' may communicate with any number of M2M applications, M2M gateway devices and M2M terminal devices. The M2M service layer 22' may interact with a service layer by a different service provider. The M2M service layer 22' may be implemented by one or more servers, computers, virtual machines (e.g., cloud/computer/storage farms, etc.) or the like.

Referring also to FIG. 51B, the M2M service layer 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layer 22 and 22' also enables M2M applications 20 and 20' to communicate through various networks 12 and 12' in connection with the services that the service layer 22 and 22' provide.

In some examples, M2M applications 20 and 20' may include desired applications that communicate using methods with regard to enabling a semantic mashup in IoT, as disclosed herein. The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20 and 20'.

The enabling a semantic mashup in IoT of the present application may be implemented as part of a service layer. The service layer is a middleware layer that supports value-added service capabilities through a set of application programming interfaces (APIs) and underlying networking interfaces. An M2M entity (e.g., an M2M functional entity such as a device, gateway, or service/platform that is implemented on hardware) may provide an application or service. Both ETSI M2M and oneM2M use a service layer that may include the enabling a semantic mashup in IoT of the present application. The oneM2M service layer supports a set of Common Service Functions (CSFs) (e.g., service capabilities). An instantiation of a set of one or more particular types of CSFs is referred to as a Common Services Entity (CSE), which may be hosted on different types of network nodes (e.g., infrastructure node, middle node, application-specific node). Further, the enabling a semantic mashup in IoT of the present application may be implemented as part of an M2M network that uses a Service Oriented Architecture (SOA) or a resource-oriented architecture (ROA) to access services such as the enabling a semantic mashup in IoT of the present application.

As disclosed herein, the service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer can provide applications various devices with access to a collection of or a set of the above mentioned capabilities or functionalities, supported by the service layer, which may be referred to as a CSE or SCL. A few examples include but are not limited to security, charging, data management, device management, discovery, provisioning, and connectivity management, which may be commonly used by various applications. These capabilities or functionalities are made available to such various applications via APIs, which make use of message formats, resource structures and resource representations defined by the M2M service layer. The CSE or SCL is a functional entity that may be implemented by hardware or software and that provides (service) capabilities or functionalities exposed to various applications or devices (e.g., functional interfaces between such functional entities) in order for them to use such capabilities or functionalities.

In one example, the logical entities such as basic SMS architecture 1800, SMP 1802, VSMR 1804, SMRS 1806, requestor 1808, SMS host 1810, original resources, mashup function 2002, advanced SMS architecture 2200, VSMR Host 2302, SMRS Host 2304, 2402, resource hosts 2804, 3402, semantic graph store 2802, receiver 4102, originator 4104, MN-CSE 4606, 4608, IN-CSE 4604, IN-AE 4602, OIC server 4702, 4708, 4710, OIC client 4704, 4706, 4802, sensors 1502, 1504, and logical entities to create GUIs such as GUI 5002 may be hosted within a M2M service layer instance hosted by an M2M node, such as an M2M server, M2M gateway, or M2M device, as shown in FIG. 51B. For example, the logical entities such as basic SMS architecture 1800, SMP 1802, VSMR 1804, SMRS 1806, requestor 1808, SMS host 1810, original resources, mashup function 2002, advanced SMS architecture 2200, VSMR Host 2302, SMRS Host 2304, 2402, resource hosts 2804, 3402, semantic graph store 2802, receiver 4102, originator 4104, MN-CSE 4606, 4608, IN-CSE 4604, IN-AE 4602, OIC server 4702, 4708. 4710, OIC client 4704, 4706, 4802, sensors 1502, 1504, and logical entities to create GUIs such as GUI 5002 may comprise an individual service capability within the M2M service layer instance or as a sub-function within an existing service capability.

FIG. 51C illustrates an exemplary system diagram of an example M2M device 30, such as an M2M terminal device 18 (which may include OIC client2 4704 or requestor 1808) or an M2M gateway device 14 (which may include one or more components FIG. 26, FIG. 28, FIG. 41, FIG. 49, etc.), for example. As shown in FIG. 51C, the M2M device 30 may include a processor 32, a transceiver 34, a transmit/receive element 36, a speaker/microphone 38, a keypad 40, a display/touchpad 42, non-removable memory 44, removable memory 46, a power source 48, a global positioning system (GPS) chipset 50, and other peripherals 52. It may be appreciated that the M2M device 30 may include any sub-combination of the foregoing elements while remaining consistent with the disclosed subject matter. M2M device 30 (e.g., VSMR Host 2302, SMRS Host 2304, 2402, resource hosts 2804, 3402, semantic graph store 2802, receiver 4102, originator 4104, MN-CSE 4606, 4608, IN-CSE 4604, IN-AE 4602, OIC server 4702, 4708, or others) may be an exemplary implementation that performs the disclosed systems and methods for enabling a semantic mashup in IoT.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, or any other functionality that enables the M2M device 30 to operate in a wireless environment. The processor 32 may be coupled with the transceiver 34, which may be coupled with the transmit/receive element 36. While FIG. 51C depicts the processor 32 and the transceiver 34 as separate components, it may be appreciated that the processor 32 and the transceiver 34 may be integrated together in an electronic package or chip. The processor 32 may perform application-layer programs (e.g., browsers) or radio access-layer (RAN) programs or communications. The processor 32 may perform security operations such as authentication, security key agreement, or cryptographic operations, such as at the access-layer or application layer for example.

The transmit/receive element 36 may be configured to transmit signals to, or receive signals from, an M2M service platform 22. For example, the transmit/receive element 36 may be an antenna configured to transmit or receive RF signals. The transmit/receive element 36 may support various networks and air interfaces, such as WLAN, WPAN, cellular, and the like. In an example, the transmit/receive element 36 may be an emitter/detector configured to transmit or receive IR, UV, or visible light signals, for example. In yet another example, the transmit/receive element 36 may be configured to transmit and receive both RF and light signals. It may be appreciated that the transmit/receive element 36 may be configured to transmit or receive any combination of wireless or wired signals.

In addition, although the transmit/receive element 36 is depicted in FIG. 51C as a single element, the M2M device 30 may include any number of transmit/receive elements 36. More specifically, the M2M device 30 may employ MIMO technology. Thus, in an example, the M2M device 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M device 30 may have multi-mode capabilities. Thus, the transceiver 34 may include multiple transceivers for enabling the M2M device 30 to communicate via multiple RATs, such as UTRA and IEEE 802.11, for example.

The processor 32 may access information from, and store data in, any type of suitable memory, such as the non-removable memory 44 or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other examples, the processor 32 may access information from, and store data in, memory that is not physically located on the M2M device 30, such as on a server or a home computer. The processor 32 may be configured to control lighting patterns, images, or colors on the display or indicators 42 in response to whether the enabling a semantic mashup in IoT in some of the examples described herein are successful or unsuccessful (e.g., semantic discovery, semantic mashup, Retrieve <smrs>, etc.), or otherwise indicate a status of enabling semantic mashup in IoT and associated components. The control lighting patterns, images, or colors on the display or indicators 42 may be reflective of the status of any of the method flows or components in the FIG.'S illustrated or discussed herein (e.g., FIG. 26, FIG. 28, FIG. 41, FIG. 49, etc.). Disclosed herein are messages and procedures (e.g., methods) of enabling semantic mashup in IoT. The messages and procedures may be extended to provide interface/API for users to request enabling semantic mashup in IoT via an input source (e.g., speaker/microphone 38, keypad 40, or display/touchpad 42). In an addition example, there may be a request, configure, or query of semantic mashup methods, among other things that may be displayed on display 42.

The processor 32 may receive power from the power source 48, and may be configured to distribute or control the power to the other components in the M2M device 30. The power source 48 may be any suitable device for powering the M2M device 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled with the GPS chipset 50, which is configured to provide location information (e.g., longitude and latitude) regarding the current location of the M2M device 30. It may be appreciated that the M2M device 30 may acquire location information by way of any suitable location-determination method while remaining consistent with information disclosed herein.

The processor 32 may further be coupled with other peripherals 52, which may include one or more software or hardware modules that provide additional features, functionality or wired or wireless connectivity. For example, the peripherals 52 may include various sensors such as an accelerometer, biometrics (e.g., fingerprint) sensors, an e-compass, a satellite transceiver, a sensor, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The transmit/receive elements 36 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The transmit/receive elements 36 may connect to other components, modules, or systems of such apparatuses or devices via one or more interconnect interfaces, such as an interconnect interface that may comprise one of the peripherals 52.

FIG. 51D illustrates an exemplary block diagram of an exemplary computing system 90 on which, for example, the M2M service platform 22 of FIG. 51A and FIG. 51B may be implemented. Computing system 90 (e.g., M2M terminal device 18 or M2M gateway device 14) may comprise a computer or server and may be controlled primarily by computer readable instructions by whatever means such instructions are stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91 that performs additional functions or assists CPU 91. CPU 91 or coprocessor 81 may receive, generate, and process data related to the disclosed systems and methods for enabling semantic mashup in IoT, such as calculating the mashup result.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled with system bus 80 include random access memory (RAM) 82 and read only memory (ROM) 93. Such memories include circuitry that allows information to be stored and retrieved. ROMs 93 generally include stored data that cannot easily be modified. Data stored in RAM 82 may be read or changed by CPU 91 or other hardware devices. Access to RAM 82 or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may include peripherals controller 83 responsible for communicating instructions from CPU 91 to peripherals, such as printer 94, keyboard 84, mouse 95, and disk drive 85.

Display 86, which is controlled by display controller 96, may be used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may include network adaptor 97 that may be used to connect computing system 90 to an external communications network, such as network 12 of FIG. 51A and FIG. 51B.

It is understood that any or all of the systems, methods and processes described herein may be embodied in the form of computer executable instructions (e.g., program code) stored on a computer-readable storage medium which instructions, when executed by a machine, such as a computer, server, M2M terminal device, M2M gateway device, or the like, perform or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not include signals per se. As evident from the herein description, storage media should be construed to be statutory subject matter. Computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other physical medium which may be used to store the desired information and which may be accessed by a computer. A computer-readable storage medium may have a computer program stored thereon; the computer program may be loadable into a data-processing unit and adapted to cause the data-processing unit to execute method steps when the computer program is run by the data-processing unit.

In describing preferred methods, systems, or apparatuses of the subject matter of the present disclosure—enabling a semantic mashup in IoT—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effectuate the methods described herein. As used herein, the terms "apparatus," "network apparatus," "node," "device," "network node," or the like may be used interchangeably. In addition, the use of the word "or" is generally used inclusively unless otherwise provided herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art (e.g., skipping steps, combining steps, or adding steps between exemplary methods disclosed herein). It is contemplated herein that some of the resources or attributes may be remove or add attributes or resources (e.g. child resources) from the different examples provided herein. For example, some of the resources or attributes as shown in the FIGS. (e.g., FIG. 40, FIG. 42, or FIG. 44, etc.) or in the Tables (e.g., Table 4, Table 9, or Table 10, etc.) may be combined between FIGS. or Tables or removed (e.g., instead of having 5 attributes there may be 3 attributes). Such other examples are intended to be within the scope of the claims, which may broaden or narrow the claims for enabling semantic mashup in IoT, as disclosed herein.

Methods, systems, and apparatuses, among other things, as described herein may provide for means for enabling a semantic mashup in IoT. A method, system, computer readable storage medium, or apparatus has means to obtain a profile; use the profile to create a virtual resource that collects data from multiple original resources as indicated by the profile; calculate a result of the virtual resource based on the collected data; and provide the result of the virtual resource to a requestor. The profile may be a semantic mashup. The semantic mashup profile may include a mashup function. The mashup function may use data from the multiple original resources. The mashup function may use an input from the requestor. The virtual resource is a virtual semantic resource and the result is a sematic mashup result. The virtual semantic resource may be discovered and used by another requestor. The virtual semantic resource may updated once the original resources are modified. The virtual semantic resource may migrated to a new location. The result may be stored separately from the virtual resource. A method, system, computer readable storage medium, or apparatus has means for receiving a request to create a semantic mashup resource; identifying a semantic mashup profile based on the request message; based on the semantic mashup profile, determining a mashup member resource for the semantic mashup resource to be created, and generating a semantic mashup result; creating the semantic mashup resource based on the determined mashup member resource; and providing instructions to send: an address of the result of the semantic mashup resource, and an address of the semantic mashup resource. The semantic mashup profile may include semantic information about a mashup function. The mashup function may use data from multiple original resources as indicated by the semantic mashup profile. The semantic mashup profile may include information about how the mashup member resource are to be selected. The semantic mashup resource may be discovered or used by a plurality of requestors. The semantic mashup resource may be updated after corresponding original resources are modified. The request message may include a type attribute that indicates semantic mashup behavior. All combinations in this paragraph and disclosed throughout the detailed description (including the removal or addition of steps) are contemplated.

What is claimed:

1. An apparatus for semantic mashup, the apparatus comprising:
    a processor; and
    a memory coupled with the processor, the memory storing executable instructions that when executed by the processor cause the processor to effectuate operations comprising:
        receiving a request from a first entity for a semantic mashup operation according to a semantic mashup profile, wherein the semantic mashup profile was created by a second entity and discovered by the first entity and the semantic mashup profile was assigned with a smpID, wherein the request comprises data input from the first entity;
        based on the instructions in the semantic mashup profile,
            determining one or more mashup member resources for the semantic mashup resource to be created, and
            generating a semantic mashup result, the semantic mashup result is calculated based on the data collected from the one or more mashup member resources and data input sent from the first entity;
        creating a semantic mashup resource, wherein the semantic mashup resource represents the semantic mashup operation requested by the first entity and is assigned a vsmrID, wherein the semantic mashup resource refers to a corresponding semantic mashup profile and the semantic mashup profile refers to the semantic mashup resource;
        identifying new member resources when existing member resources become unavailable;
        creating a semantic mashup result resource;
        storing the semantic mashup result in the semantic mashup result resource; and sending an address of the semantic mashup resource to the first entity.

2. The apparatus of claim 1, the operations further comprising publishing an address of the result of the semantic mashup resource, wherein the result of the semantic mashup resource is discovered and accessed by a third entity.

3. The apparatus of claim 2, wherein the mashup function uses data from multiple original resources as indicated by the semantic mashup profile.

4. The apparatus of claim 1, wherein the semantic mashup profile comprises information about how the mashup member resource are to be selected.

5. The apparatus of claim 1, wherein the semantic mashup resource is discovered and used by a plurality of requestors.

6. The apparatus of claim 1, wherein the semantic mashup resource is updated once corresponding original resources are modified.

7. The apparatus of claim 1, wherein the request message comprises a type attribute that indicates whether the step of generating the semantic mashup result is periodically done.

8. A method for semantic mashup, the method comprising:
 receiving a request from a first entity for a semantic mashup operation according to a semantic mashup profile, wherein the semantic mashup profile was created by a second entity and discovered by the first entity and the semantic mashup profile was assigned with a smpID, wherein the request comprises data input from the first entity;
 based on the instructions in the semantic mashup profile, determining one or more mashup member resources for the semantic mashup resource to be created, and
 generating a semantic mashup result, the semantic mashup result is calculated based on the data collected from the one or more mashup member resources and data input sent from the first entity;
 creating a semantic mashup resource, wherein the semantic mashup resource represents the semantic mashup operation requested by the first entity and is assigned a vsmrID, wherein the semantic mashup resource refers to a corresponding semantic mashup profile and the semantic mashup profile refers to the semantic mashup resource;
 identifying new member resources when existing member resources become unavailable; based on the determined one or more mashup member resources;
 creating a semantic mashup result resource;
 storing the semantic mashup result in the semantic mashup result resource; and
 sending an address of the created semantic mashup resource to the first entity.

9. The method of claim 8, wherein the semantic mashup profile comprises semantic information about a mashup function.

10. The method of claim 9, wherein the mashup function uses data from multiple original resources as indicated by the semantic mashup profile.

11. The method of claim 8, wherein the semantic mashup profile comprises information about how the mashup member resource are to be selected.

12. The method of claim 8, wherein the semantic mashup resource is discovered and used by a plurality of requestors.

13. The method of claim 8, wherein the semantic mashup resource is updated once corresponding original resources are modified.

14. The method of claim 8, wherein the request message comprises a type attribute that indicates whether the step of generating the semantic mashup result is periodically done.

15. A computer readable storage medium storing computer executable instructions that when executed by a computing device cause said computing device to effectuate operations comprising:
 receiving a request from a first entity for a semantic mashup operation according to a semantic mashup profile, wherein the semantic mashup profile was created by a second entity and discovered by the first entity and the semantic mashup profile was assigned with a smpID, wherein the request comprises data input from the first entity;
 based on the instructions in the semantic mashup profile,
 determining one or more mashup member resources for the semantic mashup resource to be created, and
 generating a semantic mashup result, the semantic mashup result is calculated based on the data collected from the one or more mashup member resources and data input sent from the first entity;
 creating a semantic mashup resource, wherein the semantic mashup resource represents the semantic mashup operation requested by the first entity and is assigned a vsmrID, wherein the semantic mashup resource refers to a corresponding semantic mashup profile using a smpID and the semantic mashup profile refers to the semantic mashup resource using a vsmrID;
 identifying new member resources when existing member resources become unavailable, which is before the semantic mashup result is recalculated by the semantic mashup resource;
 creating a semantic mashup result resource;
 storing the semantic mashup result in the semantic mashup result resource, wherein the semantic mashup result resource is hosted by the third entity; and
 sending an address of the created semantic mashup resource to the first entity.

16. The computer readable storage medium of claim 15, wherein the semantic mashup profile comprises semantic information about a mashup function.

17. The computer readable storage medium of claim 16, wherein the mashup function uses data from multiple original resources as indicated by the semantic mashup profile.

18. The computer readable storage medium of claim 15, wherein the semantic mashup profile comprises information about how the mashup member resource are to be selected.

19. The computer readable storage medium of claim 15, wherein the semantic mashup resource is discovered and used by a plurality of requestors.

20. The computer readable storage medium of claim 15, wherein the semantic mashup resource is updated once corresponding original resources are modified.

* * * * *